US012705033B2

(12) United States Patent
Foley et al.

(10) Patent No.: US 12,705,033 B2
(45) Date of Patent: Aug. 11, 2026

(54) CONFIGURABLE INTEGRATION INFRASTRUCTURE SERVICE IN SOFTWARE ARCHITECTURE

(71) Applicant: SKAYL, LLC, Westminster, MD (US)

(72) Inventors: Shaun Foley, Cambridge, MA (US); Gordon Hunt, Scottsdale, AZ (US); Chris Allport, Hanover, PA (US)

(73) Assignee: SKAYL, LLC, Westminster, MD (US)

( * ) Notice: Subject to any disclaimer, the term of this patent is extended or adjusted under 35 U.S.C. 154(b) by 295 days.

(21) Appl. No.: 18/456,890

(22) Filed: Aug. 28, 2023

(65) Prior Publication Data

US 2025/0077200 A1 Mar. 6, 2025

(51) Int. Cl.

| | |
|---|---|
| ***G06F 8/41*** | (2018.01) |
| ***G06F 8/36*** | (2018.01) |
| ***G06F 8/71*** | (2018.01) |
| ***H04L 51/06*** | (2022.01) |
| ***H04L 51/066*** | (2022.01) |
| ***H04L 67/565*** | (2022.01) |

(52) U.S. Cl.

CPC ................ *G06F 8/425* (2013.01); *G06F 8/36* (2013.01); *G06F 8/71* (2013.01); *H04L 51/06* (2013.01); *H04L 51/066* (2013.01); *H04L 67/565* (2022.05)

(58) Field of Classification Search

CPC ... G06F 8/36; G06F 8/425; G06F 8/71; H04L 67/565; H04L 51/06

See application file for complete search history.

(56) References Cited

U.S. PATENT DOCUMENTS

2004/0044729 A1* 3/2004 Foerg .................... H04L 67/565 709/246

2015/0365308 A1* 12/2015 Borley ...................... G06F 8/71 717/122

FOREIGN PATENT DOCUMENTS

WO WO-2018232033 A1 * 12/2018 ............. G06Q 50/01

OTHER PUBLICATIONS

Brosgol, Benjamin M., Making FACE™ Units of Conformance Fully Portable: Coding Guidance for Ada, The Open Group, Sep. 2021, 16 pages, [retrieved on Mar. 25, 2026], Retrieved from the Internet: <URL:https://www.militarysystems-tech.com/>.*

(Continued)

*Primary Examiner* — Geoffrey R St Leger

(74) *Attorney, Agent, or Firm* — SNELL & WILMER L.L.P.

(57) ABSTRACT

A method including identifying, a first message of a plurality of messages to be handled by a first controller, the first message representing a first data, obtaining a syntax information of the first message, obtaining a logical information of the first message, including a first data unit type, obtaining a semantic information of the first message, the semantic information including a concept represented by the first message, identifying a second message of the plurality of messages, the second message being handled by a second controller, wherein the second message is compatible with the first message, wherein the second message has the same syntax information, the same logical information, or the same semantic information as the first message, determining a data transformation to convert the second message to the first message, and generating a pipeline of primitive code blocks to perform the data transformation on the first controller.

17 Claims, 31 Drawing Sheets

(56) References Cited

OTHER PUBLICATIONS

Mulholland, Sean, et al., Domain Specific Data Models (DSDMs): A Practitioner's Approach, The Open Group, Sep. 2021, 19 pages, [retrieved on Mar. 25, 2026], Retrieved from the Internet: <URL:https://tes-savi.com/wp-content/uploads/2023/01/DSDMs_A_Practitioners_Approach-final.pdf>.*

* cited by examiner

| | Field Name 434 | Measurement 436 | Unitless 438 | Type 440 |
|---|---|---|---|---|
| a | id | Count_MeasSysAxis | Unitless | Ulong |
| b | latitude | WGS84_Latitude | DegressOfArc | Double |
| c | longitude | WGS84_Longitude | DegressOfArc | Double |
| d | altitude | WGS84_Height | Meters | Double |
| e | engineTemp | Tekmperature_MeasSys | DegreesCelsius | Float |

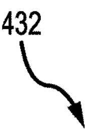

| | Field Name 434 | Measurement 436 | Unitless 438 | Type 440 |
|---|---|---|---|---|
| 432a | id | Count_MeasSysAxis | Unitless | Ulong |
| 432b | latitude | WGS84_Latitude | DegressOfArc | Double |
| 432c | longitude | WGS84_Longitude | DegressOfArc | Double |
| 432d | altitude | WGS84_Height | Meters | Double |
| 432e | engineTemp | Tekmperature_MeasSys | DegreesCelsius | Float |
| 432f | airSpeed | WGS84_Speed | MilesPerHour | Double |

FIG. 4C

CONFIGURABLE INTEGRATION INFRASTRUCTURE SERVICE IN SOFTWARE ARCHITECTURE

GOVERNMENT LICENSE RIGHTS

This disclosure was made with government support under contract No. W911W620D0002 awarded by the United States Army. The government has certain rights in the disclosure.

FIELD

This disclosure generally relates to software communication infrastructure portability, and more specifically, to configurable infrastructure for improved software portability and integration flexibility.

BACKGROUND

Software systems that include communication between multiple software applications can become increasingly complex as the systems scale. Generally, the applications within the software system are developed by different entities, even though the different applications may need to communicate with each other. Because of this, a change in a first application created by a first entity may have unintended consequences for a related second application created by a second entity. One solution to this problem is to create model-managed layers of abstraction to be used for communication between applications in the system.

Examples of software abstraction layers are defined in the Future Airborne Capability Environment Consortium (FACE™) technical standard developed by The Open Group. The FACE™ technical standard was created to define an avionics environment for various types of military platforms. The FACE™ technical standard defines an architecture to be used for developing software including a software application layer, a software transport layer, a platform specific (e.g., operating system) layer, and an input/output (I/O) layer. The FACE™ technical standard defines standardized interfaces between each software layer in an effort to improve code portability and integrability of the software segments. FACE is not the only standard that addresses these software architecture layers of abstraction through the specification of APIs. To achieve interoperability, FACE adds a data architecture that fully specifies data syntax and semantic that enable the APIs to be data centric. Other abstraction layer exists at the Operating Systems where POSIX define the APIs that implement the core functions such as memory, process, and time manipulation.

While FACE™ is directed to military airborne platforms, other industries (e.g., automotive, internet of things, etc.) have similar integration challenges with multiple software applications developed by multiple different entities. Current approaches to improving software integration do not scale well because the software applications lack the context for scaling and code reusability is reduced as context is added to the applications. As such, individual applications often lack the context of the fully integrated system in which the code is expected to operate, thereby causing the code to be modified in response to a change in another application. Additionally, modifications to the code reduce the reusability of the code because the modified code is tailored to a specific piece of hardware or system.

SUMMARY

Disclosed herein is a method including receiving, by a processor that is connected to a network, an indication of a first controller connecting to the network, the indication including a first unique identifier for the first controller, querying, by the processor, a data model for information about the first controller based at least in part on the first unique identifier for the first controller, wherein the information includes a first data type that is processed by the first controller, identifying, by the processor, in response to the query of the data model, a second controller that is connected to the network that processes a second data type that is compatible with the first data type, the second controller having a second unique identifier, and integrating, by the processor, the first controller into the network including transmitting the first unique identifier to the second controller and transmitting the second unique identifier to the first controller.

In various embodiments, the method further includes determining, by the processor, a data transformation to convert the second data type to the first data type based at least in part on the response to the query of the data model and transmitting, by the processor, the data transformation to the first controller. In various embodiments, the method further includes determining, by the processor, based at least in part on the response to the query of the data model, a first set of capabilities of the first controller and a second set of capabilities of the second controller and determining, by the processor, that the first controller performs the data transformation based at least in part on the first set of capabilities and the second set of capabilities.

In various embodiments, the first set of capabilities and the second set of capabilities include at least one of a processing power, a storage size, a memory size, a connection type, and a location. In various embodiments, the first data type being compatible with the second data type includes the first data type being syntactically the same as the second data type. In various embodiments, the first data type being compatible with the second data type includes the first data type being logically the same as the second data type. In various embodiments, the first data type being compatible with the second data type includes the first data type being semantically the same as the second data type.

Also disclosed herein is a non-transitory machine-readable medium having stored thereon instructions for performing a method of mediating a connection between a first controller connected to a network and a second controller connected to the network. The non-transitory machine-readable medium includes machine executable code which when executed by a processor, causes the processor to receive an indication of the first controller connecting to the network, the indication including a first unique identifier for the first controller, query a data model for information about the first controller based at least in part on the first unique identifier for the first controller, wherein the information includes a first data type that the first controller is configured to process, identify, in response to the query of the data model, a second processor that is configured to processes a second data type that is compatible with the first data type, the second processor having a second unique identifier, and integrate the first controller into the network including transmitting the first unique identifier to the second controller and transmitting the second unique identifier to the first controller.

In various embodiments, the machine executable code further causes the processor to determine a data transformation to convert the second data type to the first data type based at least in part on the response to the query of the data model and transmit the data transformation to the second controller. In various embodiments, the machine executable code further causes the processor to determine, based at least in part on the response to the query of the data model, a first set of capabilities of the first controller and a second set of capabilities of the second controller and determine that the second controller performs the data transformation based at least in part on the first set of capabilities and the second set of capabilities.

In various embodiments, the first set of capabilities and the second set of capabilities include at least one of a processing power, a storage size, a memory size, a connection type, and a location. In various embodiments, the first data type being compatible with the second data type includes the first data type being syntactically the same as the second data type. In various embodiments, the first data type being compatible with the second data type includes the first data type being logically the same as the second data type. In various embodiments, the first data type being compatible with the second data type includes the first data type being semantically the same as the second data type.

Also disclosed herein is a system including a first controller connected to a network, a second controller connected to the network, a processor, and a memory operatively coupled to the processor. The memory includes instructions stored thereon that, when executed by the processor, cause the processor to receive an indication of the first controller connecting to the network, the indication including a first unique identifier for the first controller, query a data model for information about the first controller based at least in part on the first unique identifier for the first controller, wherein the information includes a first data type that the first controller is configured to process, identify, in response to the query of the data model, a second processor that is configured to processes a second data type that is compatible with the first data type, the second processor having a second unique identifier, and integrate the first controller into the network including transmitting the first unique identifier to the second controller and transmitting the second unique identifier to the first controller.

In various embodiments, the instructions, when executed by the processor, further cause the processor to determine a data transformation to convert the second data type to the first data type based at least in part on the response to the query of the data model and transmit the data transformation to the second controller. In various embodiments, the instructions, when executed by the processor, further cause the processor to determine, based at least in part on the response to the query of the data model, a first set of capabilities of the first controller and a second set of capabilities of the second controller and determine that the second controller performs the data transformation based at least in part on the first set of capabilities and the second set of capabilities.

In various embodiments, the first data type being compatible with the second data type includes the first data type being syntactically the same as the second data type. In various embodiments, the first data type being compatible with the second data type includes the first data type being logically the same as the second data type. In various embodiments, the first data type being compatible with the second data type includes the first data type being semantically the same as the second data type.

Also disclosed herein is a method including initializing, by a first controller, a connection to a network wherein a plurality of controllers are connected to the network, wherein the first controller is configured to process a first data type, querying, by the first controller, a data model for information about the network and the plurality of controllers connected to the network, identifying, by the first controller, in response to the query to the data model, a second controller of the plurality of controllers that is configured to process a second data type that is compatible with the first data type, and reconfiguring, by the first controller, a communication protocol used by the first controller for communicating with the network to communicate with the second controller based at least in part on identifying the second controller from the data model.

In various embodiments, reconfiguring the communication protocol includes reconfiguring the communication protocol to transform the first data type to the second data type. The method further includes producing, by the first controller, the first data type, transforming, by the first controller, the first data type to the second data type, and transmitting, by the first controller, the second data type to the second controller over the network. In various embodiments, reconfiguring the communication protocol includes reconfiguring the communication protocol to transform the second data type to the first data type. The method further includes receiving, by the first controller, the second data type from the second controller over the network, transforming, by the first controller, the second data type to the first data type, and processing, by the first controller, the first data type.

In various embodiments, the second data type is syntactically the same as the first data type. In various embodiments, the second data type is logically the same as the first data type. In various embodiments, the second data type is semantically the same as the first data type. In various embodiments, the reconfiguring the communication protocol further includes implementing, by the first controller, a network interface configured to receive the second data type, transforming, by the first controller, the second data type to be logically the same as the first data type, and transforming, by the first controller, the second data type to be syntactically the same as the first data type.

Also disclosed herein is a non-transitory machine-readable medium having stored thereon instructions for performing a method of mediating a connection between a first controller connected to a network and a second controller connected to the network, including machine executable code which when executed by a processor, causes the processor to initialize the connection to the network wherein a plurality of controllers are connected to the network, wherein the first controller is configured to process a first data type, query a data model for information about the network and the plurality of controllers connected to the network, identify, in response to the query to the data model, the second controller of the plurality of controllers that is configured to process a second data type that is compatible with the first data type, and reconfigure a communication protocol used by the first controller for communicating with the network to communicate with the second controller based at least in part on identifying the second controller from the data model.

In various embodiments, reconfiguring the communication protocol includes reconfiguring the communication protocol to transform the first data type to the second data type. The machine executable code further causes the processor to produce the first data type, transform the first data type to the second data type, and transmit the second data type to the second controller over the network. In various embodiments, reconfiguring the communication protocol includes reconfiguring the communication protocol to transform the second data type to the first data type. The machine executable code further causes the processor to receive the second data type from the second controller over the network, transform the second data type to the first data type, and process the first data type.

In various embodiments, the second data type is syntactically the same as the first data type. In various embodiments, the second data type is logically the same as the first data type. In various embodiments, the second data type is semantically the same as the first data type. In various embodiments, the machine executable code further causes the processor to implement a network interface configured to receive the second data type, transform the second data type to be logically the same as the first data type, and transform the second data type to be syntactically the same as the first data type.

Also disclosed herein is a system including a first controller connected to a network, a second controller connected to the network, a processor operatively coupled to the first controller, and a memory operatively coupled to the processor. The memory including instructions stored thereon that, when executed by the processor, cause the processor to initialize a connection to the network wherein a plurality of controllers are connected to the network, wherein the first controller is configured to process a first data type, query a data model for information about the network and the plurality of controllers connected to the network, identify, in response to the query to the data model, the second controller of the plurality of controllers that is configured to process a second data type that is compatible with the first data type, and reconfigure a communication protocol used by the first controller for communicating with the network to communicate with the second controller based at least in part on identifying the second controller from the data model.

In various embodiments, reconfiguring the communication protocol includes reconfiguring the communication protocol to transform the first data type to the second data type. The instructions, when executed by the processor, further cause the processor to produce the first data type, transform the first data type to the second data type, and transmit the second data type to the second controller over the network. In various embodiments, reconfiguring the communication protocol includes reconfiguring the communication protocol to transform the second data type to the first data type. The instructions, when executed by the processor, further cause the processor to receive the second data type from the second controller over the network, transform the second data type to the first data type, and process the first data type.

In various embodiments, the second data type is syntactically the same as the first data type. In various embodiments, the second data type is logically the same as the first data type. In various embodiments, the second data type is semantically the same as the first data type.

Also disclosed herein is a method including identifying, by a first controller, a first message of a plurality of messages to be handled by the first controller, wherein the first message represents a first data, obtaining, by the first controller, a syntax information of the first message, obtaining, by the first controller, a logical information of the first message, the logical information of the first message including a first data unit type, obtaining, by the first controller, a semantic information of the first message, the semantic information including a concept represented by the first message, identifying, by the first controller, a second message of the plurality of messages, the second message being handled by a second controller, wherein the second message is compatible with the first message, wherein the second message has the same syntax information, the same logical information, or the same semantic information as the first message, determining, by the first controller, a data transformation to convert the second message to the first message, and generating, by the first controller, a pipeline of primitive code blocks to perform the data transformation on the first controller.

In various embodiments, the method further includes querying, by the first controller, a data model for information about the plurality of messages and obtaining, by the first controller, the syntax information, the logical information, and the semantic information from a response to the query of the data model. In various embodiments, the syntax information of the first message includes a first data value, a first data position, a first data representation.

In various embodiments, a syntax information of the second message includes a second data value, a second data position, and a second data representation, wherein one of the second data value, the second data position, or the second data representation is different than one of the first data value, the first data position, or the first data representation. In various embodiments, the second message has the same logical information as the first message and wherein the data transformation converts the syntax information of the second message to the syntax information of the first message.

In various embodiments, the second message has the same semantic information as the first message and wherein the data transformation converts the logical information of the second message to the logical information of the first message. In various embodiments, the pipeline of primitive code blocks includes primitive include code for performing filter, split, join, transform, or queue operations.

Also disclosed herein is a non-transitory machine-readable medium having stored thereon instructions for performing a method of generating a pipeline of primitive code blocks for performing a data transformation, including machine executable code which when executed by a processor, causes the processor to identify a first message of a plurality of messages, wherein the first message represents a first data, obtain a syntax information of the first message, obtain a logical information of the first message, the logical information of the first message including a first data unit type, obtaining a semantic information of the first message, the semantic information including a concept represented by the first message, identify a second message of the plurality of messages, the second message being handled by a second controller, wherein the second message is compatible with the first message, wherein the second message has the same syntax information, the same logical information, or the same semantic information as the first message, determine the data transformation to convert the second message to the first message, and generate the pipeline of primitive code blocks to perform the data transformation.

In various embodiments, the machine executable code further causes the processor to query a data model for information about the plurality of messages and obtain the syntax information, the logical information, and the semantic information from a response to the query of the data model. In various embodiments, the syntax information of the first message includes a first data value, a first data position, a first data representation.

In various embodiments, a syntax information of the second message includes a second data value, a second data position, and a second data representation, wherein one of the second data value, the second data position, or the second data representation is different than one of the first data value, the first data position, or the first data representation. In various embodiments, the second message has the same logical information as the first message and wherein the data transformation converts the syntax information of the second message to the syntax information of the first message.

In various embodiments, the second message has the same semantic information as the first message and wherein the data transformation converts the logical information of the second message to the logical information of the first message. In various embodiments, the pipeline of primitive code blocks includes primitive include code for performing filter, split, join, transform, or queue operations.

Also disclosed herein is a system including a first controller, a second controller in communication with the first controller, a processor operatively coupled to the first controller, and a memory operatively coupled to the processor. The memory includes instructions stored thereon that, when executed by the processor, cause the processor to identify a first message of a plurality of messages to be handled by the first controller, wherein the first message represents a first data, obtain a syntax information of the first message, obtain a logical information of the first message, the logical information of the first message including a first data unit type, obtaining a semantic information of the first message, the semantic information including a concept represented by the first message, identify a second message of the plurality of messages, the second message being handled by the second controller, wherein the second message is compatible with the first message, wherein the second message has the same syntax information, the same logical information, or the same semantic information as the first message, determine a data transformation to convert the second message to the first message, and generate a pipeline of primitive code blocks to perform the data transformation.

In various embodiments, the instructions, when executed by the processor, further cause the processor to query a data model for information about the plurality of messages and obtain the syntax information, the logical information, and the semantic information from a response to the query of the data model. In various embodiments, the syntax information of the first message includes a first data value, a first data position, a first data representation.

In various embodiments, a syntax information of the second message includes a second data value, a second data position, and a second data representation, wherein one of the second data value, the second data position, or the second data representation is different than one of the first data value, the first data position, or the first data representation. In various embodiments, the second message has the same logical information as the first message and wherein the data transformation converts the syntax information of the second message to the syntax information of the first message.

In various embodiments, the second message has the same semantic information as the first message and wherein the data transformation converts the logical information of the second message to the logical information of the first message.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIGS. 4A, 4B, and 4C illustrate software architecture, connection topology, message formats, and data models, in accordance with various embodiments.

DETAILED DESCRIPTION

Figure 1:
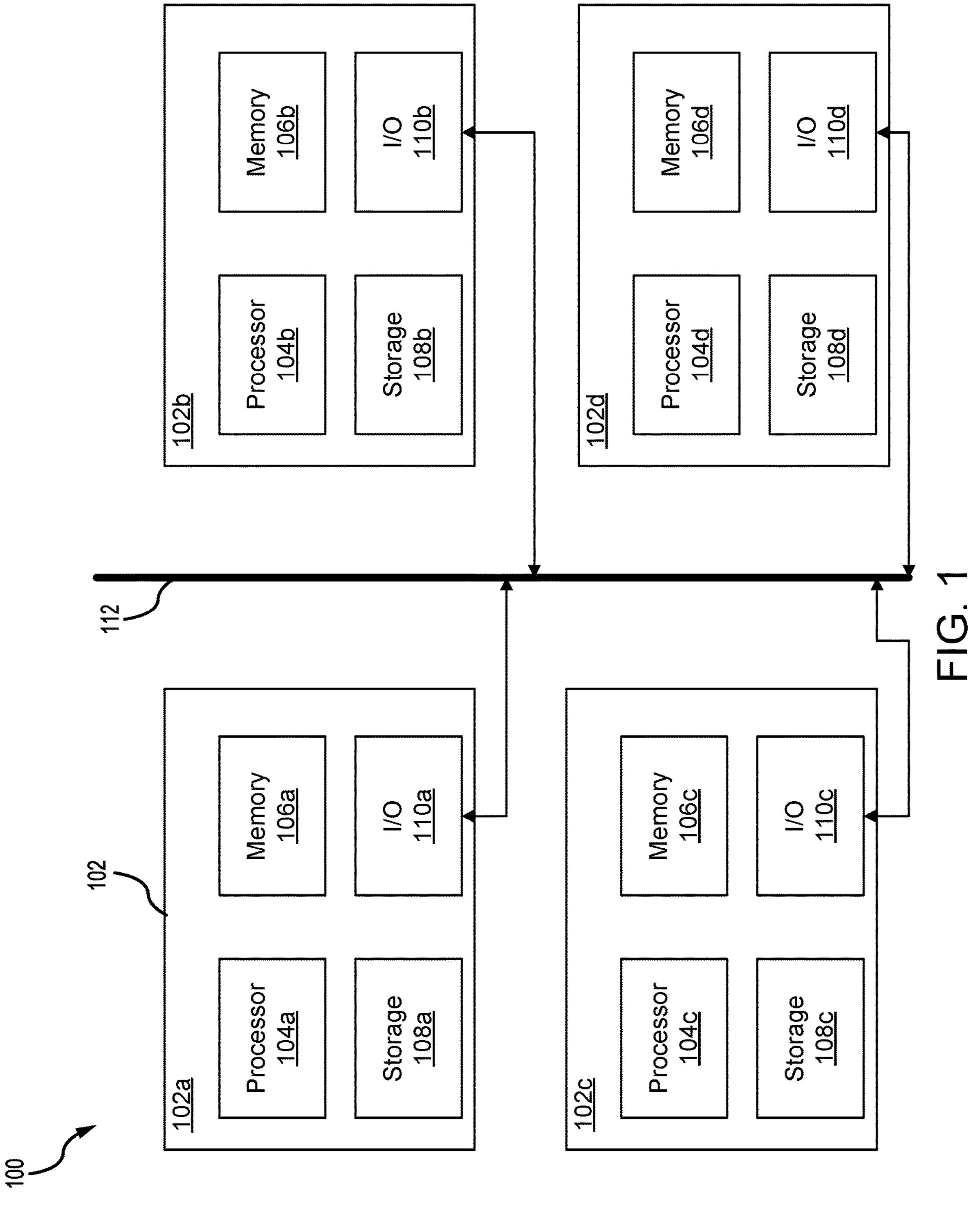
FIG. 1 illustrates a computing environment including more than one controller, in accordance with various embodiments.

Referring to FIG. 1, a computing environment 100 is illustrated, in accordance with various embodiments. Computing environment 100 may include, for example, one or more controllers 102 and a data bus 112. Each controller 102 may include, for example, a processor 104, a memory 106, a storage 108, and an input-output device (I/O) 110. In various embodiments, controller 102 may be connected to memory 106, storage 108, and I/O 110. For example, FIG. 1 shows a controller 102*a*, a controller 102*b*, a controller 102*c*, and a controller 102*d*. Controller 102*a* may include a processor 104*a*, a memory 106*a*, a storage device 108*a*. Controller 102*b* may include a processor 104*b*, a memory 106*b*, a storage device 108*b*. Controller 102*c* may include a processor 104*c*, a memory 106*c*, a storage device 108*c*. Controller 102*d* may include a processor 104*d*, a memory 106*d*, a storage device 108*d*. More controllers 102 may be connected using bus 112. In various embodiments, more than one bus 112 may be used to connect two or more controllers 102 with each other.

Processor 104 (e.g., processors 104*a*, 104*b*, 104*c*, 104*d*) may include one or more processors configured to implement various logical operations in response to execution of instructions, for example, instructions stored on a non-transitory, tangible, computer-readable medium. The one or more processors can be a general-purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof. In various embodiments, processor 104 may be implemented as a combination of computing devices, such as for example, a combination of a DSP and a microcontroller, a plurality of processors, one or more processors in conjunction with a DSP core, or any other such configuration.

Memory 106 (e.g., memories 106*a*, 106*b*, 106*c*, 106*d*) may be connected to processor 104 and may include volatile memory to store data, executable instructions, system program instructions, and/or processor instructions to implement the control logic of processor 104. In various embodiments, memory 106 may include cache memory (e.g., a cache memory of processor 104), random access memory (RAM), magnetoresistive RAM (MRAM), and/or other types of volatile memory including combinations of different types of memory.

Storage 108 (e.g., storages 108*a*, 108*b*, 108*c*, 108*d*) may be connected to processor 104 and may include non-volatile memory to store data, executable instructions, system program instructions, and/or processor instructions to implement the control logic of processor 104. In various embodiments, storage 108 may include read-only memory (ROM), programmable read-only memory (PROM), erasable programmable read only memory (EPROGM), electrically erasable programmable read only memory (EEPROM), flash memory, solid state memory, hard disk drives, and/or other non-volatile storage including combinations of different types of storage.

System program instructions and/or processor instructions may be loaded onto a non-transitory, tangible computer-readable medium (e.g., memory 106, storage 108, etc.) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

I/O device 110 (e.g., I/O devices 110*a*, 110*b*, 110*c*, 110*d*) may be connected to processor 104 and to bus 112. In various embodiments, I/O device 110 may include channel mapped I/O, port mapped I/O, and/or direct memory access (DMA) I/O. Bus 112 may be a wired bus such as a twisted pair, coaxial, ethernet, and fiber optic, among others. Bus 112 may be a wireless bus such as Wi-Fi, Bluetooth, Zigbee, and z-wave, among others. In various embodiments, I/O device 110 may be configured to communicate over bus 112 using wired protocols such as ethernet protocol, and universal serial bus (USB) protocol, among others. In various embodiments, I/O device 110 may be configured to communicate over bus 112 using wireless protocols such as Wi-Fi, Bluetooth, and Zigbee, among others. In various embodiments, I/O device 110 may include more than one I/O device for communicating over different busses of a same or different type.

Figure 2:
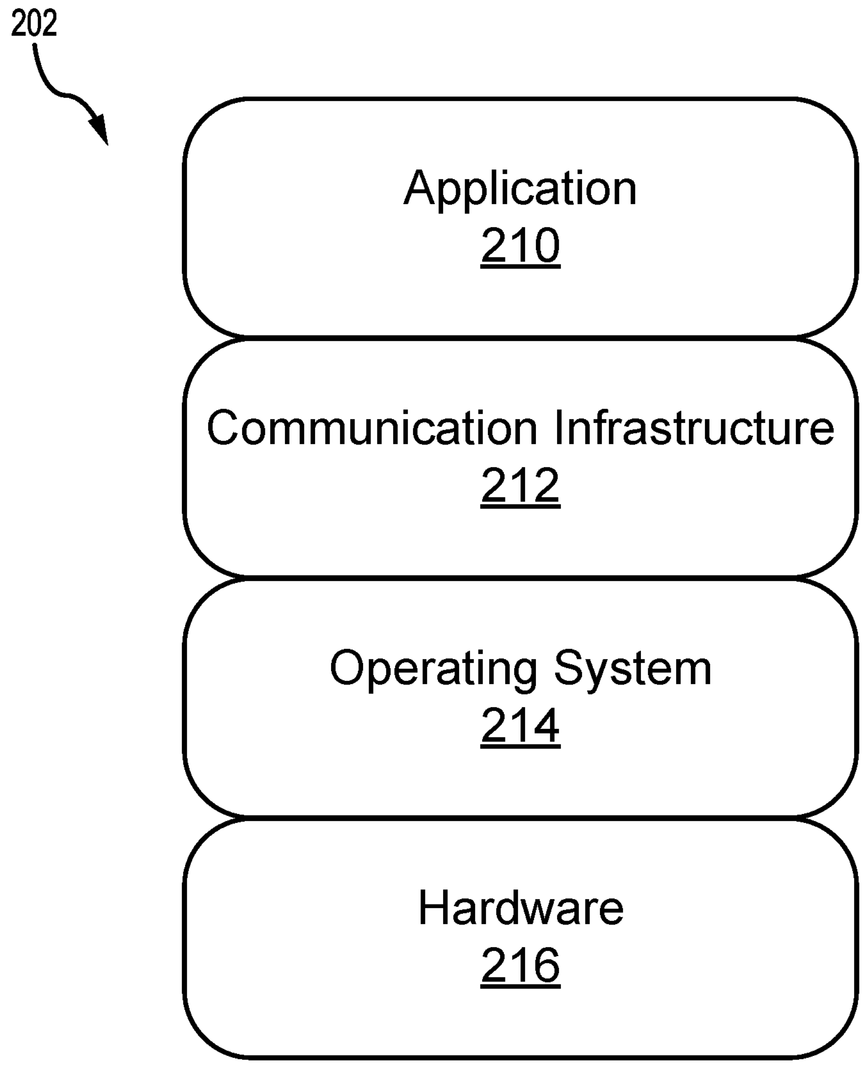
FIG. 2 illustrates a software architecture model, in accordance with various embodiments.

Referring now to FIG. 2, a generic software architecture model 202 is illustrated, in accordance with various embodiments. Generic architecture model 202 may include, for example, an application layer 210, a communication and integration infrastructure layer 212, an operating system layer 214, and a hardware layer 216. Application layer 210 may include software designed and written to implement a specific task on hardware 216. Application layer 210 may include one or more applications configured to operate together or independently to provide functionality to an end user. For example, application layer 210 may include a graphical user interface (GUI) for viewing messages. Application layer 210 communicates with communication and integration infrastructure layer 212.

Communication and integration infrastructure layer 212 may be designed to allow portability of applications by implementing logic and communications protocols.

Communication and integration infrastructure layer 212 may include logic and/or software configured to communicate with application layer 210 and operating system 214 allowing the underlying operating system used to be changed with little to no modifications to applications hosted on application layer 210.

Operating system layer 214 may include the operating system on which the applications of application layer 210 are running. In various embodiments, the operating system may be a desktop operating system such as Windows, Linux, or OS X operating system, among others. In various embodiments, the operating system may be a server operating system such as Windows, Linux, Unix, or OS X, among others. In various embodiments, the operating system may be a real-time operating system such as VxWorks, INTEGRITY, or RT Linux, among others. Different operating systems implement different application programming interfaces (API) such as POSIX, Win32, and others.

Communication and integration interface layer 212 facilitates portability of software in application layer 210 by implementing an API for the software in application layer 210 and communicating information received from the application to the operating system in operating system layer 214. This allows the same code to be reused on multiple operating systems without changing the code in the application to communicate with each individual operating system.

Hardware layer 216 may include the hardware that runs the software in operating system layer 214, communication and integration infrastructure layer 212, and application layer 210. Controllers 102*a*, 102*b*, 102*c*, 102*d* described above with respect to FIG. 1 may be examples of hardware layer 216.

Figure 3:
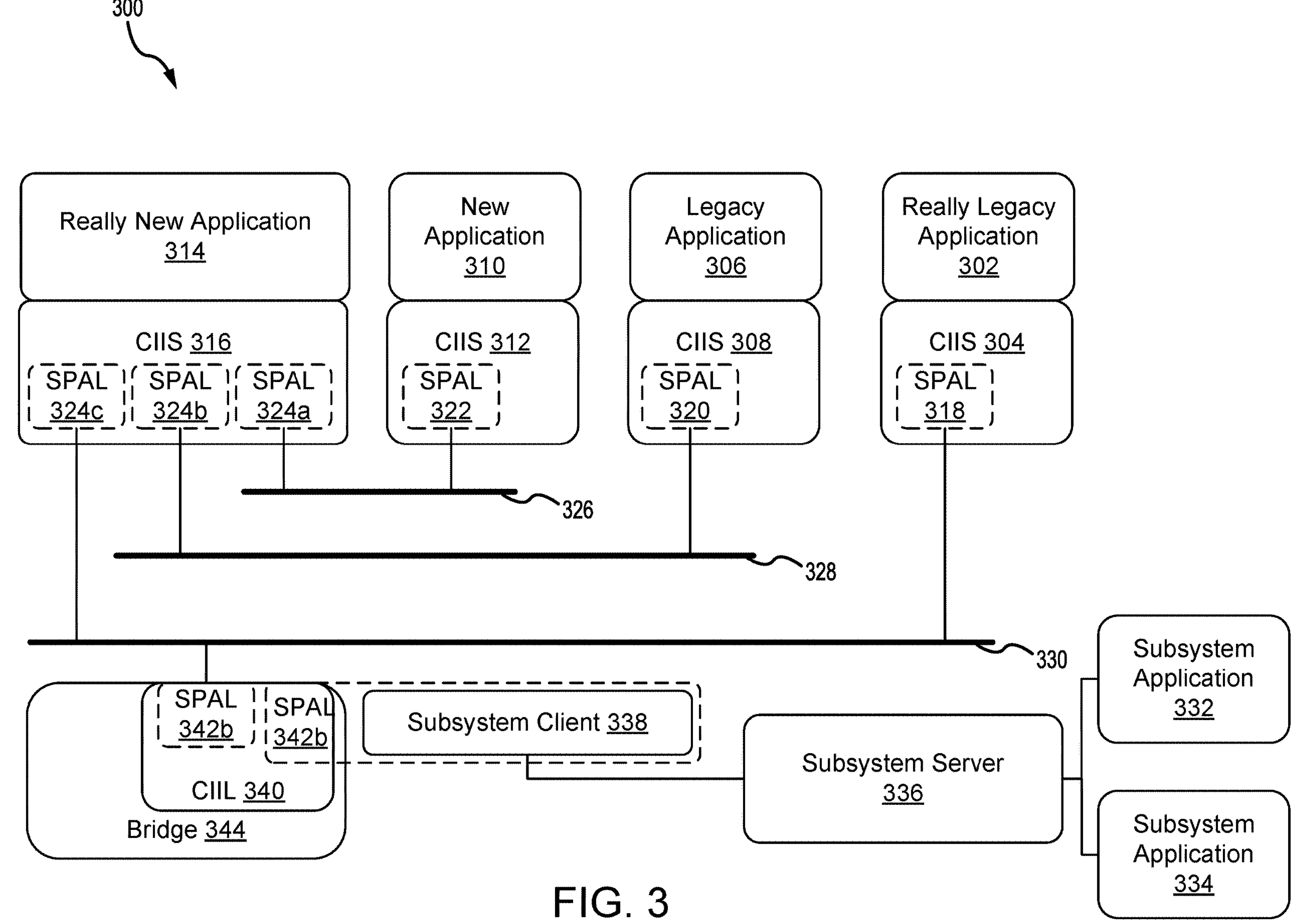
FIG. 3 illustrates communication topologies used within a software architecture, in accordance with various embodiments.

Referring now to FIG. 3, different communication and integration topologies are illustrated, in accordance with various embodiments. FIG. 3 illustrates a topology 300 for communicating between applications of varying ages and communication standards. In various embodiments, topology 350 may be implemented by the Future Airborne Capability Environment (FACE™) standard. Various embodiments disclosed herein may be implemented to improve communication across different topologies including, for example, topology 300 and topology 350.

Referring to FIG. 3, topology 300 may include a first application 302 in communication with a first communication and integration infrastructure layer (CIIL) 304, a second application 306 in communication with a second CIIL 308, a third application 310 in communication with a third CIIL 312, and a fourth application 314 in communication with a fourth CIIL 316. First CIIL 304 may include a first signal and protocol abstraction layer (SPAL) 318. Second CIIL 308 may include a second SPAL 320. Third CIIL 312 may include a third SPAL 322. Fourth CIIL 316 may include a fourth SPAL 324*a*, a fifth SPAL 324*b*, and a sixth SPAL 324*c*. Topology 300 further may include a first communication bus 326, a second communication bus 328, and a third communication bus 330.

First CIIL 304 may include interfaces, or APIs, to communicate with first application 302 and third communication bus 330. In various embodiments, first CIIL 304 may communicate with third communication bus 330 using first SPAL 318. In various embodiments, first application 302 may be an old legacy application and third communication bus 330 may be an old legacy bus.

Second CIIL 308 may include interfaces, or APIs, to communicate with second application 306 and second communication bus 328. In various embodiments, second CIIL 306 may communicate with second communication bus 328 using second SPAL 320. In various embodiments, second application 306 may be a legacy application and second communication bus 328 may be a legacy bus. In various embodiments, second application 306 may be newer than first application 302 and second communication bus 328 may be newer than third communication bus 330.

Third CIIL 312 may include interfaces, or APIs, to communicate with third application 310 and first communication bus 326. In various embodiments, third CIIL 312 may communicate with first communication bus 326 using third SPAL 322. In various embodiments, third application 310 may be a current application and first communication bus 326 may be a current bus. In various embodiments, third application 310 may be newer than second application 306 and first communication bus 326 may be newer than second communication bus 328.

Fourth CIIL 316 may include interfaces, or APIs, to communicate with fourth application 314, first communication bus 326, second communication bus 328, and third communication bus 330. In various embodiments, fourth CIIL 316 may communicate with first communication bus 326 using fourth SPAL 324*a*. Fourth CIIL 316 may additionally communicate with second communication bus 328 using fifth SPAL 324*b*. Fourth CIIL 316 may further communicate with third communication bus using sixth SPAL 324*c*. In various embodiments, fourth application 314 may be a new application. In various embodiments, fourth application 314 may be designed to facilitate communication between first application 302, second application 306, and/or third application 310. In various embodiments, fourth application 314 may be newer than third application 310.

In various embodiments, first SPAL 318 may be the same as sixth SPAL 324*c*. In various embodiments, second SPAL 320 may be the same as fifth SPAL 324*b*. In various embodiments, third SPAL 322 may be the same as fourth SPAL 324*a*. The use of a SPAL for communication with a communication bus (e.g., 326, 328, 330) allows for code reuse and simplifies the application build process. Placing the SPAL code in the CIIL library, or module, allows applications (e.g., 302, 306, 310, 314) to be simplified and not have to manually code all communication interfaces.

Continuing with FIG. 3, a fifth application 332, a sixth application 334, a server 336, and a client 338 are illustrated. Server 336 hosts fifth application 332 and sixth application 334 and client 338 communicates with server 336 to access fifth application 332 and sixth application 334. Client 338 communicates with communication ad integration infrastructure layer (CIIL) 340 which is hosted by a bridge application 344. CIIL 340 may include a seventh SPAL 342*a* and an eighth SPAL 342*b*. Seventh SPAL 342*a* provides interfaces to bridge application 344 to communicate with client 338 and eighth SPAL 342*b* provides interfaces to bridge application 344 to communicate with third communication bus 330. In various embodiments, eighth SPAL 342*b* may be the same as first SPAL 318.

As illustrated, topology 300 describes communication paths between the applications (e.g., 302, 306, 310, 314, 332, 334, and 344). The various communication paths are facilitated and provided by CIIL 304, 308, 312, 316 and CIIL 340, each of which provides an interface to its respective application and an interface to each respective communication bus. In various embodiments, as illustrated, SPALs 318, 320, 322, 324*a*, 324*b*, 324*c*, 342*a*, 342*b* implement interfaces for each communication bus. The architecture illustrated by topology 300 improves code reuse and portability by defining one interface for the application and having a CIIL implemented to handle data transactions between the application and the communication bus. In various embodiments, the CIIL may handle data transactions between one application and another application directly. This architecture allows the CIIL and/or SPAL to be replaced with another module for communicating on another bus with little to no changes to the application code. In various embodiments, this replacement can be accomplished through configuration of the CIIL further limiting and changes or impact on the application code.

Figure 4A:
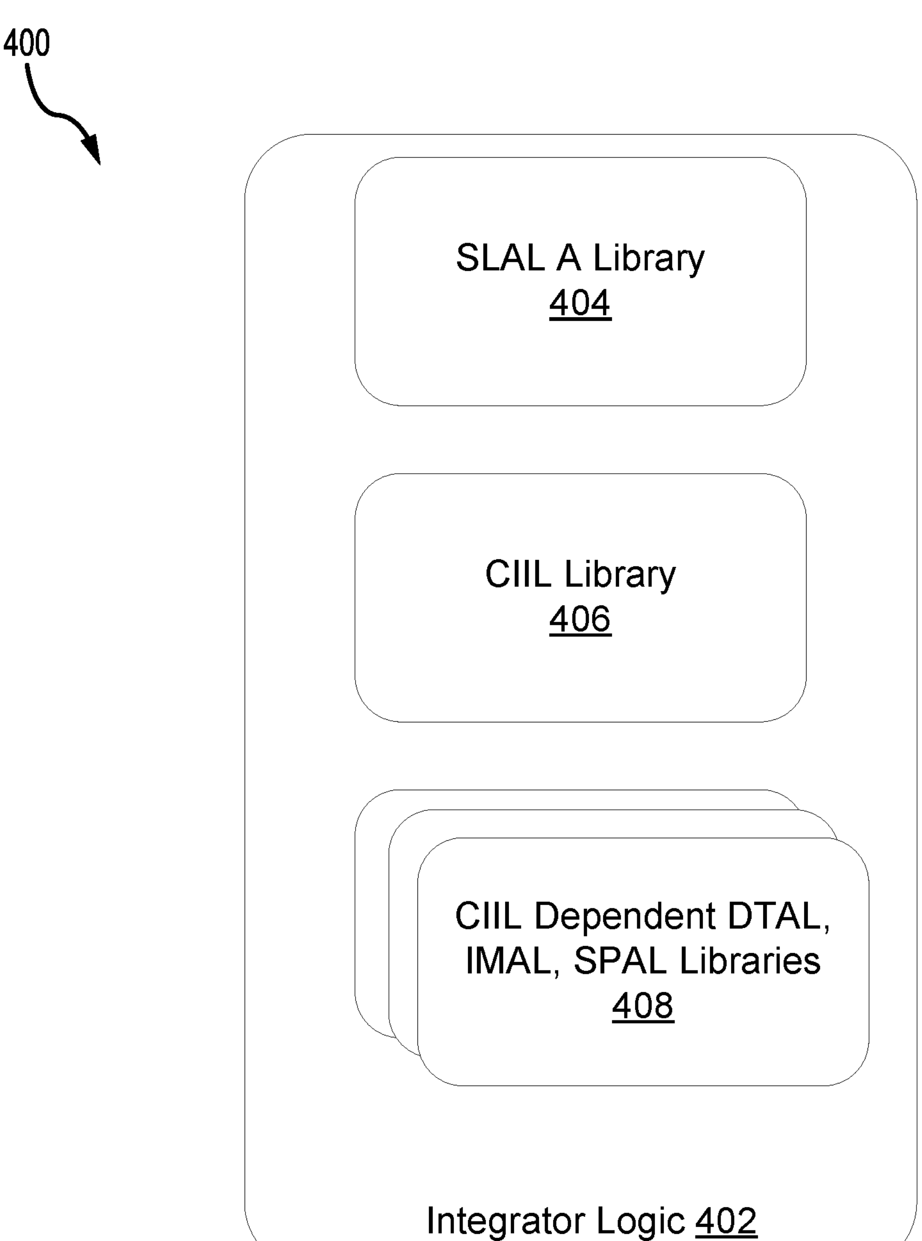
Figure 4B:
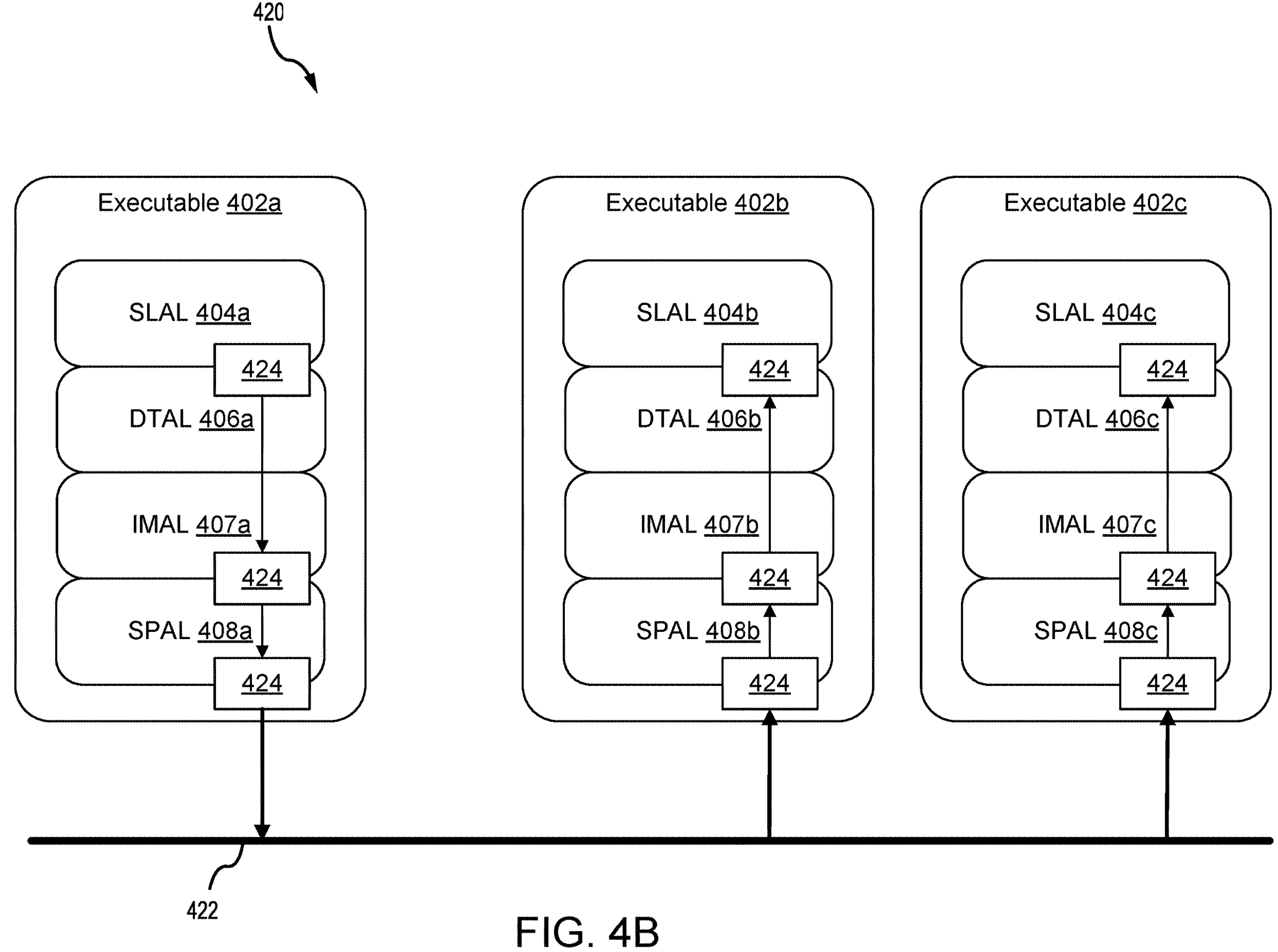

Referring now to FIGS. 4A and 4B, an executable architecture 400 and executable network layout 420 are illustrated, in accordance with various embodiments. Architecture 400 may include integrator logic 402, business logic 404, communication and integration logic 406, and supporting data type, integration and mediation, and signal and protocol libraries, referred to hereinafter libraries 408. Architecture 400 improves portability and reusability of software components. For example, as will be discussed in further detail below, business logic 404 may be used with different transport logic (e.g., in libraries 408) via configuration of 406 to provide different forms of data communication. This may allow business logic 404 to be integrated into different systems with little to no code changes to business logic 404. Integrator logic 402 may include an entry point of executable architecture 400 (e.g., integrator logic 402) and may further include additional functions written and used by an end product integrator. In various embodiments, the entry point of the program may include the "main" function of C++, the "_main_" environment of Python, or the "main( )" method of Java, among others.

Integrator logic 402 invokes functions and/or methods defined in business logic 404. Business logic 404 may include the main code for written to perform the tasks of a program built using architecture 400. In various embodiments, business logic 404 may be an example of a software logic abstraction layer (SLAL) as defined in the FACE™ standard. In various embodiments, business logic 404 may be one or more functional libraries connected together to perform the tasks requested by integrator logic 402.

Transport logic 406, also referred to as type specific logic 406, provides an interface, or application program interface (API), for communicating with other programs (e.g., business logic 404). As previously described with respect to FIG. 3, programs may communicate using different communication busses and/or different interfaces. The mode of communication between programs and/or controllers may change over time. In the past, the code of the program (e.g., business logic 404) has been updated to address the changes in communications methods. Similarly, the information received and transmitted by a program may change over time resulting in changes to the code of the program (e.g., business logic 404). As will be described in further detail below, coding efficiency can be improved by separating the business logic 404 and the transport logic 406. Business logic 404 uses the interface provided by transport logic 406, or type specific logic 406, to send and receive data. These interfaces may specific to a data type either produced or consumed by business logic 404. In various embodiments, the improvement to coding efficiency may result in each portion of the architecture 400 (e.g., business logic 404, transport logic 406, etc.) being focused on a specific type of task (e.g., processing, communication, etc.).

Libraries 408 include different types of libraries such as primitive building blocks that perform simple functions and portable libraries that define different interfaces for transport logic 406. In various embodiments, libraries 408 may include the signal and protocol abstraction layer (SPAL) described above with respect to FIG. 3. In various embodiments, libraries 408 may include code and logic for interfacing with different transport protocols, such as for example, ethernet, Wi-Fi, Bluetooth, TCP/IP, etc. Libraries 408 provide reusable, portable code for use by transport logic 406. In various embodiments, libraries 408 may include type abstract logic that is configurable to perform different tasks. The type abstract logic may include primitive code blocks such as split, join, transform, and queue code blocks that each perform simple functions and can be linked together to perform complex tasks.

Referring now to FIG. 4B, executable network layer 420 may include a first executable 402*a*, a second executable 402*b*, and a third executable 402*c*. Executables 402*a*, 402*b*, 402*c* may be examples of architecture 400. First executable 402*a* may include an application entry point, as described above, a first business logic 404*a*, a first type specific logic 406*a*, a first type abstract logic 407*a*, and one or more libraries 408*a*. Second executable 402*b* may include an application entry point, as described above, a second business logic 404*b*, a second type specific logic 406*b*, a second type abstract logic 407*b*, and one or more libraries 408*b*. Third executable 402*c* may include an application entry point, as described above, a third business logic 404*c*, a third type specific logic 406*c*, a third type abstract logic 407*b*, and one or more libraries 408*c*.

In various embodiments, first executable 402*a* communicates with second executable 402*b* and third executable 402*c* via a communication bus 422. In various embodiments, communication bus 422 may be an example of first communication bus 326, second communication bus 328, or third communication bus 330 as described above with respect to FIG. 3. In various embodiments, communication bus 422 may be another type of communication bus. In various embodiments, first executable 402*a* may be configured to transmit data 424 to second executable 402*b* and third executable 402*c* over multi-cast. For example, first business logic 404*a* may send instructions to transmit data 424 to first type specific logic 406*a* using an API provided by first type specific logic 406*a*. First type specific logic 406*a* may then send instructions to transport library 408*a*, via first type abstract logic 407*a*, to transmit data 424 across communication bus 422. As will be described in further detail below, type first abstract logic 407*a* may be configurable code (e.g., including the primitive code blocks discussed above) that facilitates communication between type specific logic 406*a* and libraries 408*a*. In the present example, the first executable 402*a*, and more specifically, transport library 408*a* may transmit data 424 using an IP address and port (e.g., 10.10.10.1:4566).

Both second executable 402*b* and third executable 402*c* may be configured to listen to the specified IP address and port (e.g., 10.10.10.1:4566) for data being transmitted (e.g., via second transport library 408*b* and third transport library 408*c*). In the present example, second executable 402*b* and third executable 402*c*, and more specifically, transport library 408*b* and transport library 408*c* receive data 424 from communication bus 422. Transport library 408*b* transmits data 424 to second type specific logic 406*b*, via second type abstract logic 407*b*, which then transports data 424 to second business logic 404*b*. Similarly, transport library 408*c* transmits data 424 to third type specific logic 406*c*, via third type abstract logic 407*c*, which then transports data 424 to third business logic 404*c*.

Referring now to FIG. 4C, a first message 430 and a second message 432 are illustrated, in accordance with various embodiments. First message 430 and second message 432 may be examples of data 424. First message 430 and second message 432 illustrate how data types (i.e., first message 430 and second message 432) can have different syntax while being semantically similar. Generally, syntax may define the structure and/or layout of data. The structure may be simple such as a data type (e.g., int, long, double, etc.) or may be complex and based on a standard. Generally, semantics may define the meaning of a data type, and more specifically, each field within a syntax structure and what is represented. For example, distance may be defined both by syntax and semantics. A first distance may be represented in software as a type long and a second distance may be represented in software as a type float. That is, their syntax is different and the first distance and second distance are not interchangeable. However, semantically, first distance and second distance may refer to the same distance (e.g., from point A to point B). That is, the underlying meaning of the data is the same even though it is expressed differently.

In various embodiments, first message 430 and second message 432 may be used by an aircraft to provide information about the aircraft. First message 430, and more specifically a syntax of first message 430, is represented as a table including one or more rows and one or more columns. The syntax of first message 430 (e.g., the table) defines the structure used by first message 430. For example, each row of first message 430 corresponds to a field 430*a*-430*e* of first message 430 and each column corresponds to information within fields 430*a*-430*e*. As depicted, each field 430*a*-430*e* of first message 430 may include a name 434, a measurement 436 (e.g., value), a unit 438 (e.g., degrees, meters, Celsius, none, etc.), and a primitive 440 (e.g., int, long, double, char, float, etc.).

First field 430*a* has a name 434 of “id,” a measurement 436 of “count,” a unit 438 of “unitless,” and a primitive 440 of “unsigned long.” That is, first field 430*a* is a unitless count stored as an unsigned long that uniquely identifies first message 430. Second field 430*b* has a name 434 of “latitude,” a measurement 436 of the current latitude of the aircraft, a unit 438 of “degrees,” and a primitive 440 of "double." That is, second field 430*a* is the latitude of the aircraft measured in degrees and stored as a double type. Third field 430*c* has a name 434 of "longitude," a measurement 436 of the current longitude of the aircraft, a unit 438 of "degrees," and a primitive 440 of "double." That is, third field 430*c* is the longitude of the aircraft measured in degrees and stored as a double type. Fourth field 430*d* has a name 434 of "altitude," a measurement 436 of the current altitude of the aircraft, a unit 438 of "meters," and a primitive 440 of "double." That is, fourth field 430*d* is the altitude of the aircraft measured in meters and stored as a double. The fifth field 430*e* has a name 434 of "engine temp," a measurement 436 of the current engine temperature, a unit 438 of "degrees Celsius," and a primitive 440 of "float." That is, fifth field 430*e* is the engine temperature of the aircraft measured in degrees Celsius and stored as a float.

In various embodiments, first message 430 may be transmitted by first executable 402*a* described above with respect to FIG. 4B. Second executable 402*b* and third executable 402*c* may be configured to receive first message 430 as transmitted by first executable 402*a*. In various embodiments, second executable 402*b* and/or third executable 402*c* may be configured to receive a translated version of first message 430, such as for example, second message 432, described below.

The syntax of second message 432 is represented as a table including one or more rows and one or more columns. Each row of second message 432 corresponds to a field 432*a*-432*f* of second message 432 and each column corresponds to information within fields 432*a*-432*f*. As depicted, each field 432*a*-432*f* of second message 432 may include a name 434, a measurement 436 (e.g., value), a unit 438 (e.g., degrees, meters, Celsius, none, etc.), and a primitive 440 (e.g., int, long, double, char, float, etc.).

First field 432*a* has a name 434 of "id," a measurement 436 of "count," a unit 438 of "unitless," and a primitive 440 of "unsigned long." That is, first field 432*a* is a unitless count stored as an unsigned long that uniquely identifies second message 432. Second field 432*b* has a name 434 of "latitude," a measurement 436 of the current latitude of the aircraft, a unit 438 of "radians," and a primitive 440 of "double." That is, second field 432*a* is the latitude of the aircraft measured in radians and stored as a double type. Third field 432*c* has a name 434 of "longitude," a measurement 436 of the current longitude of the aircraft, a unit 438 of "radians," and a primitive 440 of "double." That is, third field 432*c* is the longitude of the aircraft measured in radians and stored as a double type. Fourth field 432*d* has a name 434 of "altitude," a measurement 436 of the current altitude of the aircraft, a unit 438 of "feet," and a primitive 440 of "double." That is, fourth field 432*d* is the altitude of the aircraft measured in feet and stored as a double. The fifth field 432*e* has a name 434 of "engine temp," a measurement 436 of the current engine temperature, a unit 438 of "degrees Fahrenheit," and a primitive 440 of "float." That is, fifth field 432*e* is the engine temperature of the aircraft measured in degrees Fahrenheit and stored as a float. The sixth field 432*f* has a name 434 of "air speed," a measurement 436 of the current airspeed of the aircraft, a unit 438 of "miles per hour," and a primitive 440 of "double."

While first message 430 and second message 432 include similar data (e.g., semantics), the units of measurement are different (e.g., syntax). Accordingly, the different applications (e.g., first executable 402*a* and second executable 402*b*) may utilize one data format or another data format. Returning to FIG. 4B, first executable 402*a* may transmit data 424 having a format of first message 430. Second executable 402*b* may receive data 424 having the format of first message 430 and second business logic 404*b* may convert the data from the format of first message 430 to the format of second message 432 for computations. This may occur, for example, when first executable 402*a* and second executable 402*b* are developed by different entities. Alternatively, this may occur when code is reused, such as for example, reusing second business logic 404*b*. In various embodiments, first executable 402*a* and second executable 402*b* may be running on the same aircraft. In various embodiments, first executable 402*a* and second executable 402*b* may be running on different aircraft. In various embodiments, first executable 402*a* may be running on an aircraft and second executable 402*b* may running at a base station.

It should be understood that while the example described herein relate to aircraft and measurements related to aircraft, the same principles may be used in other fields and processes. Other fields may include supply chain management, autonomous vehicles, spacecraft, internet of things applications, and smart devices, among others. As an example, a first controller for managing a cargo shipment may record and transmit weight, speed, temperature, and/or other data relating to the cargo a second controller. The data may be recorded and transmitted using imperial units (e.g., pounds, miles per hour, Fahrenheit, etc.). A second controller may be configured to process the data in metric units (e.g., kilograms, kilometers per hour, Celsius, etc.) A similar transformation to that described with respect to first message 430 and second message 432 may be used to convert the imperial units to metric units.

Figure 11A:
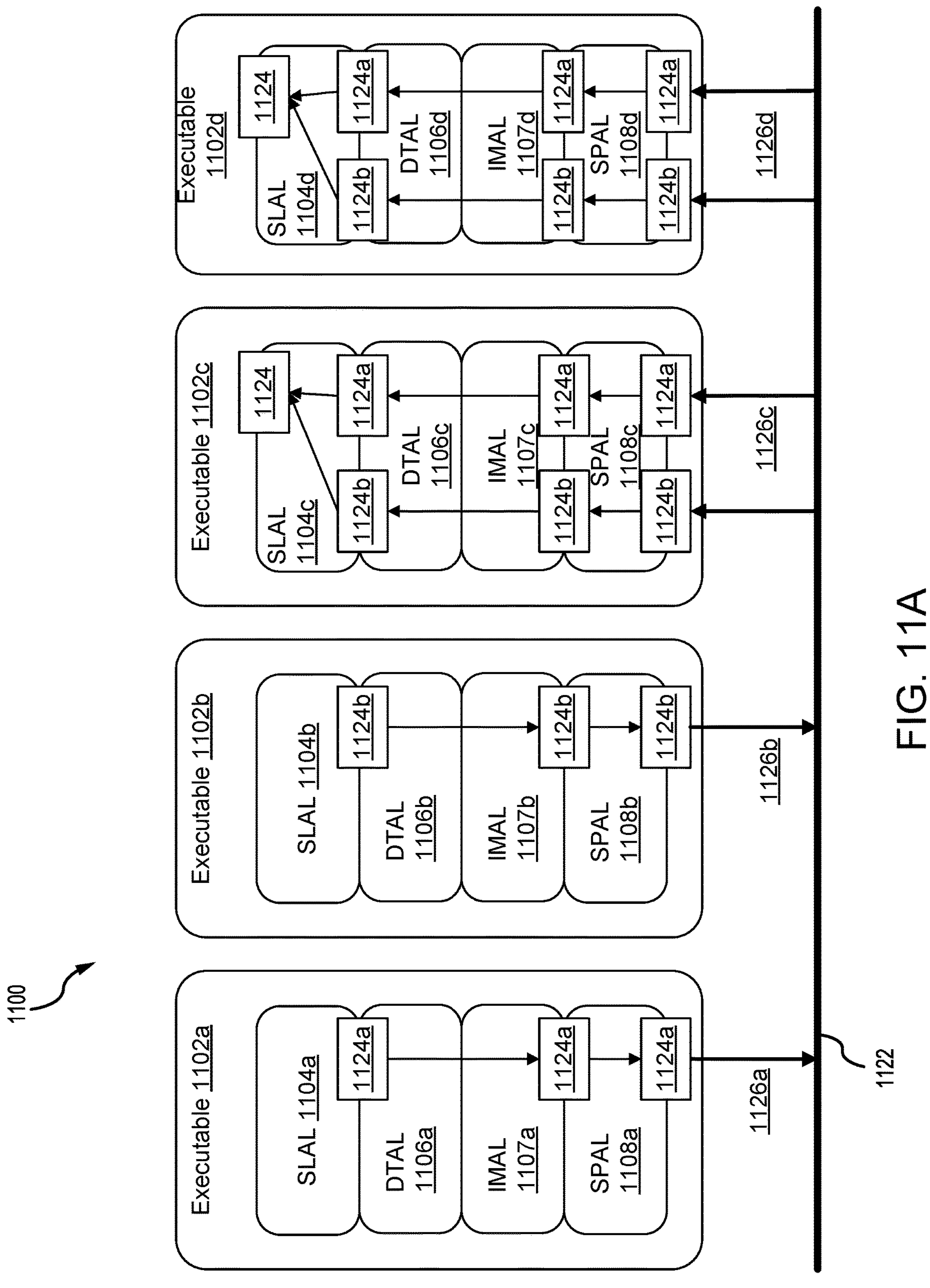
FIGS. 11A and 11B illustrate managing data redundancy in software architectures, in accordance with various embodiments.
Figure 11B:
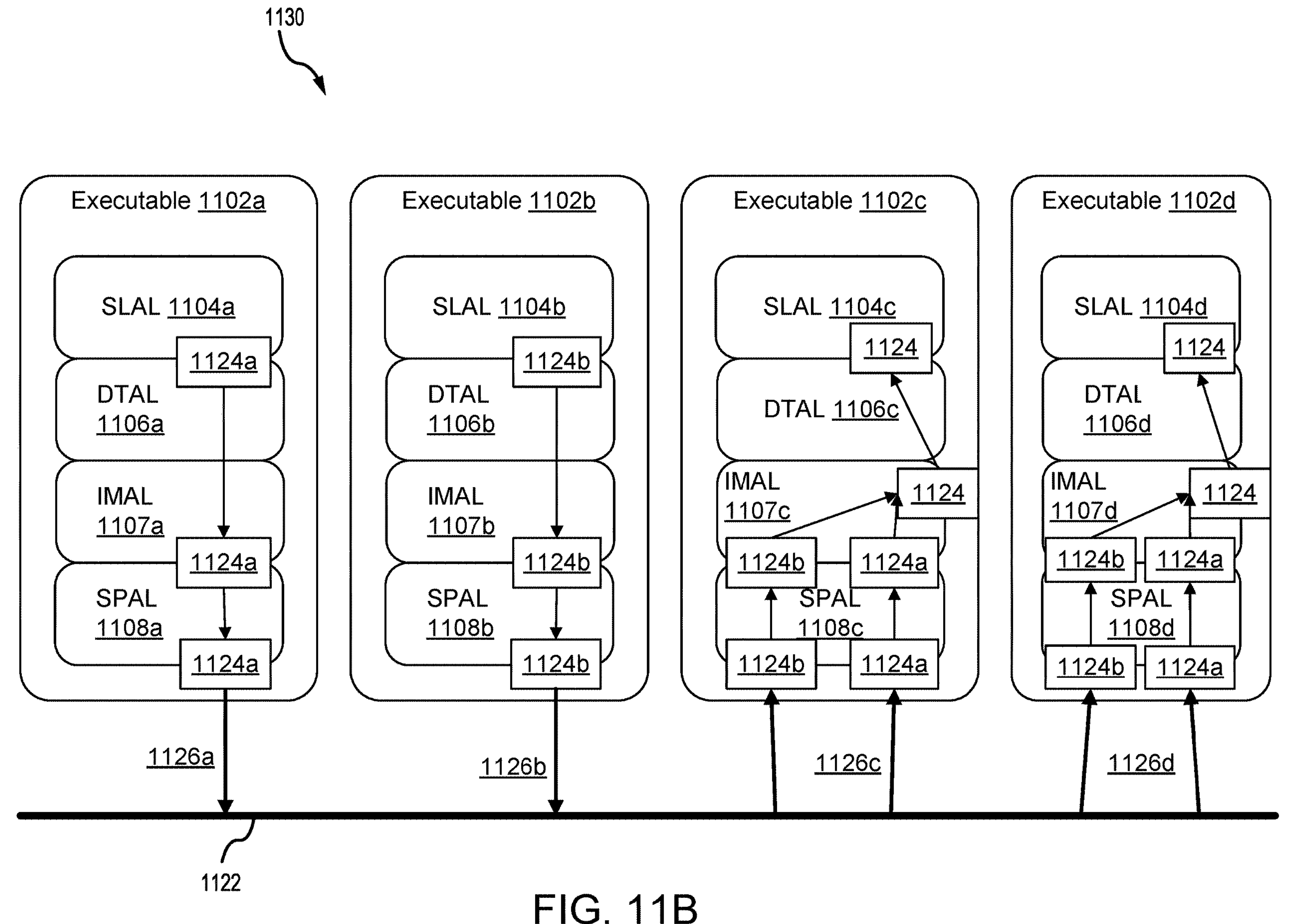

Referring now to FIGS. 11A-11B, a data model 1100 may be used to store the syntax and semantic information for data that is used within a system 1102. System 1102 includes a first executable 1104*a*, a second executable 1104*b*, a third executable 1104*c*, and a fourth executable 1104*d*. First executable 1104*a* produces and consumes a first message type 1106*a* including a first data type 1108*a*, a second data type 1108*b*, and a third data type 1108*c*. Second executable 1104*b* produces and consumes a second message type 1106*b* including first data type 1108*a*, second data type 1108*b*, third data type 1108*c*, and a fourth data type 1108*d*. Third executable 1104*c* produces and consumes a third message type 1006*c* including first data type 1008*a* and second data type 1008*b*. Fourth executable 1004*d* produces and consumes a fourth message type 1106*d* including third data type 1108*c*, first data type 1108*a*, and second data type 1108*b*. As illustrated in FIG. 11A, each message type 1106*a*-1106*d* has a different syntax, or structure, such that data types 1108*a*-1108*d* are arranged differently in each message type 1106*a*-1106*d*. Because of this, a transformation of data and/or message may be used for each executable 1104*a*-1104*d* to communicate with each other. FIG. 11A further illustrates lines linking equivalent data types 1108*a*-1108*d* between messages 1106*a*-1106*d* to show how interacts are managed between executables 1104*a*-1104*d*. That is, data field equivalencies are based on point-to-point definitions between each executable 1104*a*-1104*d*.

Referring now to FIG. 11B, System 1102 illustrates data model 1100 and data types 1108*a*-1108*d* stored within data model 1100. Data model 1100 may be a semantic data model that allows executables 1104*a*-11024 to infer data equivalencies from the modelled semantics. As illustrated in FIG. 11B, system 1102 includes executables 1104*a*-1104*d*, messages 1106*a*-1106*d*, and data types 1108*a*-1108*d*. However, instead of relying on point-to-point definitions to identify data equivalencies, which typically involves a user interaction, executables 1104*a*-1104*d* can infer data equivalencies from data model 1100. In this simple example, data model 1100 stores data 1110*a*-1110*d* that is used to form data types 1108*a*-1108*d*. Data model 1100 may be organized as an extensible markup language (XML) file, a relational database, or a no-SQL database, among others. In various embodiments, data model 1100 may be a hyper-graph having multiple connections between each point of data such that there are multiple layers of relationship for all data within data model 1100.

In various embodiments, data model 1100 may include a platform data model 1130 which may be the syntax information for the data used by a specific message (e.g., message 1106*a*-1006*d*) or executable (e.g., executable 1104*a*-1104*d*).

For example, first executable 1104*a* may send/receive a distance from a first point that is measured in miles. Second executable 1104*b* may send/receive the distance from the first point that is measured in kilometers. First executable 1104*a* uses data model 1100 to identify the data transformations for communication with second executable 1104*b*. At platform data model 1130, data model 1100 determines that the distance includes a value and a unit of measurement, specifically miles. At a logical data model, data model 1100 determines that the miles unit of measurement can be converted to kilometers. Data model 1100 may then return this information, specifically, that a conversion from miles to kilometers should be used to convert the data from second executable 1104*b* to first executable 1104*a*.

In another example, first executable 1104*a* may send/receive a first distance from the first point that is measured in miles. Second executable 1104*b* may send/receive a second distance from a second point that is measured in kilometers. First executable 1104*a* uses data model 1100 to identify the data transformations for communication with second executable 1104*b*. At platform data model 1130, data model 1100 determines that the distance includes a reference point, a value, and a unit of measurement, specifically miles. The first point may be a location on the street and the second point may be the location of the entrance door. Data model 1100 may then return this information to first executable 1104*a*. Knowing that both distances refer to the same concept, but reference different specific points, allows first executable 1104*a* to perform transformations on data received from executable 1104*b* and work with the data in an expected way.

As described above, through the use of examples, data model 1100 provides a mechanism through which data equivalencies may be identified and transformations between data types for equivalent data may be found. This allows executables to be dynamically configured to send and receive data and messages based on providers and consumers already existing within the network. In various embodiments, data model 1100 may be queried to determine the data types used by a specific device and use that information to communicate with the specific device. In various embodiments, data model may be queried for specific data types and use that information to find the devices that provide the specific data type. The semantic data model 1100 provides for improved communications across devices and dynamic reconfiguration of currently deployed devices.

Figure 12A:
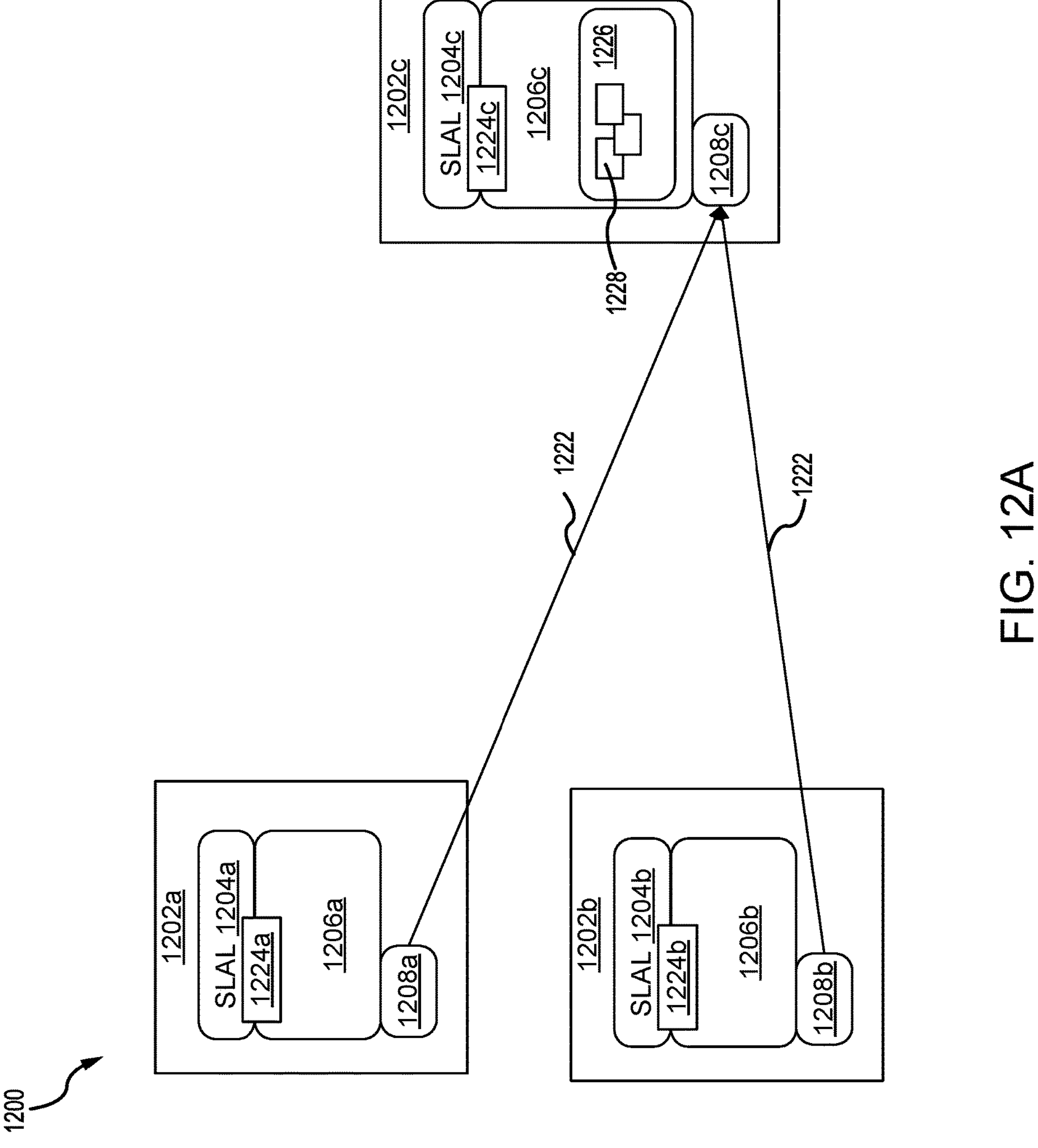
FIGS. 12A, 12B, 12C, and 12D illustrate connection diagrams implementing software architectures, in accordance with various embodiments.
Figure 12B:
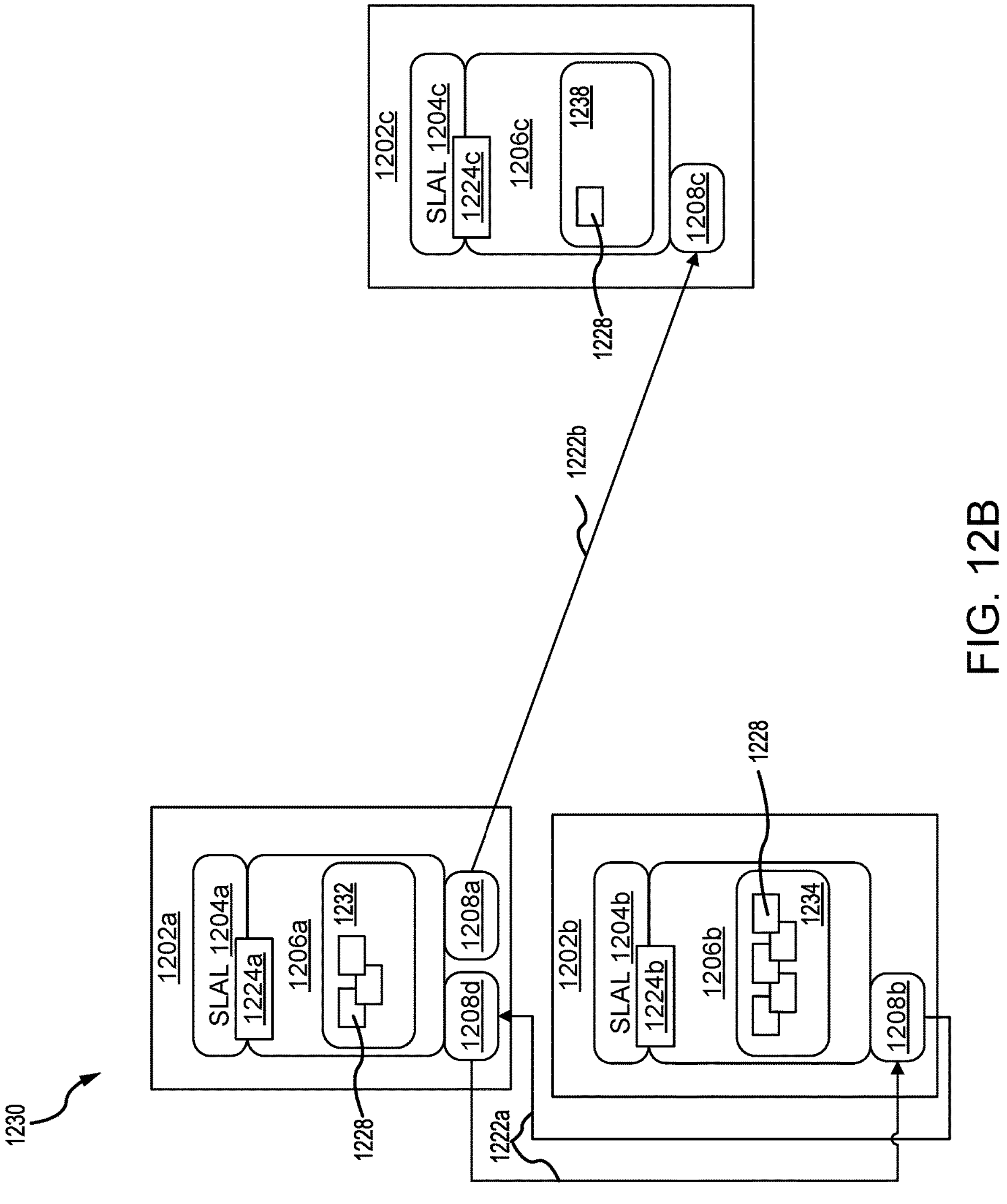

Referring now to FIGS. 12A and 12B, primitive code blocks are illustrated, in accordance with various embodiments. FIG. 12A illustrates a single primitive code block 1200 that may perform simple tasks such as filter, split, join, transform, and queue tasks. In various embodiments, each task may be made more complex. As an example, transform may transform a distance from miles to kilometers, Fahrenheit to Celsius, or seconds since an epoch to a date, to name a few examples. In some examples, a general transform block may be generated that can be configured to perform these basic transformations without using separate blocks. In some examples, a transform block may transform a message (e.g., first message 430) to a different message (e.g., second message 432). It can then be appreciated that multiple primitive code blocks 1200 can be linked together to accomplish complex tasks.

Primitive code block 1200 further includes a plurality of input ports 1202 and a plurality of output ports 1204. Each of the plurality of input ports 1202 may act as either a push input or a pull input to interact with other primitive code blocks in a link of primitive code blocks. A push input receives input from a preceding primitive code block. A pull input is triggered by an event such as a timer or data being pulled from the primitive code block. A push output passes data received by one of the plurality of inputs to a subsequent primitive code block. A pull output does not provide output until polled by a subsequent primitive code block.

Combining a push input and a pull output creates a buffer block that desynchronizes the process flow as data is received automatically by the push input, a task may be performed on the data, but the data is not sent by the output until requested. Combining a pull input and a pull output creates a primitive code block that pulls data from a preceding primitive code block in response to being polled for data by a subsequent primitive code block. A task may be performed on the data while waiting for the output to be pulled again. Combining a push input and a push output creates a primitive code block that receives data, performs a task, and outputs data. Combining a pull input and a push output creates a primitive code block that is triggered by an event (e.g., a timer) and not by data flow.

Referring now to FIG. 12B, a system 1250 including multiple primitive control blocks 1200 is illustrated in accordance with various embodiments. System 1250 includes a data source 1252, a first filter block 1200*a*, a second filter block 1200*b*, a first transform block 1200*c*, a second transform block 1200*d*, a first data sink 1254*a*, and a second data sink 1254*b*. Data source 1252 provides a data output to first filter block 1200*a* and second filter block 1200*b*. First filter block 1200*a* may determine whether the data is an air speed. If first filter block 1200*a* determines that the data is an air speed, first filter block 1200*a* outputs the data to first transform block 1200*c*. Otherwise, first filter block 1200*a* discards the data. Second filter block 1200*b* may determine whether the data is a ground speed. If second filter block 1200*b* determines that the data is a ground speed, second filter block 1200*b* outputs the data to second transform block 1200*d*. Otherwise, second filter block 1200*b* discards the data.

It can therefore be appreciated, that tens, hundreds, thousands, or more of the primitive code blocks 1200 can be linked together to form complex tasks similar to how a basic set of machine code commands can be linked together to form complex programs. The primitive code blocks 1200 make up a core set of libraries that may be used by type abstract logic 407 described above with respect to FIG. 4B. The primitive code blocks 1200 can be dynamically reconfigured based on information received from data model 1100. As will be described in further detail below, this allows code to be more adaptable by reconfiguring the type abstract logic, and more specifically, the primitive code blocks that make up the type abstract logic without recompiling and redeploying software. By combining primitive code blocks 1200 with data model 1100, a smart infrastructure can be developed that allows devices (e.g., internet of things devices) to communicate with each other and the data model and determine data communication. The data communication includes what to communicate, how to communicate, and with whom to communicate, among others.

Figures 5A, 5B:
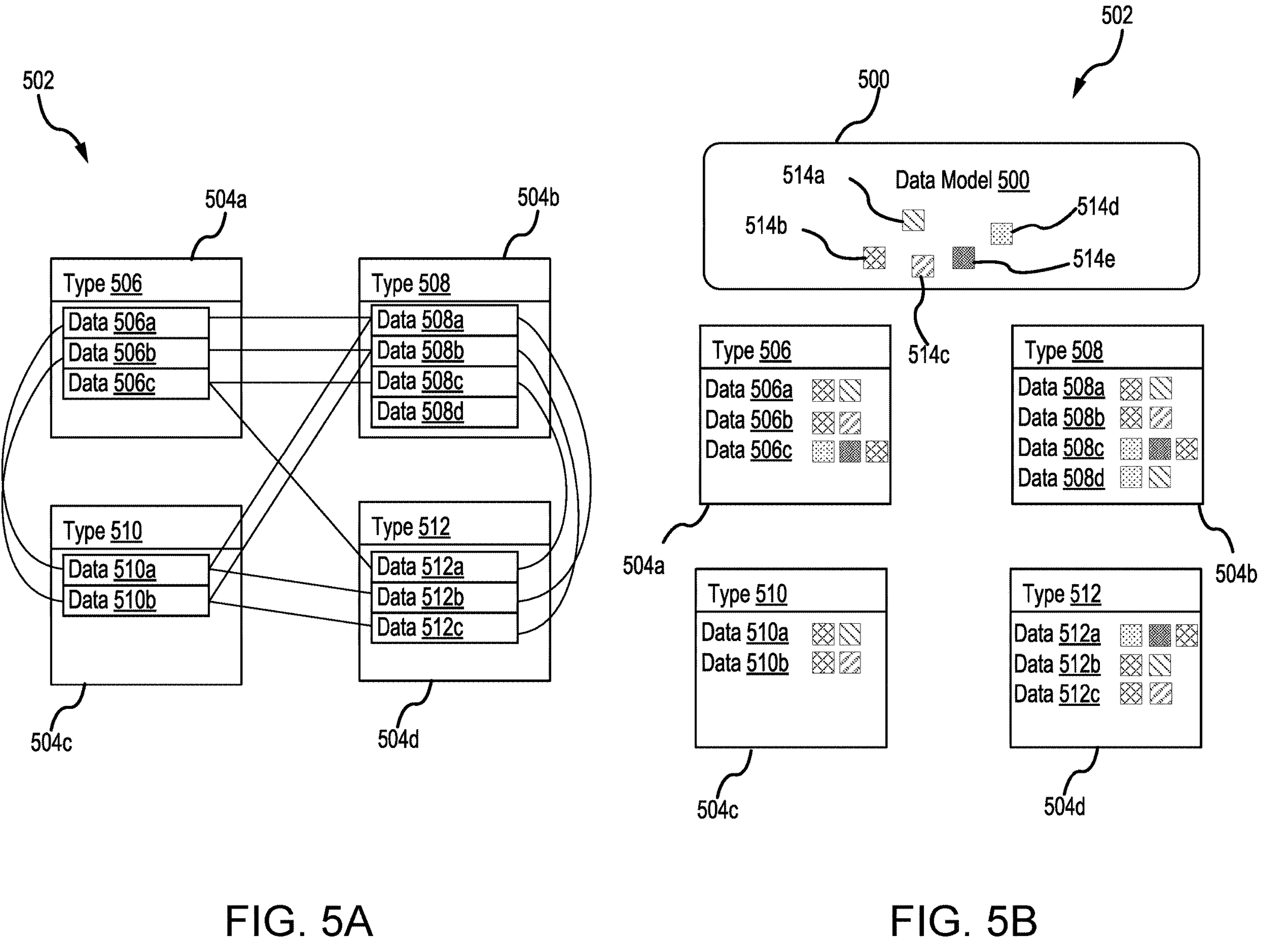
FIGS. 5A, 5B, and 5C illustrate a data model and uses thereof in software systems, in accordance with various embodiments.
Figure 5C:
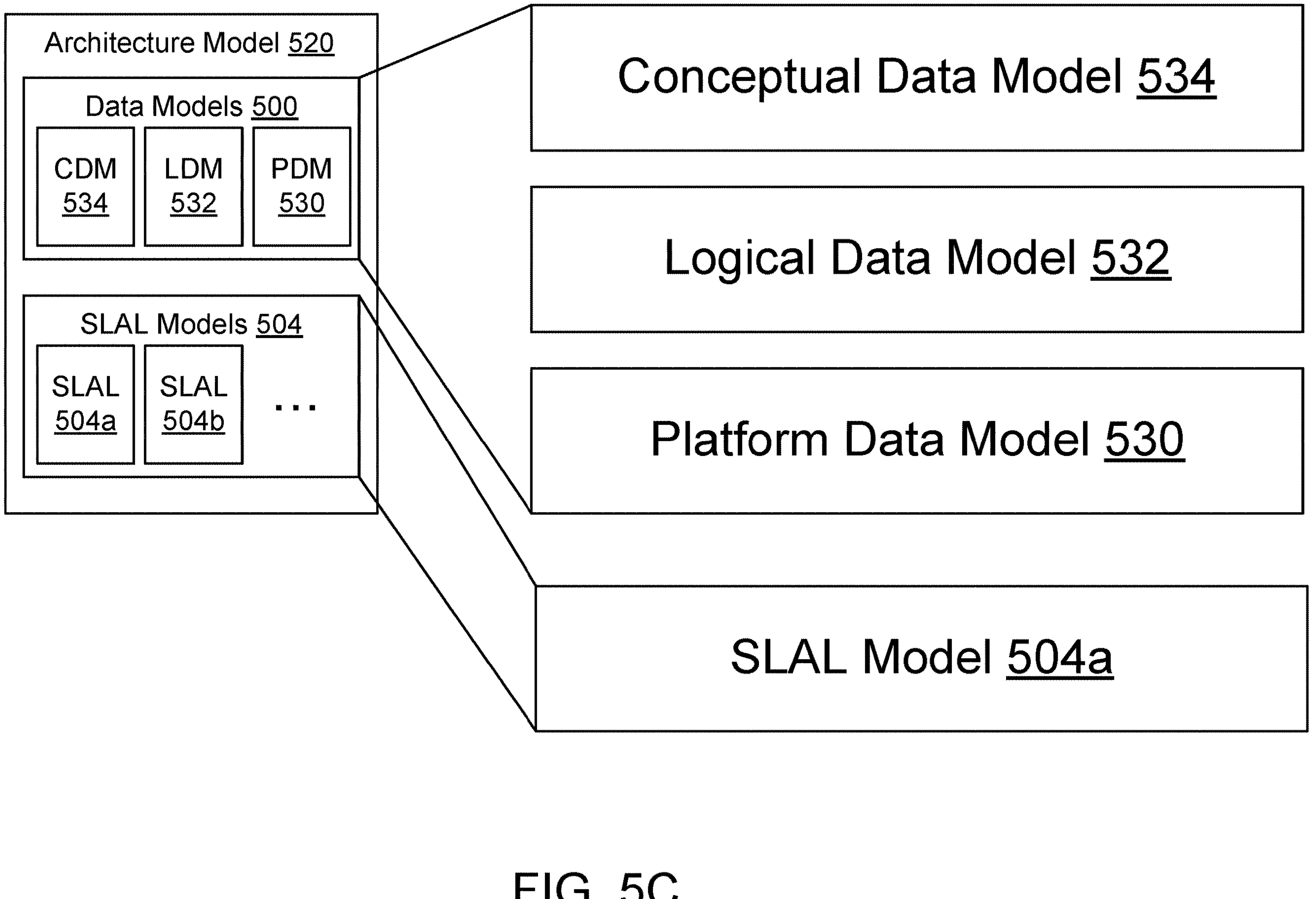

Referring now to FIGS. 5A-5C, a data model 500 may be used to store the syntax and semantic information for data that is used within a system 502. System 502 includes a first executable 504*a*, a second executable 504*b*, a third executable 504*c*, and a fourth executable 504*d*. First executable 504*a* produces and consumes a first message type 506 that includes a first data type 506*a*, a second data type 506*b*, and a third data type 506*c*. Second executable 504*b* produces and consumes a second message type 508 that includes a first data type 508*a*, a second data type 508*b*, a third data type 508*c*, and a fourth data type 508*d*. Third executable 504*c* produces and consumes a third message type 510 that includes a first data type 510*a* and a second data type 510*b*. Fourth executable 504*d* produces and consumes a fourth message type 512 that includes a first data type 512*a*, a second data type 512*b*, and a third data type 512*c*. As illustrated in FIG. 5A, each message type 506, 508, 510, 512 has a different syntax, or structure, that, in various embodiments, may include different data (e.g., 506*a-c*, 508*a-d*, 510*a-b*, 512*a-c*) and the data may be in different positions in each message. However, the data in each message type 506, 508, 510, 512 may be correlated to, or equivalent to, the data in each other message type. Because of this, a transformation of data and/or message may be used for each executable 504*a*-504*d* to communicate with each other. FIG. 5A further illustrates lines linking equivalent data (e.g., 506*a-c*, 508*a-d*, 510*a-b*, 512*a-c*) between messages types 506, 508, 510, 512 to show how interactions between the data are managed between executables 504*a*-504*d*. That is, data field equivalencies are based on point-to-point definitions between each executable 504*a*-504*d*.

Referring now to FIG. 5B, System 502 illustrates data model 500 and data 514*a*, 514*b*, 514*c*, 514*c* stored within data model 500. Data model 500 may be a semantic data model that allows executables 504*a*-504*d* to infer data equivalencies from the modelled semantics of the data. As illustrated in FIG. 5B, system 502 includes executables 504*a*-504*d*, messages 506, 508, 510, 512, and data 506*a-c*, 508*a-d*, 510*a-b*, 512*a-c*. However, instead of relying on point-to-point definitions to identify data equivalencies, which typically involves a user interaction, executables 504*a*-504*d* can infer data equivalencies from data model 500. In this simple example, data model 500 stores data 510*a*-510*d* that is used to form data types 506*a-c*, 508*a-d*, 510*a-b*, 512*a-c*. Data model 500 may be organized as an extensible markup language (XML) file, a relational database, or a no-SQL database, among others. In various embodiments, data model 500 may be a hyper-graph having multiple connections between each point of data such that there are multiple layers of relationship for all data within data model 500.

Referring now to FIG. 5C, an architecture model 520 including data model 500 and executables 504 are illustrated, in accordance with various embodiments. Architecture model 520 illustrates a how applications (e.g., executable 504*a*-504*d*) use data model 500 to dynamically identify data equivalencies between executables 504, messages 506*a*-506*d*, and data types 508*a*-508*d*. In various embodiments, data model 500 may include a platform data model 530, a logical data model 532, and a conceptual data model 534. Platform data model 530 may be the syntax information for the data used by a specific message (e.g., message 506*a*-506*d*) or executable (e.g., executable 504*a*-504*d*). Logical data model 532 may separate the data (e.g., 508*a*-508*d*), units of the data, and/or definitions of the data from the message and/or executable. Conceptual data model 534 may provide the underlying, or semantic, meaning of the data so that the equivalencies between data can be identified.

For example, first executable 504*a* may send/receive a distance from a first point that is measured in miles. Second executable 504*b* may send/receive the distance from the first point that is measured in kilometers. As illustrated in FIG. 5C, first executable 504*a* uses data model 500 to identify the data transformations for communication with second executable 504*b*. At platform data model 530, data model 500 determines that the distance includes a value and a unit of measurement, specifically miles. At logical data model 532, data model 500 determines that the miles unit of measurement can be converted to kilometers. Data model 500 may then return this information, specifically, that a conversion from miles to kilometers should be used to convert the data from second executable 504*b* to first executable 504*a*.

In another example, first executable 504*a* may send/receive a first distance from the first point that is measured in miles. Second executable 504*b* may send/receive a second distance from a second point that is measured in kilometers. As illustrated in FIG. 5C, first executable 504*a* uses data model 500 to identify the data transformations for communication with second executable 504*b*. At platform data model 530, data model 500 determines that the distance includes a reference point, a value, and a unit of measurement, specifically miles. At logical data model 532, data model 500 determines that the miles unit of measurement can be converted to kilometers. At conceptual data model 534, data model 500 determines that the distance information refers to the similar information, such as a street address of a business. The first point may be a location on the street and the second point may be the location of the entrance door. Data model 500 may then return this information to first executable 504*a*. Knowing that both distances refer to the same concept, but reference different specific points, allows first executable 504*a* to perform transformations on data received from executable 504*b* and work with the data in an expected way.

As described above, through the use of examples, data model 500 provides a mechanism through which data equivalencies may be identified and transformations between data types for equivalent data may be found. This allows executables to be dynamically configured to send and receive data and messages based on providers and consumers already existing within the network. In various embodiments, data model 500 may be queried to determine the data types used by a specific device and use that information to communicate with the specific device. In various embodiments, data model may be queried for specific data types and use that information to find the devices that provide the specific data type. The semantic data model 500 provides for improved communications across devices and dynamic reconfiguration of currently deployed devices.

Figure 6A:
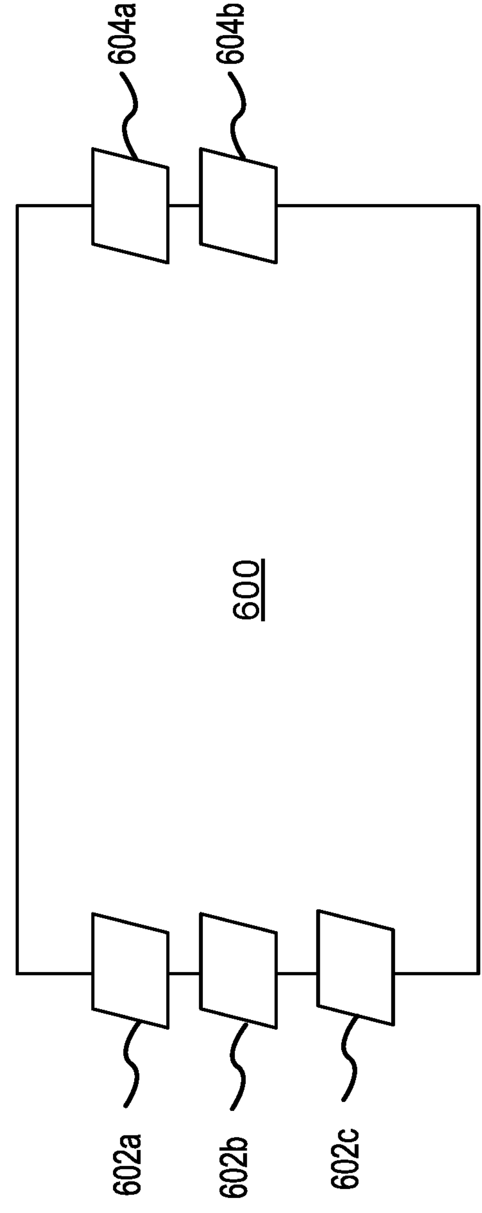
FIGS. 6A and 6B illustrate primitive software building blocks for use in a dynamically reconfigurable system, in accordance with various embodiments.
Figure 6B:
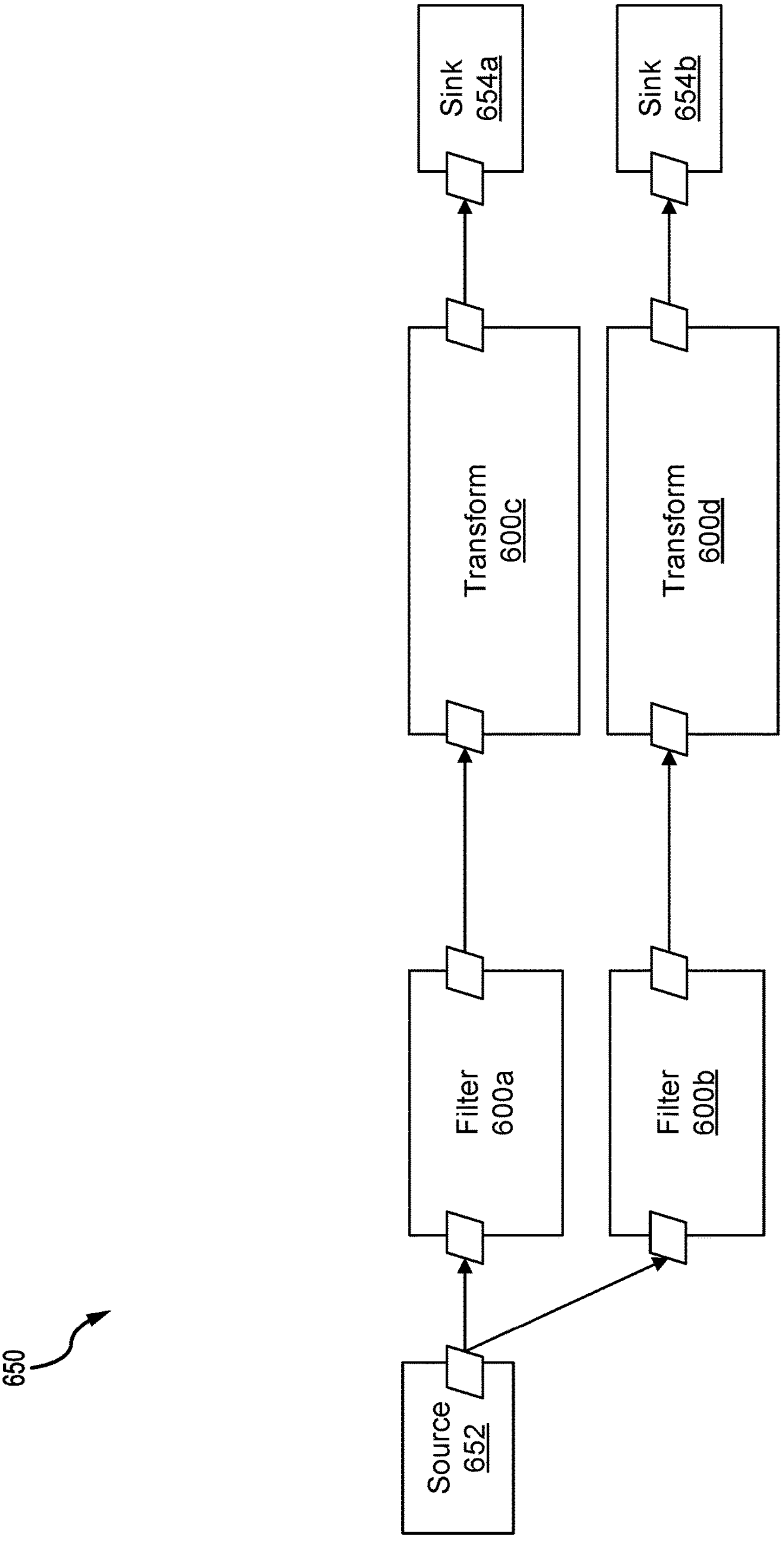

Referring now to FIGS. 6A and 6B, primitive code blocks are illustrated, in accordance with various embodiments. FIG. 6A illustrates a single primitive code block 600 that may perform simple tasks such as filter, split, join, transform, and queue tasks. In various embodiments, each task may be made more complex. As an example, transform may transform a distance from miles to kilometers, Fahrenheit to Celsius, or seconds since an epoch to a date, to name a few examples. In some examples, a general transform block may be generated that can be configured to perform these basic transformations without using separate blocks. In some examples, a transform block may transform a message (e.g., first message 430) to a different message (e.g., second message 432). It can then be appreciated that multiple primitive code blocks 600 can be linked together to accomplish complex tasks.

Primitive code block 600 further includes a plurality of input ports 602 and a plurality of output ports 604. Each of the plurality of input ports 602 may act as either a push input or a pull input to interact with other primitive code blocks in a link of primitive code blocks. A push input receives input from a preceding primitive code block. A pull input is triggered by an event such as a timer or data being pulled from the primitive code block. A push output passes data received by one of the plurality of inputs to a subsequent primitive code block. A pull output does not provide output until polled by a subsequent primitive code block.

Combining a push input and a pull output creates a buffer block that desynchronizes the process flow as data is received automatically by the push input, a task may be performed on the data, but the data is not sent by the output until requested. Combining a pull input and a pull output creates a primitive code block that pulls data from a preceding primitive code block in response to being polled for data by a subsequent primitive code block. A task may be performed on the data while waiting for the output to be pulled again. Combining a push input and a push output creates a primitive code block that receives data, performs a task, and outputs data. Combining a pull input and a push output creates a primitive code block that is triggered by an event (e.g., a timer) and not by data flow.

Referring now to FIG. 6B, a system 650 including multiple primitive control blocks 600 is illustrated in accordance with various embodiments. System 650 includes a data source 652, a first filter block 600*a*, a second filter block 600*b*, a first transform block 600*c*, a second transform block 600*d*, a first data sink 654*a*, and a second data sink 654*b*. Data source 652 provides a data output to first filter block 600*a* and second filter block 600*b*. First filter block 600*a* may determine whether the data is an air speed. If first filter block 600*a* determines that the data is an air speed, first filter block 600*a* outputs the data to first transform block 600*c*. Otherwise, first filter block 600*a* discards the data. Second filter block 600*b* may determine whether the data is a ground speed. If second filter block 600*b* determines that the data is a ground speed, second filter block 600*b* outputs the data to second transform block 600*d*. Otherwise, second filter block 600*b* discards the data.

It can therefore be appreciated, that tens, hundreds, thousands, or more of the primitive code blocks 600 can be linked together to form complex tasks similar to how a basic set of machine code commands can be linked together to form complex programs. The primitive code blocks 600 make up a core set of libraries that may be used by type abstract logic 407 described above with respect to FIG. 4B. The primitive code blocks 600 can be dynamically reconfigured based on information received from data model 500. As will be described in further detail below, this allows code to be more adaptable by reconfiguring the type abstract logic, and more specifically, the primitive code blocks that make up the type abstract logic without recompiling and redeploying software. By combining primitive code blocks 600 with data model 500, a smart infrastructure can be developed that allows devices (e.g., internet of things devices) to communicate with each other and the data model and determine data communication. The data communication includes what to communicate, how to communicate, and with whom to communicate, among others.

Figure 7A:
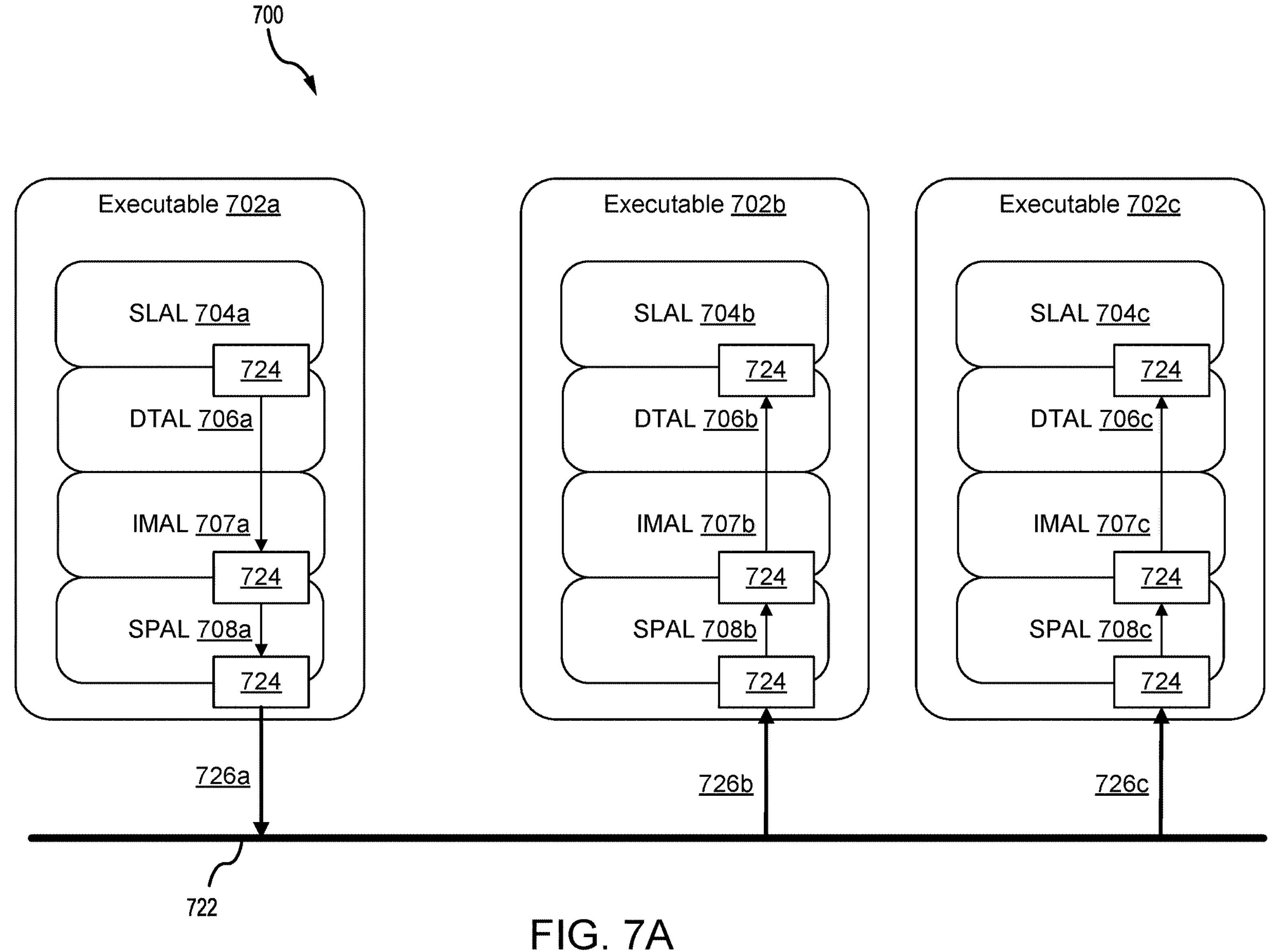
FIGS. 7A and 7B illustrate communication configurations for software architectures, in accordance with various embodiments.
Figure 7B:
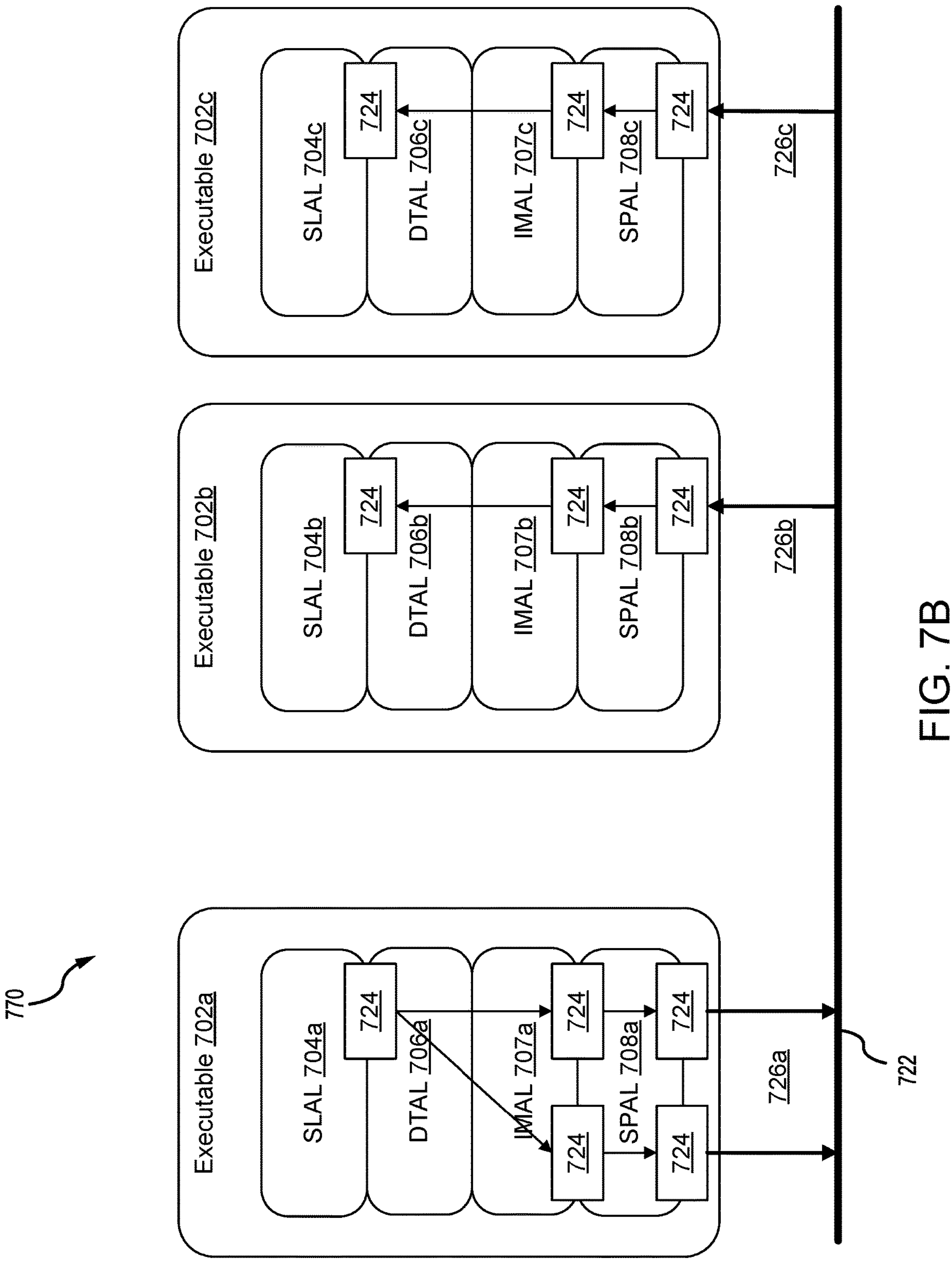

Referring now to FIGS. 7A and 7B, a multicast configuration 700 and a multicast configuration 750 are illustrated in accordance with various embodiments. Similar to executable network layer 420 (described above with respect to FIG. 4B), multicast configuration 700 may include a first executable 702*a*, a second executable 702*b*, and a third executable 702*c*. Executables 702*a*, 702*b*, 702*c* may be an example of architecture 400, described above with respect to FIG. 4A. First executable 702*a* may include an application entry point, as described above, a first business logic 704*a*, a first type specific logic 706*a*, a first type abstract logic 707*a*, and one or more libraries 708*a*. Second executable 702*b* may include an application entry point, as described above, a second business logic 704*b*, a second type specific logic 706*b*, a second type abstract logic 707*b*, and one or more libraries 708*b*. Third executable 702*c* may include an application entry point, as described above, a third business logic 704*c*, a third type specific logic 706*c*, a second type abstract logic 707*c*, and one or more libraries 708*c*.

First executable 702*a* communicates with second application 702*b* and third executable 702*c* via a communication bus 722. In various embodiments, communication bus 722 may be an example of first communication bus 326, second communication bus 328, or third communication bus 330 as described above with respect to FIG. 3. In various embodiments, communication bus 722 may be another type of communication bus. In various embodiments, first executable 702*a* may be configured to transmit data 724 to second application 702*b* and third executable 702*c* over multi-cast. In various embodiments, first executable 702*a* may determine to transmit data 724 to second and third executables 702*b*, 702*c* based on information received from a data model (e.g., data model 500). For example, first business logic 704*a* may send instructions to transmit data 724 to first type specific logic 704*a* using an API provided by first type specific logic 704*a*. That is, first type specific logic 704*a* includes a type specific API to communicate with first business logic 704*a*. First type specific logic 704*a* may then send instructions through type abstract logic 707*a* to transport library 708*a* to transmit data 724 across communication bus 722. That is, type abstract logic 707*a* may perform a transformation on the data prior to sending to transport library 708*a*. In this example, no transformation is performed by type abstract logic 707*a*. In the present example, the first executable 702*a*, and more specifically, transport library 708*a* may transmit data 724 using an IP address and port (e.g., 10.10.10.1:4566).

Both second application 702*b* and third executable 702*c* may be configured to listen to the specified IP address and port (e.g., 10.10.10.1:4566) for data being transmitted. In the present example, second application 702*b* and third executable 702*c*, and more specifically, transport library 708*b* and transport library 708*c* receive data 724 from communication bus 722. Transport library 708*b* transmits data 724 to second type abstract logic 707*b* which then transmits data 724 to second type specific logic 706*b* which then transports data 724 to second business logic 704*b*. Similarly, transport library 708*c* transmits data 724 through second type abstract logic 707*a* to second type specific logic 706*c* which then transports data 724 to second business logic 704*b*.

Each executable 702*a*, 702*b*, 702*c* in multicast configuration 700 further may include a configuration file 726*a*, 726*b*, 726*c*. Configuration files 726*a*, 726*b*, 726*c* include information defining connections between different components (e.g., business logic, transport logic, application, etc.), data type semantics, data type syntax, and data transformations, among others. In various embodiments, configuration files 726*a*, 726*b*, 726*c* may be built for each executable 702*a*, 702*b*, 702*c* based on information received from the data model (e.g., data model 500). In the depicted embodiment, configuration files 726*a*, 726*b*, 726*c* may be updated without recompiling executables 702*a*, 702*b*, 702*c*. That is, type abstract logic 707*a*, 707*b*, 707*c* and libraries 708*a*, 708*b*, 708*c* can be dynamically updated by in response to an update of configuration file 726*a*, 726*b*, 726*c*. Similarly, configuration files 726*a*, 726*b*, 726*c* can be dynamically updated based on a response to a query to data model 500. For example, the specified IP address and port may be changed from 10.10.10.1:4566 to 10.10.1.1:7200 by modifying configuration files 726*a*, 726*b*, 726*c* and restarting executables 702*a*, 702*b*, 702*c*. In various embodiments, configurations may be updated without restarting executables 702*a*, 702*b*, 702*c*.

Referring now to FIG. 7B, multicast configuration 750 may include first executable 702*a*, second executable 702*b*, and third executable 702*c* as previously described. Multicast configuration 750 depicts an embodiment in which first executable 702*a* is configured to transmit data 724 to two separate IP address/port on communication bus 722. Generally, business logic 704*a* is modified to transmit data 724 to a second IP address/port. Such changes would be followed by compiling executable 702*a* and re-deploying executable 702*a*. However, by using transport logic 706*a*, libraries 708*a*, and a configuration file, the change to add a second transmission IP address/port can be accomplished by editing the configuration file with no change to the source code of business logic 704*a*.

As an example, configuration file 726*a* may be modified to identify a first IP address/port (e.g., 10.10.10.1:4566) and a second IP address/port (e.g., 10.10.1.1:4500). Without recompiling and re-deploying application 702*a*, type abstract logic 707*a* is reconfigured to identify two distinct destinations for data 724. Accordingly, type abstract logic 707*a* receives data 724 from type specific logic 706*a* and sends instructions to transport library 708*a* to send data 724 to the first IP address/port and the second IP address/port. In this example, second application 702*b* is configured to receive data 724 on first IP address/port (e.g., 10.10.10.1:4566) and third executable 702*c* is configured to receive data 724 on second IP address/port (e.g., 10.10.1.1:4500). Configuration file 726*b* and configuration file 726*c* identify first IP address/port and second IP address/port, respectively. Accordingly, network configurations and topologies can be dynamically modified by changing a configuration file (e.g., configuration file 726*a*, 726*b*, 726*c*) providing quick changes to deployed systems without changing source code in an application. Changes to the configuration files may be based on information received from data model 500. Additionally, while FIGS. 7A and 7B illustrate a small scale change, including three applications, these changes may be made on a large scale including thousands or millions of applications, controllers, and/or systems.

Figure 8:
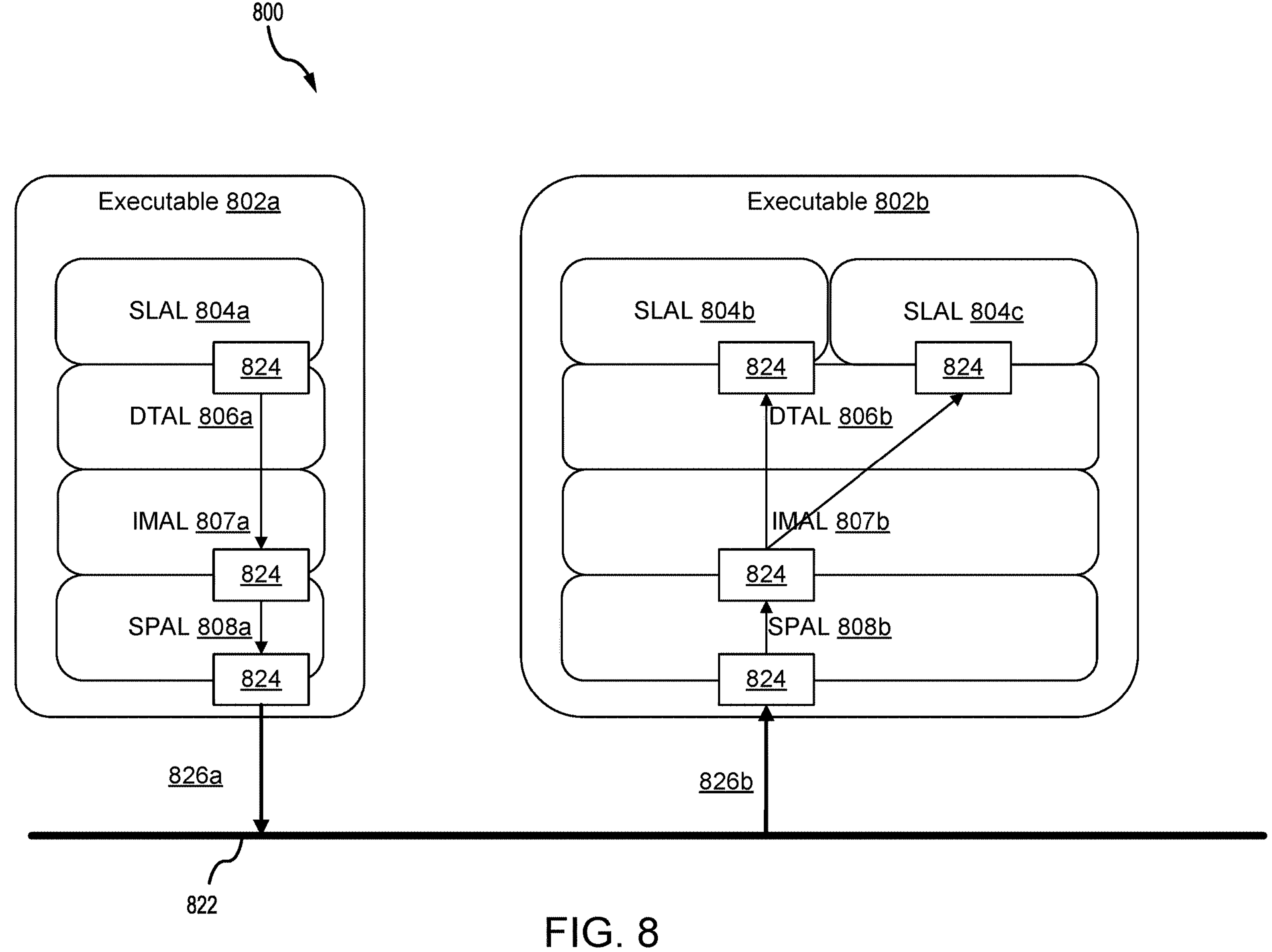
FIG. 8 illustrates software deployment configurations for software architectures, in accordance with various embodiments.

Referring now to FIG. 8, a deployment change 800 is illustrated in accordance with various embodiments. Deployment change 800 may include a first executable 802*a* and a second executable 802*b*, first executable 802*a* may include business logic 804*a*, type specific logic 806*a*, type abstract logic 807*a*, libraries 808*a*, and a configuration file 826*a*. First executable 802*a* is configured to transmit data 824 to second executable 802*b* on communication bus 822. Configuration file 826*a* defines an IP address/port (e.g., 10.10.10.1:4566) combination on which first executable 802*a* transmits data 826.

Second executable 802*b* may include business logic 804*b*, business logic 804*c*, type specific logic 806*b*, type abstract logic 807*b*, libraries 808*b*, and a configuration file 826*b*. Second executable 802*b* is configured to receive data 826 from first executable 802*a* on communication bus 822. In the depicted embodiment, second executable 802*b* may include two business logics, business logic 804*b* and business logic 804*c*. In various embodiments, business logic 804*b* may be the same as business logic 704*b* and business logic 804*c* may be the same as business logic 704*c*, as described above with respect to FIGS. 7A and 7B. However, instead of compiling and deploying two applications (i.e., second application 702*b* and third executable 702*c*), a single application is compiled and deployed (i.e., second executable 802*b*).

Configuration file 826*b* defines the IP address/port (e.g., 10.10.10.1:4566) on which data (e.g., data 824) will be received by second executable 802*b*. Configuration file 826*b* further defines the connections between type specific logic 806*b*, type abstract logic 807*b*, business logic 804*b*, and business logic 804*c*. As illustrated, type abstract logic 807*b* provides a copy of data 824 to both business logic 804*b* and business logic 804*c* through type specific logic 806*b*.

This change is achieved through a combination of a change in source code and a change in configuration file. The application entry point of second executable 802*b* may be changed to identify the inclusion of both business logic 804*b* and business logic 804*c* in second executable 802*b*. However, the code of business logic 804*b* and business logic 804*c* is not changed. That is, by changing configuration file 826*b* and a minor change to the source code of second executable 802*b*, second executable 802*b* may include both business logic 804*b* and 804*c* and data 824 is routed to the correct business logic (i.e., 804*b* and 804*c*). In various embodiments, the change to configuration file 826*b* may be made dynamically and in response to information from data model 500.

As described, and illustrated, deployment change 800 improves the reusability of source code (e.g., business logic 804*b*, 804*c*) while simplifying the integration of different blocks of code into one or more applications with little to no coding on the part of the integrator. By removing the entry point of executable 802*b* from business logic 804*b*, as previously described above with respect to FIG. 4A, executable 802*b* may incorporate business logic 804*c* with minor code changes. While described herein as including two modules (i.e., business logic 804*b* and business logic 804*c*), it will be appreciated by one skilled in the art that more business logic modules may be incorporated into application 802*b* using small modifications of the entry point of executable 802*b*. Furthermore, it will be appreciated that by simplifying the addition of business logic modules, each business logic module (e.g., 804*a*, 804, 804*c*) may be simplified to perform fewer tasks. Reducing the number of tasks performs further improves portability and maintainability of the source code. By using type specific logic (e.g., 806*b*), type abstract logic (e.g., 807*b*), libraries (e.g., 808*b*), and configuration files (e.g., 826*b*), systems can be scaled and modified to meet current and future software deployment needs.

Figure 9A:
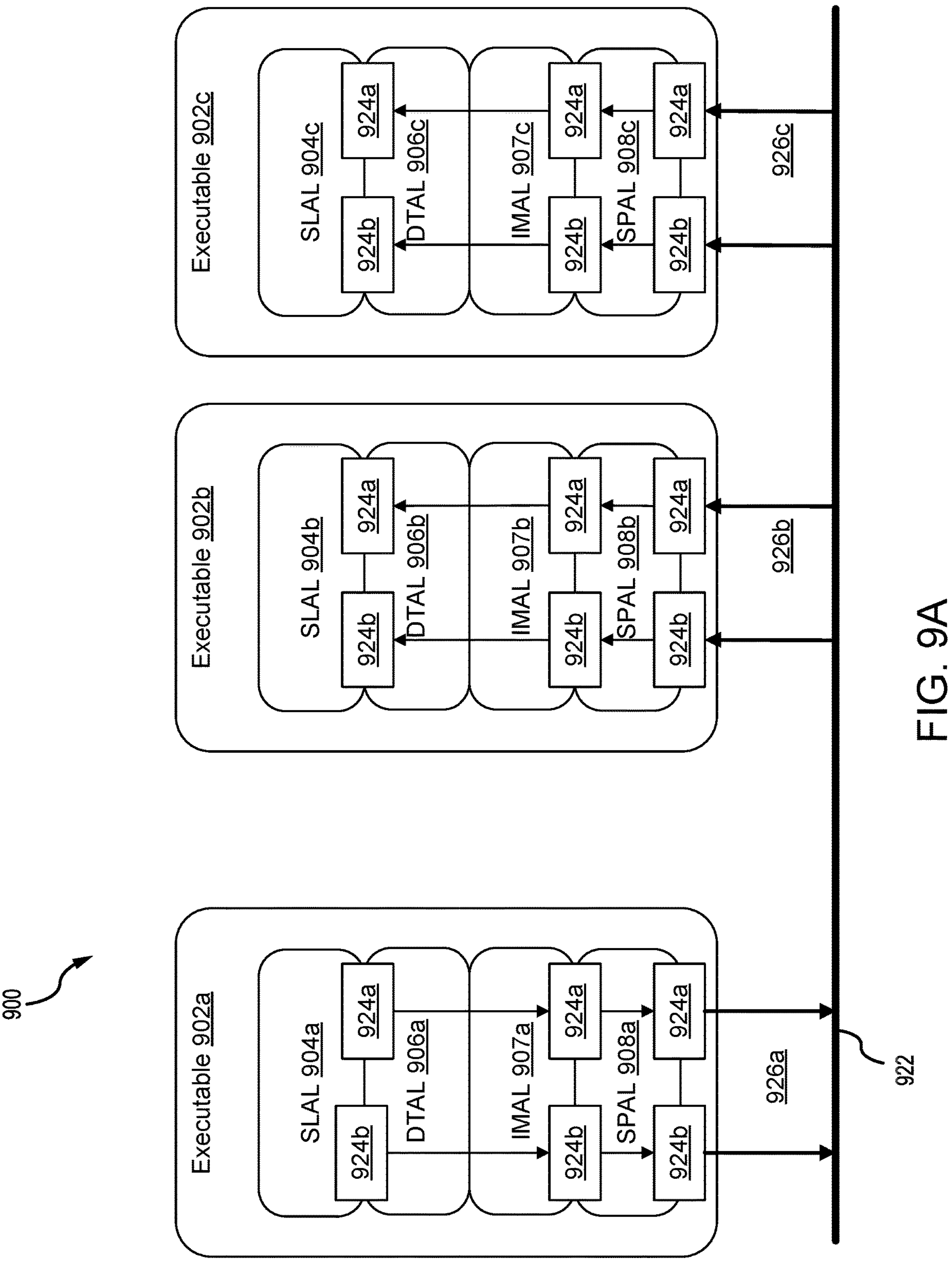
FIGS. 9A, 9B, 9C, and 9D illustrate managing new data types in software architectures, in accordance with various embodiments.

Referring now to FIGS. 9A-9D, a use case 900, a use case 930, a use case 950, and a use case 970 for handling an addition of a new data type are illustrated in accordance with various embodiments. Referring first to FIG. 9A, use case 900 illustrates handling a new data type by modifying business logic source code and modifying configuration files. Use case 900 may include a first executable 902*a*, a second executable 902*b*, a third executable 902*c*, and a communication bus 922. Similar to various embodiments previously described, first executable 902*a* may include business logic 904*a*, type specific logic 906*a*, type abstract logic 907*a*, libraries 908*a*, and a configuration file 926*a*. In the depicted embodiment, first executable 902*a* is configured to transmit a first data type 924*a* and a second data type 924*b*. In various embodiments, business logic 904*a* and type specific logic 906*a* source code may be modified to modify the interfaces between business logic 904*a* and type specific logic 906*a* to enable business logic 904*a* to transmit both first data 924*a* and second data 924*b*. First executable 902*a* may be compiled and re-deployed in response to the change in source code.

In various embodiments, configuration file 926*a* may be modified to identify a first IP address/port (e.g., 10.10.10.1:4566) on which to transmit first data 924*a* and second data 924*b* on communication bus 922. In various embodiments, configuration file 926*a* may be modified to identify the first IP address/port and a second IP address/port (e.g., 10.10.10.2:4566) on which to transmit first data 924*a* and second data 924*b*, respectively. As previously described, a change in configuration file may be read without compiling, and in some embodiments, without restarting first executable 902*a*. Type abstract logic 907*a* may dynamically reconfigure based on configuration file 926*a* to pass first data type 924*a* and second data type 924*b* from type specific logic 906*a* to libraries 908*a*.

Second executable 902*b* may include business logic 904*b*, type specific logic 906*b*, type abstract logic 907*b*, libraries 908*b*, and a configuration file 926*b*. Similar to first executable 902*a*, the source code of business logic 904*b* and type specific logic 906*b* is modified to enable second executable 902*b* to receive first data 924*a* and second data 924*b*. Second executable 902*b* may be compiled and re-deployed in response to the change to the source code.

In various embodiments, configuration file 926*b* may be modified to identify the first IP address/port (e.g., 10.10.10.1:4566) on which data 924*a* and second data 924*b* are received on communication bus 922. In various embodiments, configuration file 926*b* may be modified to identify the first IP address/port and the second IP address/port (e.g., 10.10.10.2:4566) on first data 924*a* and second data 924*b* are received, respectively. As previously described, a change in configuration file may be read without compiling, and in some embodiments, without restarting second executable 902*b*. Type abstract logic 907*b* may dynamically reconfigure based on configuration file 926*b* to pass first data type 924*a* and second data type 924*b* from libraries 908*b* to type specific logic 906*b*. In various embodiments, the change to configuration file 926*b* may be dynamic and in response to information received from data model 500.

Third executable 902*c* may include business logic 904*c*, type specific logic 906*c*, type abstract logic 907*c*, libraries 908*c*, and a configuration file 926*c*. Similar to second executable 902*b*, the source code of business logic 904*c* and type specific logic 906*c* is modified to enable third executable 902*c* to receive first data 924*a* and second data 924*b*. Third executable 902*c* may be compiled and re-deployed in response to the change to the source code.

In various embodiments, configuration file 926*c* may be modified to identify the first IP address/port (e.g., 10.10.10.1:4566) on which data 924*a* and second data 924*b* are received on communication bus 922. In various embodiments, configuration file 926*c* may be modified to identify the first IP address/port and the second IP address/port (e.g., 10.10.10.2:4566) on first data 924*a* and second data 924*b* are received, respectively. As previously described, a change in configuration file may be read without compiling third executable 902*c*, and in some embodiments, without restarting third executable 902*c*. Type abstract logic 907*c* may dynamically reconfigure based on configuration file 926*b* to pass first data type 924*a* and second data type 924*b* from libraries 908*c* to type specific logic 906*c*.

Figure 9B:
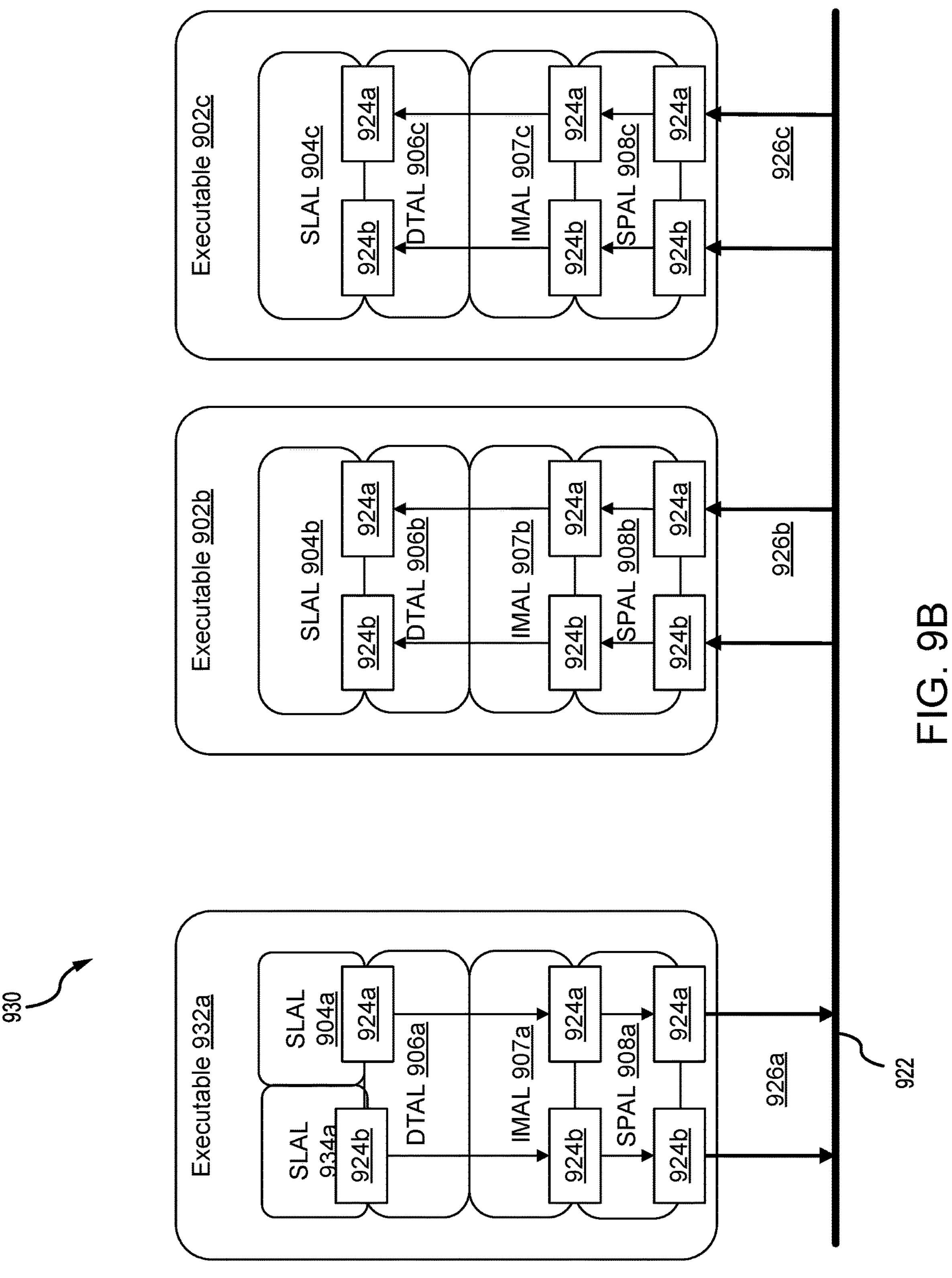

Referring to FIG. 9B, use case 930 illustrates handling a new data type by adding portable business logic source code change, modifying source code of business logic, and modifying configuration files. Use case 930 may include similar components to those described above with respect to use case 900 including a first executable 932*a*, second executable 902*b*, third executable 902*c*, and communication bus 922. First executable 932*a*, second executable 902*b*, and third executable 902*c* preform the same tasks as described above with respect to use case 900. Specifically, first executable 932*a* transmits first data 924*a* and second data 924*b* to one or more IP address(es)/port(s) (e.g., 10.10.10.1:4566) of communication bus 922 and second executable 902*b* and third executable 902*c* receive first data 924*a* and second data 924*b* on the one or more IP address(es)/port(s). Portions of use case 930 that are the same as use case 900 may not be repeated below.

First executable 932*a* further may include business logic 934*a* in addition to business logic 904*a*. Business logic 904*a* is configured to transmit first data 924*a* and business logic 934*a* is configured to transmit second data 924*b*. That is, instead of modifying the source code of business logic 904*a* to transmit first data 924*a* and second data 924*b*, first executable 932*a* may include business logic 904*a* to transmit second data 924*b*. In various embodiments, this may be done by including code (e.g., business logic 934*a*) that is already compiled and ready to transmit second data type 924*b*. This improves portability of code (e.g., business logic 904*a*) since the source code of business logic 904*a* is not modified. Reducing the number of tasks performed by each business logic module (e.g., business logic 904*a*, 934*a*, etc.) allows the business logic to be moved to other systems. As illustrated in FIG. 9B, business logic 934*a* is added to executable 932*a* with little to no changes to business logic 934*a*. Similar to use case 900, type specific logic 906*a* is modified to provide an interface for second data 924*b*. Configuration file 926*a* may be modified similar to what is previously described with respect to use case 900. Type abstract logic 907*a* may be dynamically reconfigured based on configuration file 926*a* to send first data type 924*a* and second data type 924*b* to transport library 908*a*.

Figure 9C:
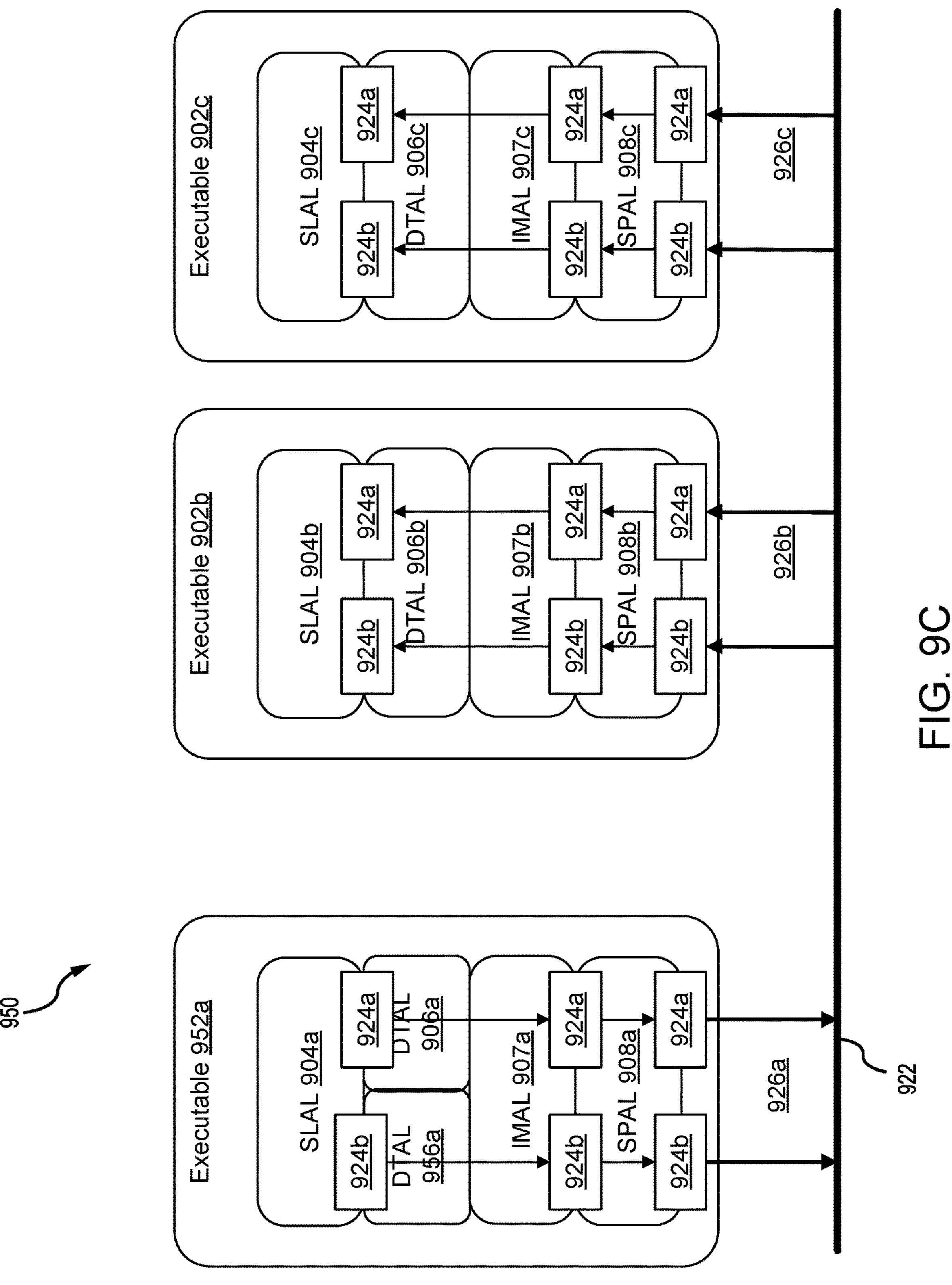

Referring to FIG. 9C, use case 950 illustrates handling a new data type by adding transport logic code, modifying the source code of business logic, and modifying configuration files. Use case 950 may include similar components to those described above with respect to use case 900 including a first executable 952*a*, second executable 902*b*, third executable 902*c*, and communication bus 922. First executable 952*a*, second executable 902*b*, and third executable 902*c* preform the same tasks as described above with respect to use case 900. Specifically, first executable 952*a* transmits first data 924*a* and second data 924*b* to one or more IP address(es)/port(s) (e.g., 10.10.10.1:4566) of communication bus 922 and second executable 902*b* and third executable 902*c* receive first data 924*a* and second data 924*b* on the one or more IP address(es)/port(s). Portions of use case 930 that are the same as use case 900 may not be repeated below.

First executable 952*a* further may include transport logic 956*a* in addition to type specific logic 906*a*. Type specific logic 956*a* is configured to receive and transmit second data 924*b* from business logic 904*a*. That is, instead of modifying the source code of business logic 904*a*, adding a new business logic component, or modifying type specific logic 906*a*, first executable 952*a* may include type specific logic 956*a* to provide a communication path for second data 924*b* in first executable 902*a*. This improves portability of code as different components of transport logic (e.g., type specific logic 906*a* and 956*a*) may be linked into first executable 952*a* instead of modifying the source code of a single transport logic component (e.g., type specific logic 906*a*). As seen in FIG. 9C, type specific logic 956*a* is added to executable 952*a* to reduce or eliminate code changes to business logic 904*a* and type specific logic 906*a*.

Figure 9D:
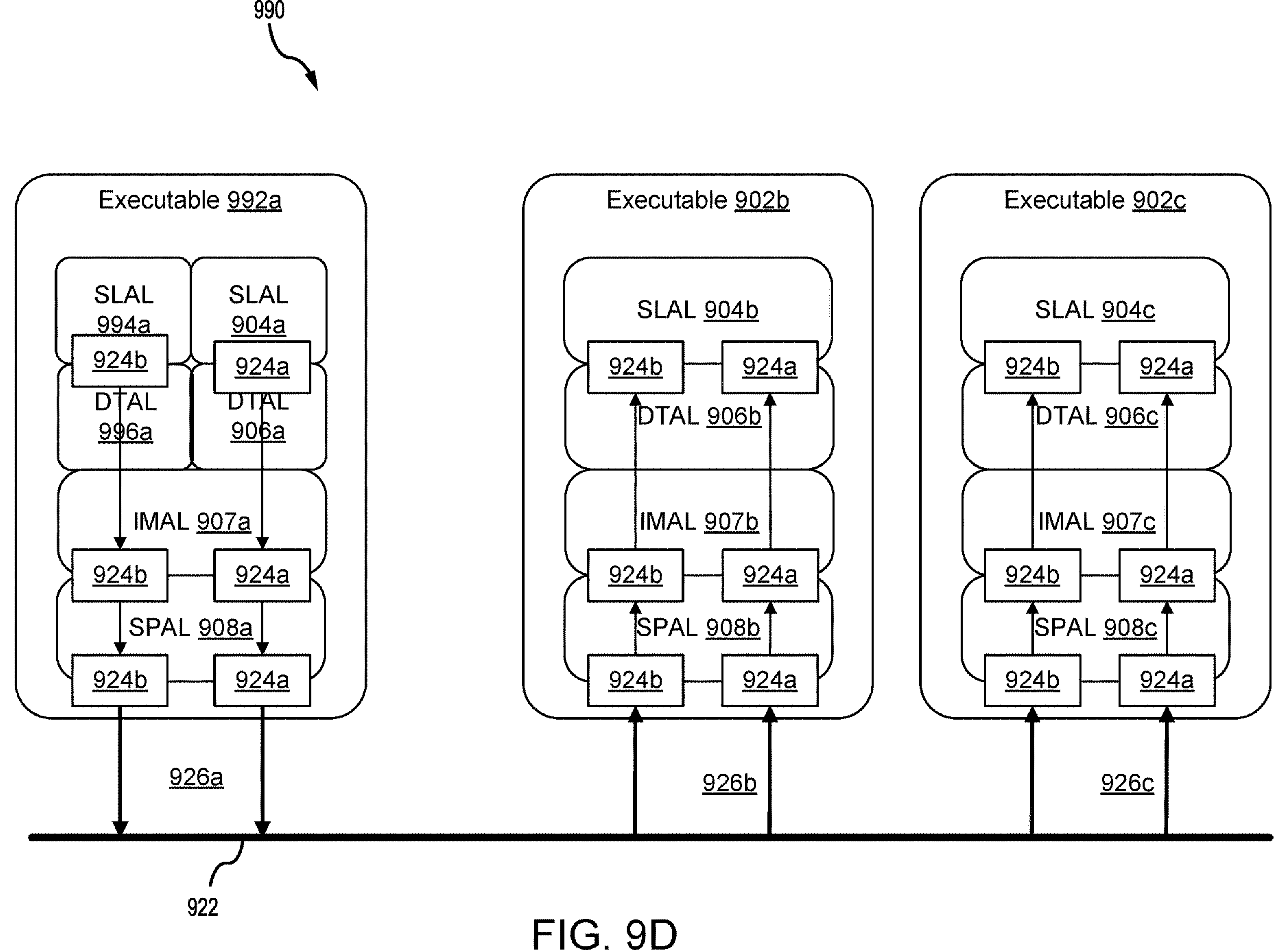

Referring now to FIG. 9D, use case 970 illustrates handling a new data type by adding transport logic code, adding business logic code, and modifying configuration files. Use case 970 may include similar components to those described above with respect to use cases 930 and 950 including a first executable 972*a*, second executable 902*b*, third executable 902*c*, and communication bus 922. First executable 972*a*, second executable 902*b*, and third executable 902*c* preform the same tasks as described above with respect to use case 900. Specifically, first executable 972*a* transmits first data 924*a* and second data 924*b* to one or more IP address(es)/port(s) (e.g., 10.10.10.1:4566) of communication bus 922 and second executable 902*b* and third executable 902*c* receive first data 924*a* and second data 924*b* on the one or more IP address(es)/port(s). Portions of use case 970 that are the same as use cases 950 and 970 may not be repeated below.

First executable 972*a* further may include business logic 974*a* and transport logic 976*a* in addition to business logic 904*a* and type specific logic 906*a*. In the depicted embodiment, business logic 904*a* is configured to transmit first data 924*a* via type specific logic 906*a* and business logic 974*a* is configured to transmit second data 924*b* via transport logic 976*a*. That is, instead of modifying the business logic (e.g., business logic 904*a*) and/or the type specific logic (e.g., type specific logic 906*a*), the source code (e.g., the entry point) of first executable 972*a* is modified to include business logic 974*a* and type specific logic 976*a*. This results in fewer change to source code while improving the reusability of source code related to business logic 904*a* and business logic 974*a*. Configuration file 926*a* defines the connection between first executable 972*a* and communication bus 922 that is used to communicate with second executable 902*b* and third executable 902*c*. Configuration file 926*a* further defines data types and connections used for type abstract logic 907*a* to facilitate movement of first data 924*a* and second data 924*b* from type specific logic 906*a* and type specific logic 976*a*, respectively, to transport library 908*a*.

It can be appreciated that the embodiments described above with respect to FIGS. 9A-9D are exemplary of different configuration possibilities achievable by the various embodiments disclosed herein. While the embodiments describe above relate to first executables 902*a*, 932*a*, 952*a*, 972*a*, similar source code changes and configuration file changes can be made to second executable 902*b* and third executable 902*c*. For example, second executable 902*b* may be modified to include an additional business logic module (e.g., business logic 974*a*) and/or an additional type specific logic module (e.g., type specific logic 976*a*) to receive and process second data 924*b*. Providing a modular approach to compiling executables as described with respect to FIGS. 9A and 9B allows business logic (e.g., 904*a*, 904*b*, 904*c*, etc.) and type specific logic (e.g., 906*a*, 906*b*, 906*c*) to be ported to different systems with little to no code changes. Additionally, changes to configuration files and type abstract logic (e.g., 907*a*, 907*b*, 907*c*) may be dynamic and take effect without restarting the executable (e.g., 972*a*, 902*b*, 902*c*).

Figure 10A:
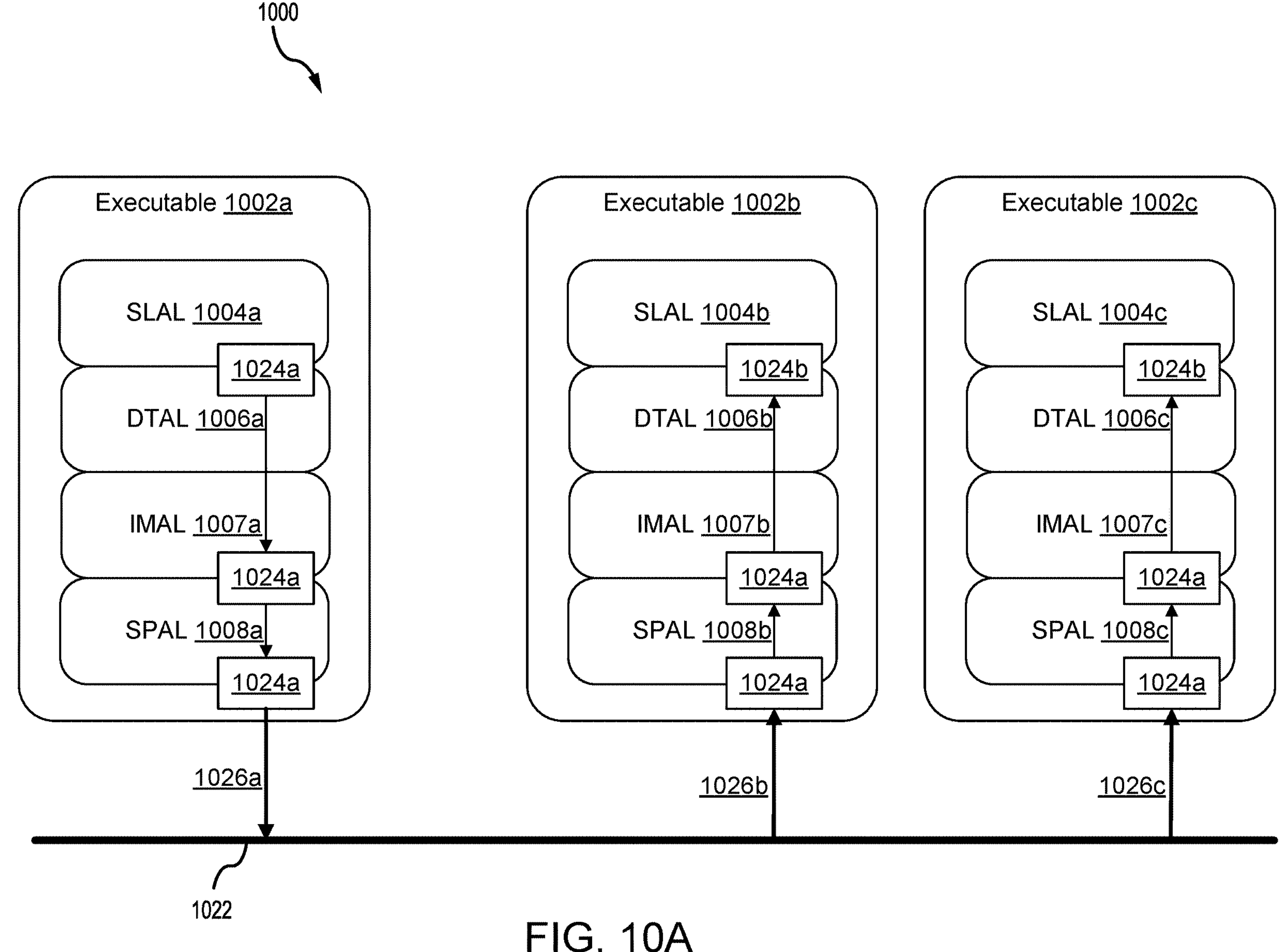
FIGS. 10A, 10B, and 10C illustrate managing data transformation in software architectures, in accordance with various embodiments.
Figure 10B:
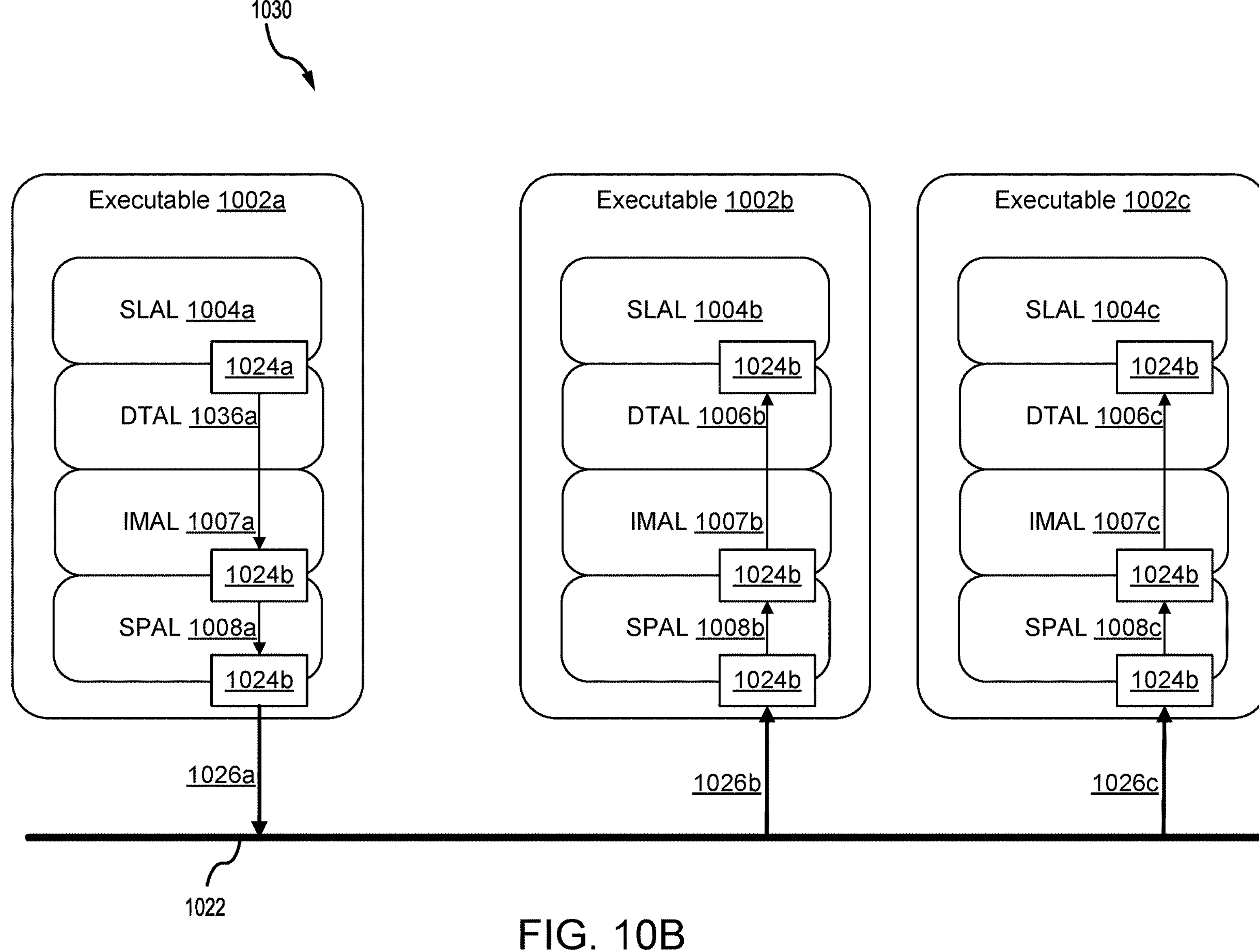
Figure 10C:
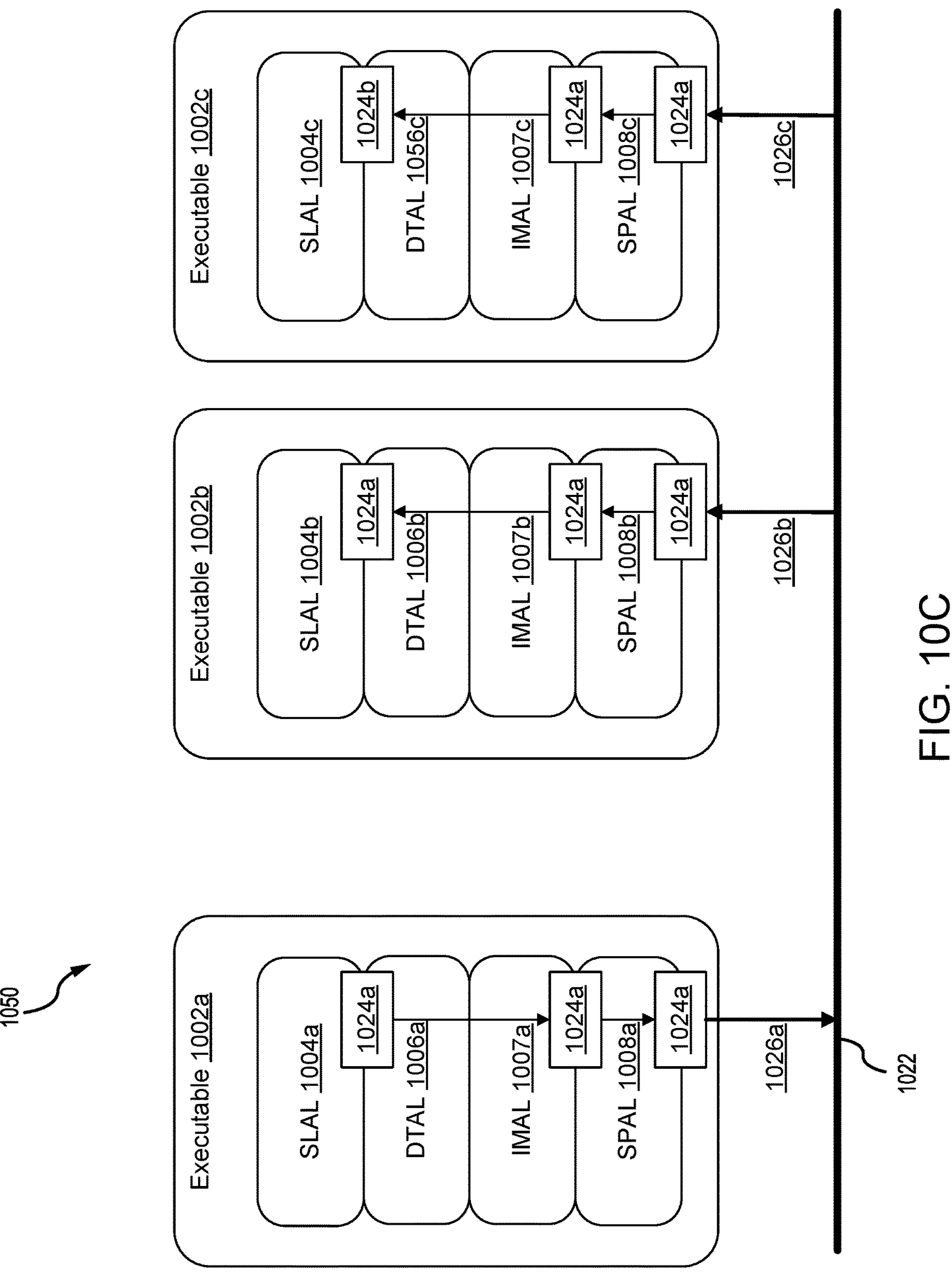

Referring now to FIGS. 10A-10C, a use case 1000, a use case 1030, and a use case 1050 for handling data transformations are illustrated in accordance with various embodiments. Referring first to FIG. 10A, use case 1000 illustrates handling data transformations by the transport logic module on the receiving end. Use case 1000 may include a first executable 1002*a*, a second executable 1002*b*, a third executable 1002*c*, and a communication bus 1022. First executable 1002*a* may include business logic 1004*a*, type specific logic 1006*a*, type abstract logic 1007*a*, libraries 1008*a*, and a configuration file 1026*a*. In the depicted embodiment, first executable 1002*a* is configured to transmit a first data type 1024*a*. In various embodiments, first data type 1024*a* may be an example of first message 430 described previously with respect to FIG. 4C. In various embodiments, data type 1024*a* may be any information that is transmitted from first executable 1002*a* to another controller, service, system, and/or executable that may be presented in another format, such as second data type 1024*b*. For example, data types may be key value pairs, primitive types (e.g., int, long, double, etc.), multipart messages, and/or combinations of each, among others.

Second executable 1002*b* may include business logic 1004*b*, type specific logic 1006*b*, type abstract logic 1007*b*, libraries 1008*b*, and a configuration file 1026*b*. Second executable 1002*b* is configured to receive data type 1024*a* and transform data type 1024*a* to data type 1024*b* to be processed by business logic 1004*b*. In various embodiments, second data type 1024*b* may be an example of second message 432 described previously with respect to FIG. 4C. Generally, the source code of business logic 1004*b* may be modified to transform first data type 1024*a* to second data type 1024*b* upon receipt of first data type 1024*a*. In the depicted embodiment, type abstract logic 1007*b* is configured to transform first data type 1024*a* to second data type 1024*b* based on configuration file 1026*b*.

Configuration file 1026*b* is modified based on an understanding the types of messages to be sent and/or received (e.g., first data type 1024*a*, second data type 1042*b*) that is provided by data model 500. That is, as part of deployment of use case 1000 configuration file 1026*a* is modified to identify the connections between executables and data types. Based on configuration file 1026*a*, second executable 1002*b* may be compiled and linked to transport logic 1006*b* prior to deployment, in accordance with various embodiments. In various embodiments, second executable 1002*b* may read configuration file 1026*b* on startup, at which time type abstract logic 1007*b* is configured properly to transform first data type 1024*a* to second data type 1024*b*.

Third executable 1002*c* may include business logic 1004*c*, type specific logic 1006*c*, type abstract logic 1007*c*, libraries 1008*c*, and a configuration file 1026*c*. Third executable 1002*c* is configured to receive data type 1024*a* and transform data type 1024*a* to data type 1024*b* to be processed by business logic 1004*c*. In the depicted embodiment, third executable 1002*c* functions similar to second executable 1002*b*. Specifically, type abstract logic 1007*c* may be dynamically reconfigured to perform the data transformation from data type 1024*a* to data type 1024*b*.

It can be appreciated that business logic reusability and portability is improved by performing data transformation in the type abstract logic (e.g., type abstract logic 1006*b*). This allows business logic modules (e.g., business logic 1004*b*) and type specific modules (e.g., type specific module 1006*b*) to be used without little to no modifications for receiving a data type other than what the business logic module was originally designed to receive. This improves the security and reliability of a system as the chances of using an incorrect unit (e.g., feet vs meters) is reduced, providing a more robust system.

Referring now to FIG. 10B, use case 1030 illustrates handling data transformation by modifying by the transport logic module on the transmitting end. Use case 1030 may include similar components to those described with respect to use case 1000 including first executable 1002*a*, second executable 1002*b*, third executable 1002*c*, and communication bus 1022. First executable 1002*a*, second executable 1002*b*, and third executable 1002*c* perform similar task as described above with respect to use case 1000. Specifically, first executable 1002*a* operates on data having a first data type 1024*a* and second executable 1002*b* and third executable 1002*c* operate on data having a second data type 1024*b*.

In the depicted embodiment, a data transformation of first data type 1024*a* to second data type 1024*b* is performed by first executable 1002*a*. That is, business logic 1004*a* sends instructions to type specific logic 1036*a* to transmit first data type 1024*a*. Type specific logic 1036*a* sends first data type 1024*a* to type abstract logic 1007*a*. Type abstract logic 1007*a* transforms first data type 1024*a* to second data type 1024*b* prior to sending second data type 1024*b* to transport library 1008*a* to be transmitted. As previously described, these connections between executables, business logic, and data types, among others, are defined in configuration file 1026*a*. Accordingly, type abstract logic 1007*a* is able to be dynamically reconfigured to perform transformations from one known data type to another known data type in order to reduce modifications to source code of business logic modules (e.g., business logic 1004*a*).

Referring now to FIG. 10C, use case 1050 illustrates handling data transformation by modifying by the transport logic module on one of the receiving executables. Use case 1050 may include similar components to those described with respect to use case 1000 and use case 1030 including first executable 1002*a*, second executable 1002*b*, third executable 1002*c*, and communication bus 1022. First executable 1002*a*, second executable 1002*b*, and third executable 1002*c* perform similar task as described above with respect to use case 1000. Specifically, first executable 1002*a* transmits data having a first data type 1024*a* that is received by second executable 1002*b* and third executable 1002*c*. Third executable 1002*c* transforms first data type 1024*a* to second data type 1024*b* for use by business logic 1004*c*.

In the depicted embodiment, a situation where one executable operates on first data type 1024*a* (i.e., second executable 1002*b*) and another executable operates on second data type 1024*b* (i.e., third executable 1002*c*) is illustrated. Similar to use case 1000, configuration file 1026*c* of third executable 1002*c* is modified to define the transformation that is to occur. Type abstract logic 1007*c* performs the transformation from first data type 1024*a* to second data type 1024*b* prior to sending second data type 1024*b* to business logic 1004*c*.

It is appreciated that the embodiments depicted herein improve code reuse and portability while decreasing potential complications of modifying source code of the business logic modules. In an example, multiple controllers of a system may be configured to operate using a message version 1.0. Later in development, or after deployment, a message version 2.0 is released and a new controller is introduced to the system that operates using message version 2.0. Using transport logic modules as described herein, the business logic modules of the old controllers in the system are not updated to accommodate the use of message version 2.0, but instead the type abstract logic modules are updated. The updated type abstract logic modules provide data transformations between the old controllers and the new controller. In various embodiments, the reconfiguration of type abstract logic modules may be done dynamically as each executable checks data model 500 for data equivalencies. In various embodiments, a central server may push updated configuration files to the controllers that will then reconfigure the type abstract modules based on the updated configuration files. It can be appreciated that such a transport layer, as disclosed herein, is useful in systems including hundreds or thousands of controllers, such as in a smart city. Older controllers may continue to operate as before while newer controllers are able to implement new features.

Furthermore, it will be appreciated by those skilled in the art that the embodiments depicted herein may improve processing time and/or bandwidth use. For example, a system may have constrained processing resources such that performing a data transformation, as illustrated in FIG. 10B, overloads the system. In this example, performing the data transformation on the receiving side, as illustrated in FIG. 10A, may improve the performance of the system. As another example, though not illustrated, there may be scenarios in which a first system expects data of a first type and a second system expects data of a second type. Having a transmitting system transmit the data in both the first type and second type uses additional bandwidth. However, by transmitting the data of the first type and performing the data transformations on the second system, processing resources and bandwidth resources are reduced.

Referring now to FIGS. 11A and 11B, a use case 1100 and a use case 1130 for handling data redundancy are illustrated in accordance with various embodiments. Referring first to FIG. 11A, use case 1100 illustrates handling data redundancy in the business logic module of an executable on the receiving end. Use case 1100 may include a first executable 1102*a*, a second executable 1102*b*, a third executable 1102*c*, and a fourth executable 1102*d*. In various embodiments, first executable 1102*a* and second executable 1102*b* may be running on sensor controllers (e.g., air speed sensor), third executable 1102*c* may be running on a display controller (e.g., instrument panel) and fourth executable 1102*d* may be running on a system controller (e.g., flight controller). In the depicted embodiments, first executable 1102*a* transmits a first data 1124*a* on a first IP address/port (e.g., 10.10.10.1:4566) of a communication bus 1122 and second executable 1102*b* transmits a second data 1124*b* on a second IP address/port (e.g., 10.10.10.2:4566) of communication bus 1122. First data 1124*a* and second data 1124*b* are of the same data type and may be used for system redundancy. For example, first data 1124*a* and second data 1124*b* may include air speed of an aircraft.

First executable 1102*a* may include business logic 1104*a*, type specific logic 1106*a*, type abstract logic 1107*a*, libraries 1108*a*, and a configuration file 1126*a*. Business logic 1104*a* generates first data 1124*a* (e.g., air speed) and sends instructions to type specific logic 1106*a* to transmit first data 1124*a*. Type specific logic 1106*a* sends first data 1124*a* to type abstract logic 1107*a* to transmit first data 1124*a* on first IP address/port on communication bus 1122 via libraries 1108*a*. As previously described, configuration file 1126*a* defines the manner of communication and first IP address/port on which first data 1124*a* is transmitted.

Second executable 1102*b* may include business logic 1104*b*, type specific logic 1106*b*, type abstract logic 1107*b*, libraries 1108*b*, and a configuration file 1126*b*. Business logic 1104*b* generates second data 1124*b* (e.g., air speed) and sends instructions to type specific logic 1106*b* to transmit second data 1124*b*. Transport logic 1106*b* transmits second data 1124*b* on second IP address/port on communication bus 1122 via type abstract logic 1107*b* and libraries 1108*b*. As previously described, configuration file 1126*b* defines the manner of communication and second IP address/port on which second data 1124*b* is transmitted.

Third executable 1102*c* may include business logic 1104*c*, type specific logic 1106*c*, type abstract logic 1107*c*, libraries 1108*c*, and a configuration file 1126*c*. Third executable 1102*c* is configured to receive both first data 1124*a* and second data 1124*b*. Configuration file 1126*c* defines first IP address/port and second IP address/port on communication bus 1122 for libraries 1108*c* to receive first data 1124*a* and second data 1124*b*. Type specific logic 1106*c* sends both first data 1124*a* and second data 1124*b* to business logic 1104*c* in response to receiving both first data 1124*a* and second data 1124*b*. In the depicted embodiment, business logic 1104*c* may include the logic for identifying the redundant data and determining which data to use, either first data 1124*a*, second data 1124*b*, or a combination of the data.

Fourth executable 1102*d* may include business logic 1104*d*, type specific logic 1106*d*, type abstract logic 1107*d*, libraries 1108*d*, and a configuration file 1126*d*. Fourth executable 1102*d* is configured to receive both first data 1124*a* and second data 1124*b*. Configuration file 1126*d* defines first IP address/port and second IP address/port on communication bus 1122 for libraries 1108*d* to receive first data 1124*a* and second data 1124*b*. Type specific logic 1106*d* sends both first data 1124*a* and second data 1124*b* to business logic 1104*d* in response to receiving both first data 1124*a* and second data 1124*b*. In the depicted embodiment, business logic 1104*d* may include the logic for identifying the redundant data and determining which data to use, either first data 1124*a*, second data 1124*b*, or a combination of the data.

Referring now to FIG. 11B, use case 1130 illustrates handling data redundancy in the transport logic module of an executable on the receiving end. Use case 1130 may include first executable 1102*a*, second executable 1102*b*, third executable 1102*c*, fourth executable 1102*d*, and communication bus 1122. In various embodiments, first executable 1102*a* and second executable 1102*b* may be running on sensor controllers (e.g., air speed sensor), third executable 1102*c* may be running on a display controller (e.g., instrument panel) and fourth executable 1102*d* may be running on a system controller (e.g., flight controller). In the depicted embodiments, first executable 1102*a* transmits first data 1124*a* on first IP address/port (e.g., 10.10.10.1:4566) of communication bus 1122 and second executable 1102*b* transmits second data 1124*b* on second IP address/port (e.g., 10.10.10.2:4566) of communication bus 1122. First data 1124*a* and second data 1124*b* are of the same data type and may be used for system redundancy. For example, first data 1124*a* and second data 1124*b* may include air speed of an aircraft.

First executable 1102*a* may include business logic 1104*a*, type specific logic 1106*a*, type abstract logic 1107*a*, libraries 1108*a*, and a configuration file 1126*a*. Business logic 1104*a* generates first data 1124*a* (e.g., air speed) and sends instructions to type specific logic 1106*a* to transmit first data 1124*a*. Type specific logic 1106*a* transmits first data 1124*a* on first IP address/port on communication bus 1122 via type abstract logic 1107*a* and libraries 1108*a*. As previously described, configuration file 1126*a* defines the manner of communication and first IP address/port on which first data 1124*a* is transmitted.

Second executable 1102*b* may include business logic 1104*b*, type specific logic 1106*b*, type abstract logic 1107*b*, libraries 1108*b*, and a configuration file 1126*b*. Business logic 1104*b* generates second data 1124*b* (e.g., air speed) and sends instructions to type specific logic 1106*b* to transmit second data 1124*b*. Type specific logic 1106*b* transmits second data 1124*b* on second IP address/port on communication bus 1122 via type abstract logic 1107*b* and libraries 1108*b*. As previously described, configuration file 1126*b* defines the manner of communication and second IP address/port on which second data 1124*b* is transmitted.

Third executable 1102*c* may include business logic 1104*c*, type specific logic 1106*c*, type abstract logic 1107*c*, libraries 1108*c*, and a configuration file 1126*c*. Third executable 1102*c* is configured to receive both first data 1124*a* and second data 1124*b*. Configuration file 1126*c* defines first IP address/port and second IP address/port on communication bus 1122 for libraries 1108*c* to receive first data 1124*a* and second data 1124*b*. Configuration file 1126*c* further defines the receipt of redundant data (e.g., first data 1124*a* and second data 1124*b*). In various embodiments, configuration file 1126*c* may further define a manner to resolve redundancy differences including which data to send to business logic 1104*c*. Type abstract logic 1107*c* receives both first data 1124*a* and second data 1124*b* and reconciles the data redundancy by sending first data 1124*a*, second data 1124*b*, or a combination of the data to business logic 1104*c* in response to receiving both first data 1124*a* and second data 1124*b*.

Fourth executable 1102*d* may include business logic 1104*d*, type specific logic 1106*d*, type abstract logic 1107*d*, libraries 1108*d*, and a configuration file 1126*d*. Fourth executable 1102*d* is configured to receive both first data 1124*a* and second data 1124*b*. Configuration file 1126*d* defines first IP address/port and second IP address/port on communication bus 1122 for libraries 1108*d* to receive first data 1124*a* and second data 1124*b*. Configuration file 1126*d* further defines the receipt of redundant data (e.g., first data 1124*a* and second data 1124*b*). In various embodiments, configuration file 1126*d* may further define a manner to resolve redundancy differences including which data to send to business logic 1104*d*. Type abstract logic 1107*d* receives both first data 1124*a* and second data 1124*b* and reconciles the data redundancy by sending first data 1124*a*, second data 1124*b*, or a combination of the data to business logic 1104*d* in response to receiving both first data 1124*a* and second data 1124*b*.

Business logic modules are more portable and extensible by moving the handling data redundancy to the transport logic module. As described herein, a system may be modified to handle redundant data by modifying the transport logic instead of modifying the business logic. This improves the reusability and portability of the business logic as the same business logic may be ported to multiple systems regardless of whether or not the data transmitted within the system is redundant. Furthermore, this may reduce errors that may be introduced by modifying the business logic. This may further reduce upgrade time and complexity.

Referring now to FIGS. 12A-12D, a first connection diagram 1200, a second connection diagram 1230, a third connection diagram 1250, and a fourth connection diagram 1270 are illustrated in accordance with various embodiments. Referring first to FIG. 12A, first connection diagram 1200 may include a first executable 1202*a*, a second executable 1202*b*, a third executable 1202*c*, and a communication bus 1222. First executable 1202*a* is configured to transmit a first data type 1224*a* (e.g., to third executable 1202*c*) and second executable 1202*b* is configured to transmit a second data type 1224*b* (e.g., to third executable 1202*c*). Third executable 1202*c* is configured to consume a third data type 1224*c* that is a combination of first data type 1224*a* and second data type 1224*b*. First data type 1224*a*, second data type 1224*b*, and third data type 1224*c* may each include a plurality of attributes. In various embodiments, third data type 1224*c* may contain all of the information from first data type 1224*a* and second data type 1224*b*. In various embodiments, third data type 1224*c* may contain a defined subset of data from first data type 1224*a* and/or second data type 1224*b*. For example, third data type 1224*c* may include all of the information from first data type 1224*a* and four attributes from second data type 1224*b* (e.g., attributes at indexes 3, 5, 9, and 16).

First executable 1202*a* may include business logic 1204*a*, transport logic 1206*a*, and libraries 1208*a*. Business logic 1204*a* produces first data type 1224*a* and transmits first data type 1224*a* (e.g., to third executable 1202*c*) via transport logic 1206*a* and libraries 1208*a*. Second executable 1202*b* may include business logic 1204*b*, transport logic 1206*b*, and libraries 1208*b*. Business logic 1204*b* produces second data type 1224*b* and transmits second data type 1224*b* (e.g., to third executable 1202*c*) via transport logic 1206*b* and libraries 1208*b*. In various embodiments, first data type 1224*a* may be an example of first message 430 described above with respect to FIG. 4C.

Third executable 1202*c* may include business logic 1204*c*, transport logic 1206*c*, and libraries 1208*c*. Transport libraries 1208*c* receive first data type 1224*a* and second data type 1224*b* for third executable 1202*c*. Transport libraries 1208*c* send first data type 1224*a* and second data type 1224*b* to transport logic 1206*c*. Transport logic 1206*c* combines first data type 1224*a* and second data type 1224*b* to create third data type 1224*c* for use by business logic 1204*c*. As stated previously, third data type 1224*c* may include some or all of each of first data type 1224*a* and second data type 1224*b*. It can be appreciated that the interface between business logic 1204*c* and transport logic 1206*c* is simplified by combining the data received (i.e., first data type 1224*a* and second data type 1224*b*) to form third data type 1224*c* in transport logic 1206*c*. Additionally, performing data transformations in the transport logic module improves portability and reusability of the business logic module because business logic receives third data type 1224*c* regardless of how it originated.

To accomplish this, transport logic 1206*c* may be configured to use a pipeline 1226 including a plurality of primitive logic blocks 1228. The plurality of primitive logic blocks 1228 may be examples of primitive logic block 600 described above with respect to FIGS. 6A and 6B). Pipeline 1226 may be dynamically generated based on information received from a data model (e.g., data model 500). In the illustrated embodiment, the plurality of primitive logic blocks 1228 may include join blocks, split blocks, and/or transform blocks, among others. For example, a split block may split second data type 1224*b* to extract the attributes of second data type 1224*b* that are included in third data type 1224*c*. A transform block may be used to convert data attributes of second data type 1224*b* from a first form (e.g., unit type, measurement type, data type, etc.) to a second form (e.g., unit type, measurement type, data type, etc.). A join block may then join attributes from first data type 1224*a* with the selected attributes from second data type 1224*b* to form third data type 1224*c*.

Referring now to FIG. 12B, second connection diagram 1230 may include first executable 1202*a*, second executable 1202*b*, third executable 1202*c*, a first communication bus 1222*a*, and a second communication bus 1222*b*. In various embodiments, second connection diagram 1230 may achieve the same results as first connection diagram 1200 using a different configuration. That is, first executable 1202*a* is configured to generate first data type 1224*a* and request second data type 1224*b* from second executable 1202*b*. Second executable 1202*b* is configured to generate second data type 1224*b* and transmit second data type 1224*b* to first executable 1202*a*. First executable 1202*a* is further configured to generate third data type 1224*c* and transmit third data type 1224*c* to third executable 1202*c*. In various embodiments, second data type 1224*b* may include a subset of the attributes of second executable 1202*b*, the subset of attributes being relevant to third data type 1224*c*. For example, second data type 1224*b* may have 4,000 attributes and the subset of attributes may include four attributes at indexes 3, 5, 9, and 16.

First executable 1202*a* may include business logic 1204*a*, transport logic 1206*a*, and libraries 1208*a*. Business logic 1204*a* produces first data type 1224*a*. First executable 1202*a*, via transport logic 1206*a* and libraries 1208*a*, requests second data type 1224*b* from second executable 1202*b*. Transport logic 1206*a* generates third data type 1224*c* based on first data type 1224*a* and second data type 1224*b*, as received from second executable 1224*b*.

Second executable 1202*b* may include business logic 1204*b*, transport logic 1206*b*, and libraries 1208*b*. Business logic 1204*b* produces second data type 1224*b* and transmits second data type 1224*b* to first executable 1202*a* via transport logic 1206*b* and libraries 1208*b*. In various embodiments, first data type 1224*a* may be an example of first message 430 described above with respect to FIG. 4C. In various embodiments, second business logic 1204*b* may generate a message including thousands of attributes and third executable 1202*c* expects to receive a subset of those attributes. Bandwidth requirements are decreased by sending the requested subset of attributes to first executable 1202*a* instead of sending all of the attributes generated by business logic 1204*b*.

Third executable 1202*c* may include business logic 1204*c*, transport logic 1206*c*, and libraries 1208*c*. Transport libraries 1208*c* receive third data type 1224*c* from first executable 1202*a*. Transport libraries 1208*c* send third data type 1224*c* to transport logic 1206*c*. In various embodiments, transport logic 1206*c* sends third data type 1224*c* to business logic 1204*c*. In various embodiments, transport logic 1206*c* may perform filter, aggregation, and/or other processing on third data type 1224*c* before sending third data type 1224*c* to business logic 1204*c*.

First transport logic 1206*a* includes a first pipeline 1232 having a first plurality of primitive logic blocks 1228. Second transport logic 1206*b* includes a second pipeline 1234 having a second plurality of primitive logic block 1228. Third transport logic 1206*c* includes a third pipeline 1236 having a third plurality of primitive logic blocks 1228.

Primitive logic blocks 1228 may be examples of primitive logic block 600 described above with respect to FIGS. 6A and 6B.

In an example implementation, first pipeline 1232 may include split blocks, join blocks, queue blocks, and/or transform blocks. First transport logic 1206*a* receives first data type 1224*a* and may use a queue block to store first data type 1224*a*. First transport logic 1206*a* may request second data type 1224*b* from second application 1202*b*. Upon receipt of second data type 1224*b*, first transport logic 1206*a* may use a split block to retrieve a subset of attributes from second data type 1224*b*. First transport logic 1206*a* may then use a transform block to transform the attributes of second data type 1224*b* (e.g., unit type, measurement type, data type, etc.) to a format used by third data type 1224*c*. First transport logic 1206*a* may then use a join block to join the attributes of first data type 1224*a* with the transformed subset of attributes from second data type 1224*b* to form third data type 1224*c*. First transport logic 1206*a* may then send third data type 1224*c* to libraries 1208*a* to be transmitted to third application 1202*c*. Third pipeline 1236 may include a queue block to pass third data type 1224*c* from libraries 1208*c* to SLAL 1204*c* for processing. By moving all processing to first application 1202*a*, and more specifically, to first transport logic 1206*a*, data processing loads for second application 1202*b* and third application 1202*c* are decreased.

In another example implementation, second transport logic 1206*b* may use a split block to retrieve the subset of attributes from second data type 1224*b*. Second transport logic 1206*b* may then use a transform block to convert subset of attributes of second data type 1224*b* (e.g., unit type, measurement type, data type, etc.) to create a modified second data type 1224*b*' that includes data attributes that are expected by third data type 1224*c*. Second transport logic 1206*b* then sends modified second data type 1224*b*' to libraries 1208*b* to transmit to first application 1202*a*. First transport logic 1206*a* uses a join block to combine the attributes of first data type 1224*a* and modified second data type 1224*b*' to form third data type 1224*c*. Third data type 1224*c* is then transmitted to third application 1224*c*. This configuration further reduces resources used to receive third data type 1224*c*. Specifically, extracting the subset of attributes from second data type 1224*b* to form modified second data type 1224*b*' reduces the amount of data transmitted on bus 1222*a*, 1222*b*.

It can be appreciated there may be improvements to processing time and/or bandwidth use by requesting the subset of data from one application (e.g., second executable 1202*b*) instead of all of the data available. Similarly, there may be an improvement to processing time, processing power, and/or bandwidth use by aggregating the data by a second application (e.g., first executable 1202*a*) prior to transmitting to the final destination. Additionally, performing data transformations in the transport logic module improves portability and reusability of the business logic module by reducing the number of transformations performed by business logic 1204*c*.

Figure 12C:
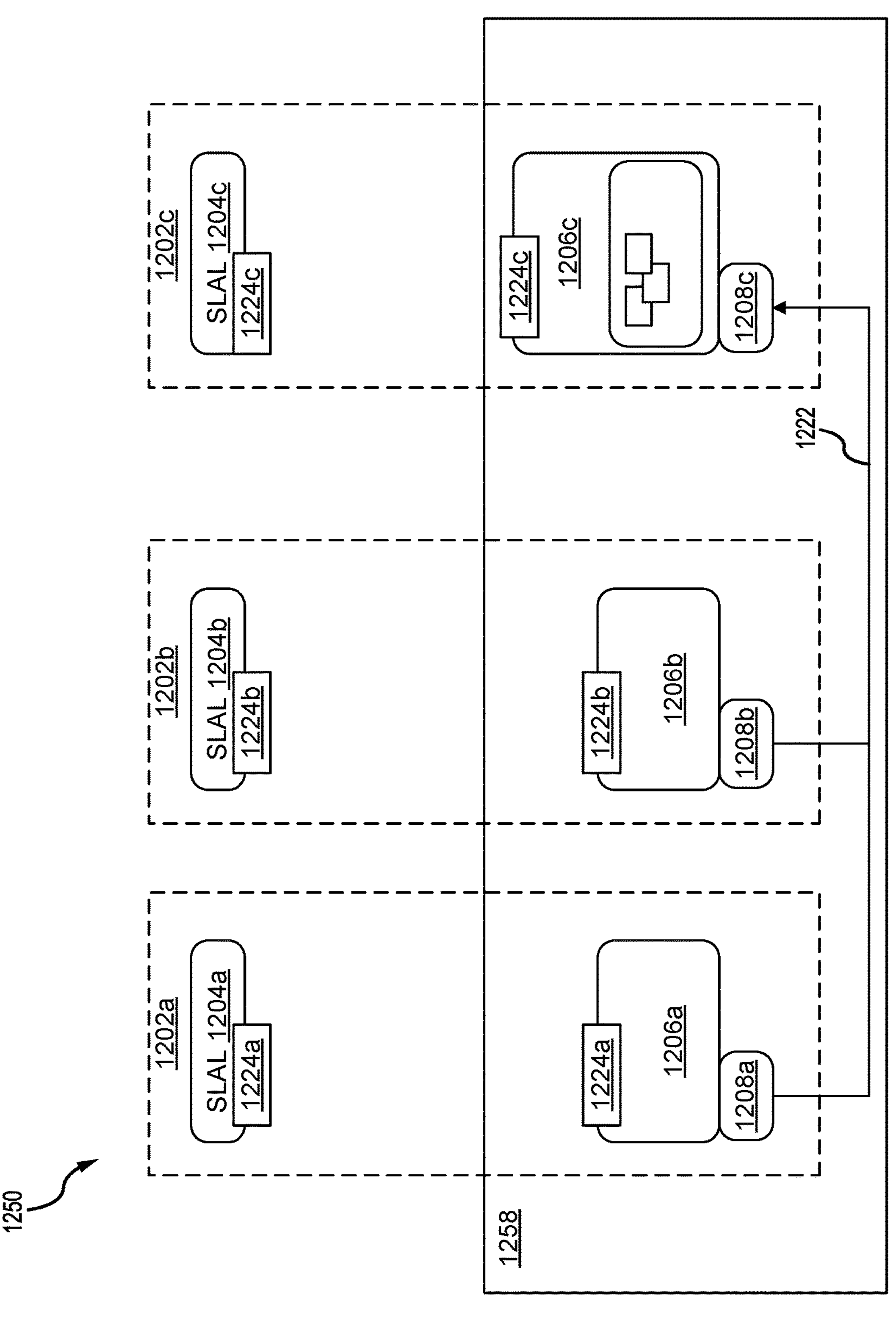

Referring now to FIG. 12C, third connection diagram 1250 may include similar components to first connection diagram 1200 including first executable 1202*a*, second executable 1202*b*, third executable 1202*c*, and communication bus 1222. Additionally, third connection diagram 1250 is configured to perform a similar task to first connection diagram 1200. Specifically, first executable 1202*a* is configured to transmit a first data type 1224*a* to third executable 1202*c* and second executable 1202*b* is configured to transmit a second data type 1224*b* to third executable 1202*c*. Third executable 1202*c* is configured to combine first data type 1224*a* and second data type 1224*b* to form third data type 1224*c*. In various embodiments, third data type 1224*c* may contain all of the information from first data type 1224*a* and second data type 1224*b*.

Figure 12D:
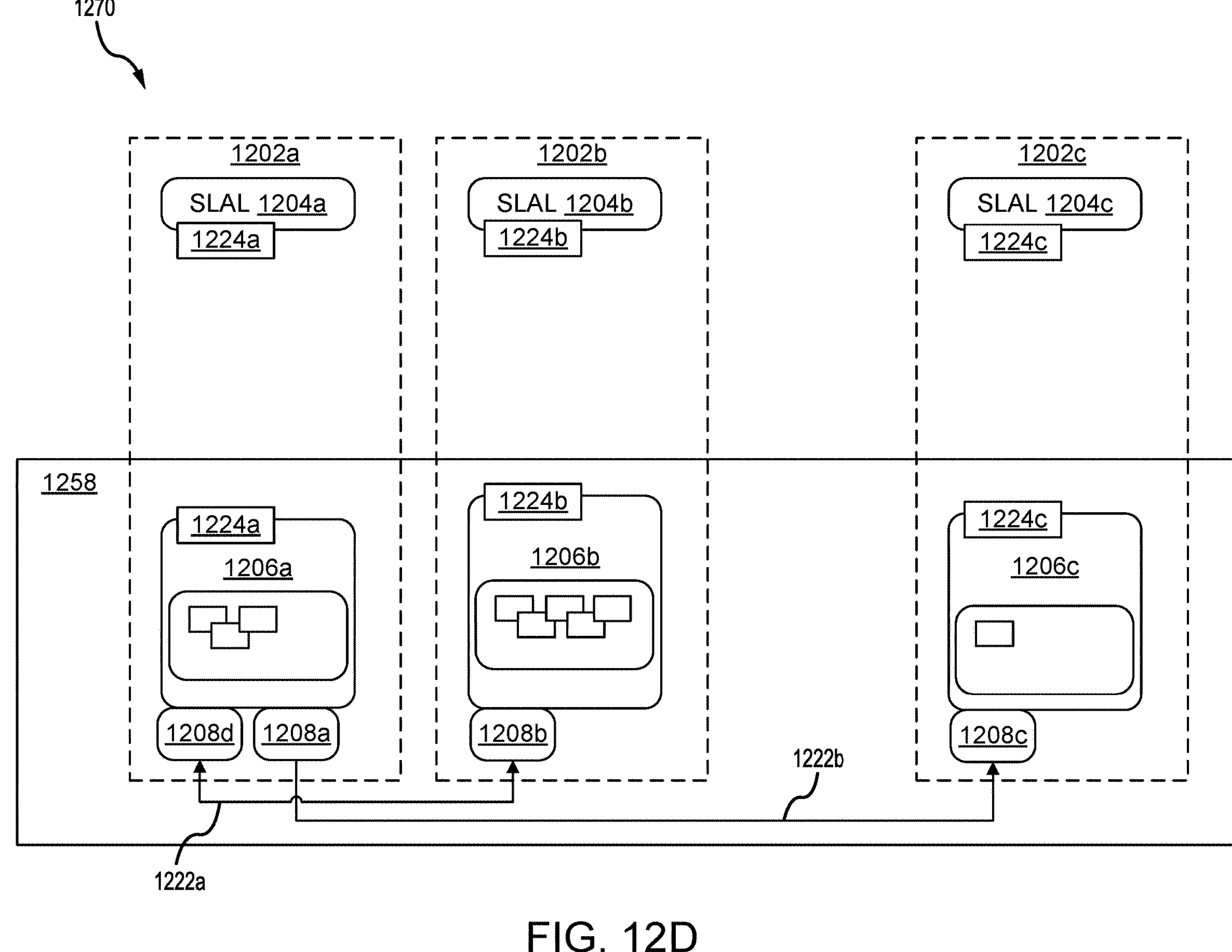

Referring now to FIG. 12D, fourth connection diagram 1270 may include similar components to second connection diagram 1230 including first executable 1202*a*, second executable 1202*b*, third executable 1202*c*, communication bus 1222*a*, and communication bus 1222*b*. Additionally, fourth connection diagram 1270 is configured to perform a similar task to second connection diagram 1230. Specifically, first executable 1202*a* is configured generate first data type 1224*a*, request second data type 1224*b* from second executable 1202*b*, and generate third data type 1224*c* based on first data type 1224*a* and second data type 1224*b*. First executable is further configured to transmit third data type 1224*c* to third executable 1202*c*. Second executable 1202*b* is configured to generate second data type 1224*b* and transmit second data type 1224*b* to first executable 1202*a*. Third executable 1202*c* is configured to receive third data type 1224*c*. In various embodiments, third data type 1224*c* may contain all of the information from first data type 1224*a* and second data type 1224*b*.

As depicted in FIGS. 12C and 12D, first executable 1202*a*, second executable 1202*b*, and third executable 1202*c* are depicted including certification unit 1252, certification unit 1254, certification unit 1256, and certification unit 1258. In various industries, software is certified for use by a certification body prior to being deployed. In those industries, changes to the business logic of an application, or executable, may trigger a recertification of the changed software prior to deployment. Third connection diagram 1250 and fourth connection diagram identify business logic 1204*a* as corresponding to certification unit 1252, business logic 1204*b* as corresponding to certification unit 1254, and business logic 1204*c* as corresponding to certification unit 1256. Third connection diagram 1250 further identifies transport logic 1206*a*, libraries 1208*a*, transport logic 1206*b*, libraries 1208*b*, transport logic 1206*c*, and libraries 1208*c* as corresponding to certification unit 1258. In various embodiments, transport logic 1206*a*, transport logic 1206*b*, and transport logic 1206*c* may include the same source code. In various embodiments, libraries 1208*a*, libraries 1208*b*, and libraries 1208*c* may include the same source code. Separating data communication and data transformation functionality from the business logic and implementing those features in the transport logic allows for the transport logic (e.g., middleware) to be certified separately from the business logic. That is, instead of certifying, or accrediting, an application as a whole for redeployment because of a source code change, the modified transport logic linked into the application may be certified. This enables executables that implement the transport logic to be recompiled to link to the updated transport logic and be redeployed in a shorter time frame and a reduced cost.

Figure 13:
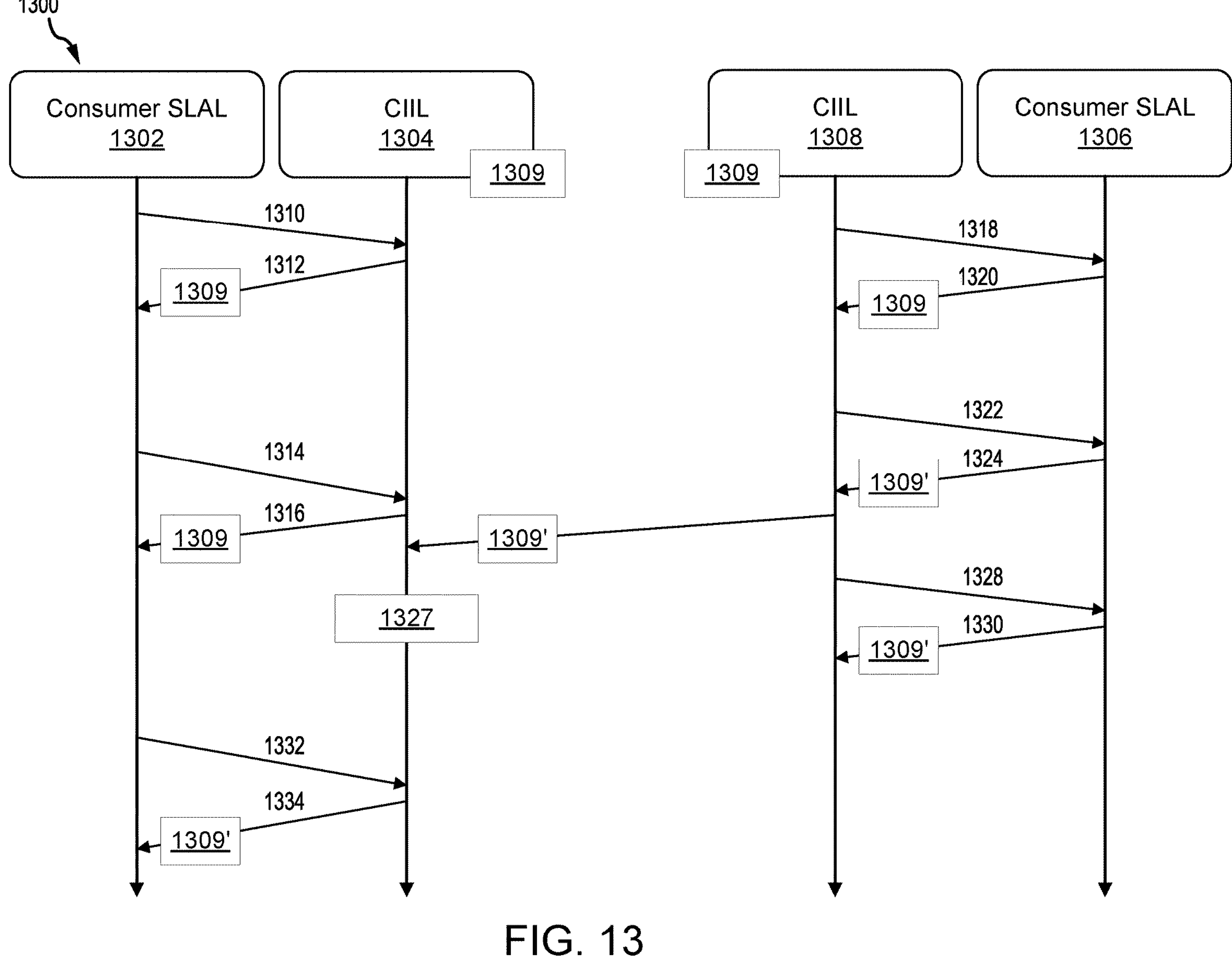
FIG. 13 illustrates a flow diagram of managing data within a configurable integration infrastructure service, in accordance with various embodiments.

Referring now to FIG. 13, a flow diagram 1300 of a system requesting communicating and maintaining current data values, in accordance with various embodiments. Flow diagram 1300 describes the functions of a smart infrastructure system that reduces network traffic by maintaining a current values for expected data. Flow diagram 1300 includes a consumer software logic abstraction layer (SLAL) 1302, a consumer configurable integration infrastructure layer (CIIL) 1304, a producer SLAL 1306, and a producer CIIL 1308. Consumer CIIL 1304 and producer CIIL 1308 may include type specific logic, type abstract logic, and libraries as described above. Consumer CIIL 1304 and producer CIIL 1308 are part of the smart infrastructure system. For clarity of discussion, they will all be referred to as CIIL and not separated into individual components as done in previous discussions.

On the consumer side, consumer SLAL 1302 sends a request 1310 for data 1309 from consumer CIIL 1304. Consumer CIIL 1304 maintains a current value for data 1309 (e.g., "A") and sends a response 1312 including the current value of data 1309 (e.g., "A"). At some later time, consumer SLAL 1302 sends a request 1314 to consumer CIIL 1304 for data 1309. Consumer CIIL 1304 sends a response 1316 including the current value of data 1309 (e.g., "A").

On the producer side, producer CIIL 1308 sends a request 1318 to producer SLAL 1306 for the current value of data 1309. In various embodiments, request 1318 may be in response to a request for the current value of data 1309 from another CIIL on the system. In various embodiments, request 1318 may be sent based on a timer, trigger, or other event to maintain the current value of data 1309 up to date. Producer SLAL 1306 sends a response including the current value of data 1309 (e.g., "A"). At some later time, producer CIIL 1308 sends a request 1322 for the value of data 1309. Producer SLAL 1306 sends a response 1324 including the current value of data 1309 (e.g., "B"). Producer CIIL 1308 sends a message 1326 including the updated data value in response to the value changing.

Consumer CIIL 1304 at block 1327 updates the value of data 1309 to data 1309' (e.g., "B"). After some time producer CIIL 1308 sends a request 1328 for the value of data 1309 to producer SLAL 1306. Producer SLAL 1306 sends response 1330 including data 1309' (e.g., "B"). At some time, consumer SLAL 1302 sends request 1332 to consumer CIIL 1304 requesting the value of data 1309. Consumer CIIL 1304 sends a response 1334 with the updated value of data 1309' (e.g., "B").

Figure 14:
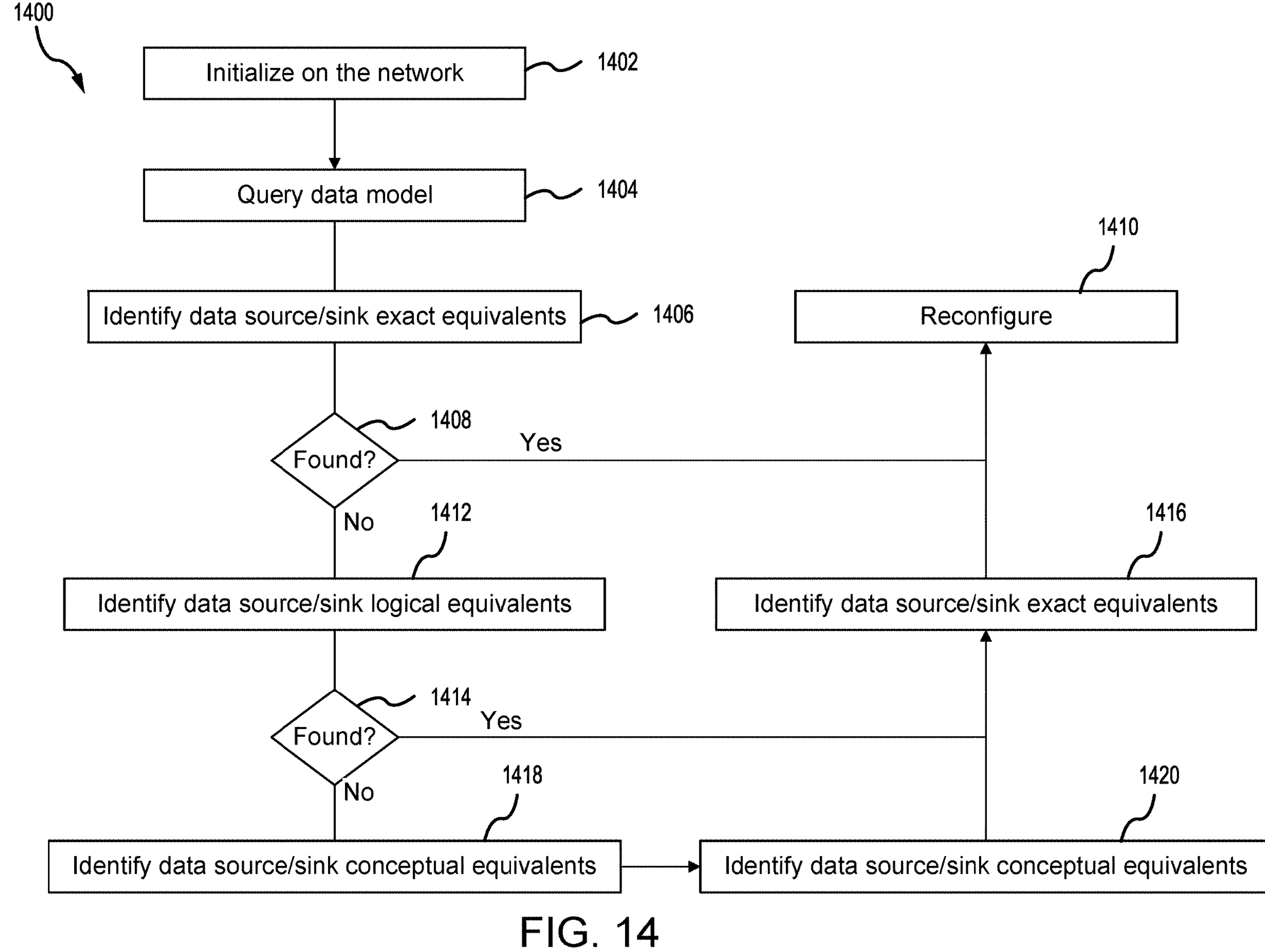
FIG. 14 illustrates a flow diagram of a method of using a data model within a configurable integration infrastructure service, in accordance with various embodiments.

Referring now to FIG. 14, a flow diagram of a method 1400 for automated data discovery using a data model is illustrated, in accordance with various embodiments. In various embodiments, method 1400 may be performed by a controller connected to a network such as controller 102 and bus 112 described above with respect to FIG. 1. In various embodiments, code for performing method 1400 may be part of a communication and integration infrastructure layer (CIIL) such as CIIL 1304 described above with respect to FIG. 13. In various embodiments, code for performing method 1400 may be a part of data type abstraction layer (DTAL), integration and mediation abstraction layer (IMAL), and/or signal and protocol abstraction layer (SPAL) described above with respect to FIGS. 7A-12D.

At block 1402, the controller initializes itself on the existing network. This may include being connected to the network or broadcasting a unique ID for the controller and/or application running on the controller, among others. In various embodiments, the controller may source and/or sink data to and/or from the network. That is, the controller may produce data (e.g., temperature, speed, altitude, floor number, etc.) and/or consume data from another controller.

At block 1404, the controller queries a data model for information about the network and other controllers, or components, on the network. In various embodiments, the data model may be local to the controller. That is, a local copy of the data model may be written to storage connected to the controller. In various embodiments, one or more servers that are accessible using the network may host the data model. In various embodiments, the data model may be stored in a distributed storage model including both local and server storage.

At block 1406, the controller identifies zero or more data sources and/or sinks that have exact data equivalents to what the controller consumes and/or produces. As an example, the controller may produce data including a temperature measured in Fahrenheit and search for other controllers, or components, that consume data including a temperature measured in Fahrenheit. As another example, the controller may consume data that includes a speed measured in miles per hour and search for other controllers that produce data that includes a speed measured in miles per hour. That is, the data produced and consumed is an exact equivalent and may be transmitted and received directly with no changes to the data.

At decision block 1408, the controller determines whether any sources and/or sinks that have exact data equivalents are found. If an exact data equivalent is found, method 1400 proceeds to block 1410.

At block 1410, the controller dynamically reconfigures itself to communicate with the controller(s) identified at block 1406. That is, the controller reconfigures the software, configurations, and/or other components running to communicate with the previously identified controller(s). In various embodiments, this may include reconfiguring signal and protocol abstraction layer (SPAL) such as, for example, SPAL **708*a* described above with respect to FIGS. 7A and 7B**. That is, the controller may dynamically reconfigure itself to communicate with the identified controller(s).

Returning to decision block 1408, if an exact data equivalent is not found, method 1400 proceeds to block 1412.

At block 1412, the controller identifies zero or more data sources and/or sinks that have logical data equivalents to what the controller consumes and/or produces. As an example, the controller may produce data including a temperature measured in Fahrenheit and search for other controllers, or components, that consume data including a temperature measured in a unit other than Fahrenheit, such as Celsius or Kelvin. As another example, the controller may consume data that includes a speed measured in miles per hour and an altitude measure in feet and search for other controllers that produce data that includes a speed measured in a unit other than miles per hour, such as kilometers per hour, knots, etc. and an altitude measured in a unit other than feet, such as meters. That is, the data produced and consumed has a logical equivalent for which there is a known transformation that can be performed before or after the data is transmitted. For the first example, there are known equations to convert between Fahrenheit and Celsius. For the second example, there are known equations to convert between miles per hour and kilometers per hour and between feet and meters.

At decision block 1414, the controller determines whether any sources and/or sinks that have logical data equivalents are found. If a logical data equivalent is found, method 1400 proceeds to block 1416.

At block 1416, the controller identifies exact data equivalents based on the logical equivalents. In various embodiments, this may include performing the transformations described above with respect to block 1412. Method 1400 then proceeds to block 1410 to further reconfigure the transport layer to build a pipeline to perform the transform the logical equivalents to the exact equivalents used.

Returning to decision block 1408, if a logical data equivalent is not found, method 1400 proceeds to block 1418.

At block 1418, the controller identifies one or more data sources and/or sinks that have conceptual data equivalents to what the controller consumes and/or produces. As an example, the controller may produce data including an altitude with respect to the cockpit of an aircraft and search for other controllers that have conceptually equivalent data. An example of conceptually equivalent data may be an altitude with respect to a center of mass of an aircraft. Another example of conceptual equivalences is an absolute position (e.g., GPS) as compared to an observed position by a radar. That is, while the data may not be the same, and the data may not appear to logically equivalent, they both conceptually provide position of the controller.

At block 1420, the controller identifies logical equivalents for the conceptual data equivalent identified at block 1418. With respect to the above position example, transforming the conceptual equivalent to a logical equivalent may include identifying the location of the radar station and modifying that location with the observed position to convert to the provided absolute position. With respect to the altitude example, the controller may define an equation that correlates the position of the cockpit with the position of the center of mass of the aircraft allowing for a conversion between the two. Method 1400 then proceeds to block 1416 to identify exact data equivalents between the source and sink of the data using the above mentioned transformation.

At block 1410, the dynamic reconfiguration further includes the controller defining a pipeline to perform the transformations between data types and data units. In various embodiments, the pipeline may be an example of pipeline 1226 described above in FIGS. 12A-12D.

Figure 15:
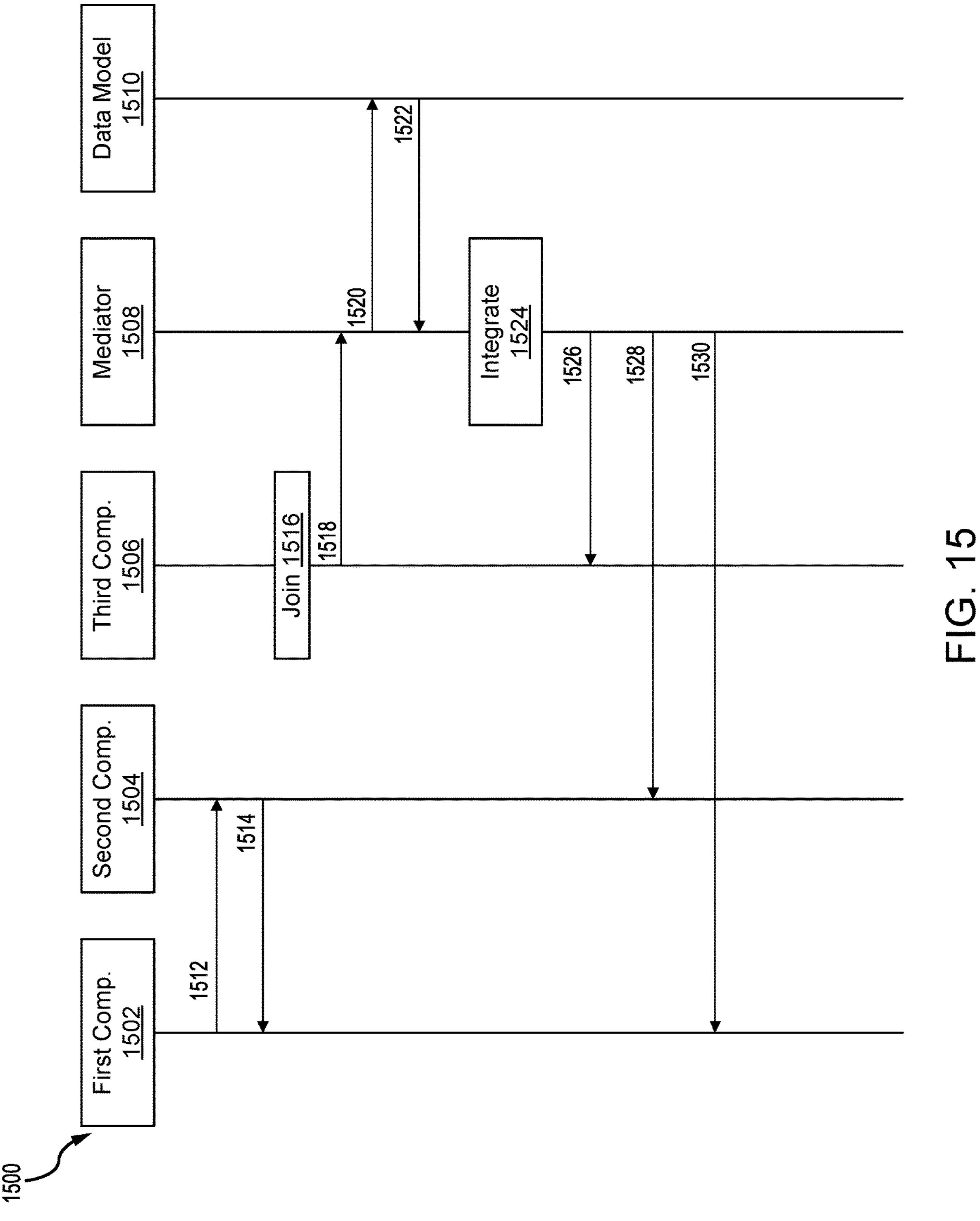
FIG. 15 illustrates a flow diagram of communicating within a network managed by a configurable integration infrastructure service, in accordance with various embodiments.

Referring now to FIG. 15, a flow diagram 1500 of components in a network using a data model for automated discovery by a third party mediator is illustrated, in accordance with various embodiments. Flow diagram 1500 includes a first component 1502, a second component 1504, a third component 1506, a mediator 1508, and a data model 1510. In various embodiments, first component 1502, second component 1504, third component 1506, and mediator 1508 may each be examples of controller 102 described above with respect to FIG. 1. In various embodiments, first component 1502, second component 1504, and third component 1506 may include applications, or executables, such as executables 402*a*, 402*b*, 402*c* described above with respect to FIGS. 4A and 4B. In various embodiments, first component 1502, second component 1504, third component 1506, mediator 1508, and data model 1510 may communicate with each across a network such as a bus, an intranet, an internet, among others. In various embodiments, data model 1510 may be local to each controller 1502, 1504, 1506, local to mediator 1508, remotely running on a server, or stored distributed across multiple servers, among other storage and deployment options. It should be understood that each of the components described in FIG. 15 with respect to flow diagram 1500 are in communication with each of the other components and that the manner in which they are connected, or stored, may be variable and diverse. Accordingly, flow diagram 1500 is not intended to be limiting but to be used to facilitate discussion of the systems and methods disclosed herein.

At step 1512, first component 1502 sends a request for data to second component 1504. As discussed above, in various embodiments, the request for data may be sent by a communication and integration infrastructure layer (CIIL) such as fourth CIIL 316 described above with respect to FIG. 3. In various embodiments, the CIIL may include a data type abstraction layer (DTAL), a integration and mediation abstraction layer (IMAL), and a one or more signal and protocol abstraction layer (SPAL) as described above with respect to FIGS. 7A-12D.

At step 1514, second component 1504 sends a response to first component 1502 including the requested data. As is discussed above, in various embodiments, the response may be sent by a communication and integration infrastructure layer (CIIL). In various embodiments, the CIIL may request the data from business logic (e.g., software logic abstraction layer (SLAL)) prior to sending the response. In various embodiments, the CIIL may maintain an up to date value for the data provided by the business logic (e.g., see for example the discussion above with respect to FIG. 13).

At block 1516, third component 1516 joins the network that first component 1502 and second component 1504 are on. In various embodiments, third component 1516 broadcasts a message identifying itself to all components on the network. In various embodiments, as illustrated, third component 1516 sends a message to mediator 1508 identifying itself.

At step 1518, third component 1516 sends the message to mediator 1508 identifying itself to mediator 1516 for addition to the network.

At step 1520, mediator 1508 queries data model 1510 for information about third component 1506 including the type of data produced and the type of data consumed. In various embodiments, the query may further include requests for the capabilities of third component 1506 (e.g., processing power, storage, memory, connection type, etc.).

At step 1522, mediator 1508 receives results back from data model 1510. The results from data model 1510 may be received in various types and structures, as has been previously described, depending on the query.

At block 1524, mediator 1508 dynamically integrates third component 1506 into the network. In various embodiments, mediator 1508 may identify one or more sources for the data consumed by third component 1506 and one or more sinks for the data produced by third component 1506 that are compatible with the data produced by third component 1506. In other words, mediator 1508 identifies a source and/or sink for the data consumed and/or produced by third component 1506 that is syntactically, logically, or semantically the same as the data consumed and/or produced by third component 1506. In various embodiments, the one or more sources may be other components on the network (e.g., first component 1502, second component 1504, etc.) In various embodiments, the one or more sinks may be other components on the network (e.g., first component 1502, second component 1504, etc.) In various embodiments, mediator 1508 may determine data transformations to use to convert the data produced and consumed by third component to the data consumed and produced by other components on the network (e.g., first component 1502 and second component 1504).

In various embodiments, the dynamic integration may include providing information to each component on the network to reconfigure itself to communicate with third component 1506. In various embodiments, the dynamic integration may include providing information to third component on how to configure itself to communicate with the other components on the network. This information may be sent in various formats including extensible markup language (XML), JAVASCRIPT Object Notation (JSON), comma separate value (CSV), scripted code, or object code, among other formats.

At step 1526, mediator 1508 sends the integration information, or provisioning information, to third component

1506. Third component may then dynamically reconfigure its connections to the network to communicate with the other components on the network. In various embodiments, this may include reconfiguring the data type abstraction layer and signal and protocol abstraction layer as discussed above with respect to FIGS. 7A-12D.

At step 1528, mediator 1508 sends the integration information, or provisioning information, to second component 1504. Third component may then dynamically reconfigure its connections to the network to communicate with the other components on the network. In various embodiments, this may include reconfiguring the data type abstraction layer and signal and protocol abstraction layer as discussed above with respect to FIGS. 7A-12D.

At step 1530, mediator 1508 sends the integration information, or provisioning information, to first component 1502. Third component may then dynamically reconfigure its connections to the network to communicate with the other components on the network. In various embodiments, this may include reconfiguring the data type abstraction layer and signal and protocol abstraction layer as discussed above with respect to FIGS. 7A-12D.

Accordingly, flow diagram 1500 illustrates a simplified description of dynamic discovery of a new component to a network and dynamically provisioning, or reconfiguring, one or more components within the network to enable communication between components within the network. Using data model 1510 in this manner allows for improved resource management of components on the network. Furthermore, this enables each component to be dynamically reconfigured to communicate with components that did not exist, and may not have been anticipated, on the network at the time of deployment. Accordingly, this may prolong the useful lifespan of various components (e.g., internet of things) allowing them to communicate with new components by dynamically reconfiguring the underlying communication infrastructure of the application, or executable, and not the business logic of the application.

Figure 16:
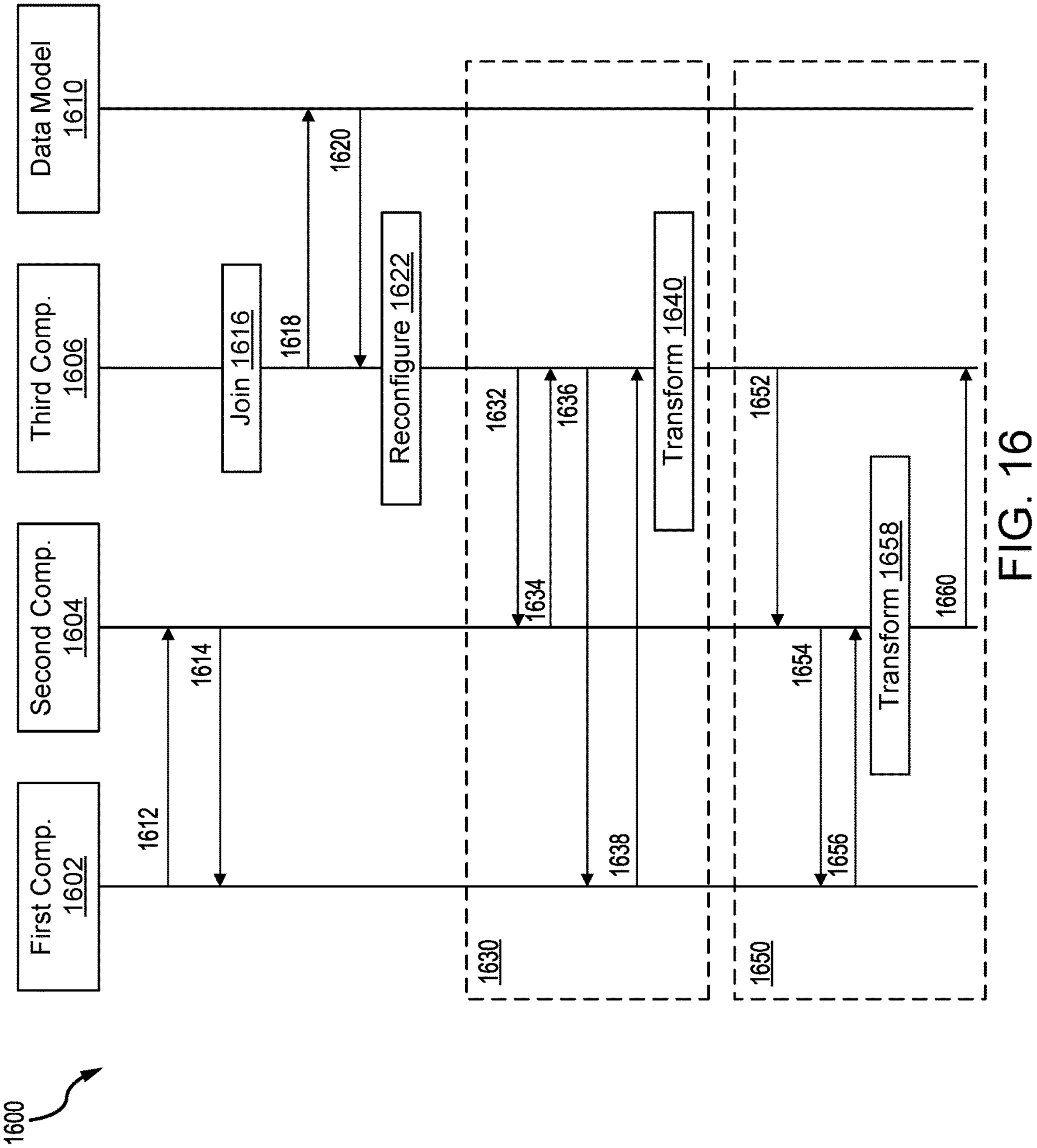
FIG. 16 illustrates a flow diagram of components in a network using a data model for automated discovery, in accordance with various embodiments.

Referring now to FIG. 16, a flow diagram 1600 of components in a network using a data model for automated discovery is illustrated, in accordance with various embodiments. Flow diagram 1600 includes a first component 1602, a second component 1604, a third component 1606, and a data model 1610. In various embodiments, first component 1602, second component 1604, and third component 1606 may each be examples of controller 102 described above with respect to FIG. 1. In various embodiments, first component 1602, second component 1604, and third component 1606 may further include applications, or executables, such as executables 402*a*, 402*b*, 402*c* described above with respect to FIGS. 4A and 4B. In various embodiments, first component 1602, second component 1604, third component 1606, and data model 1610 may communicate with each across a network such as a bus, an intranet, an internet, among others. In various embodiments, data model 1610 may be local to each controller 1602, 1604, 1606, remotely running on a server, or stored distributed across multiple servers, among other storage and deployment options. It should be understood that each of the components described in FIG. 16 with respect to flow diagram 1600 are in communication with each of the other components and that the manner in which they are connected, or stored, may be variable and diverse. Accordingly, flow diagram 1600 is not intended to be limiting but to be used to facilitate discussion of the systems and methods disclosed herein.

At step 1612, first component 1602 sends a request for data to second component 1604. As discussed above, in various embodiments, the request for data may be sent by a communication and integration infrastructure layer (CIIL) such as fourth CIIL 316 described above with respect to FIG. 3. In various embodiments, the CIIL may include a data type abstraction layer (DTAL), a integration and mediation abstraction layer (IMAL), and a one or more signal and protocol abstraction layer (SPAL) as described above with respect to FIGS. 7A-12D.

At step 1614, second component 1604 sends a response to first component 1602 including the requested data. As is discussed above, in various embodiments, the response may be sent by a CIIL. In various embodiments, the CIIL may request the data from business logic (e.g., software logic abstraction layer (SLAL)) prior to sending the response. In various embodiments, the CIIL may maintain an up to date value for the data provided by the business logic (e.g., see for example the discussion above with respect to FIG. 13).

At block 1616, third component 1616 joins the network that first component 1602 and second component 1604 are on.

At step 1618, third component 1616 queries data model 1610 for information about the components on the network, including the type of data produced and the type of data consumed. In various embodiments, the query may further include requests for the capabilities of the other components on the network (e.g., processing power, storage, memory, connection type, etc.).

At step 1620, third component receives results back from data model 1610.

At block 1622, third component 1606 dynamically reconfigures itself in response to the data received from the data model. Specifically, third component 1606 dynamically reconfigures the transport layers (e.g., DTAL, IMAL, SPAL) as described above with respect to FIGS. 7A-12D. In various embodiments, third component 1606 may identify one or more sources of data to be consumed by third component 1606 and one or more sinks for the data produced by third component 1606. In various embodiments, third component 1606 may determine data transformations to use to convert the data produced and consumed by third component 1606 to the data consumed and produced by other components on the network (e.g., first component 1602 and second component 1604). In various embodiments, the dynamic integration may include communicating with the other components on the network to reconfigure itself to communicate with third component 1606. That is, the different components in the network (e.g., first component 1602, second component 1604, and third component 1606) may coordinate to determine how to reconfigure themselves in order to optimize the networks resources (e.g., processing, memory, storage, bandwidth, etc.)

Optional block 1630 illustrates a first example reconfiguration of communication between first component 1602, second component 1604, and third component 1606 within the network. Optional block 1630 may be an example illustration of the embodiments discussed above with respect to FIGS. 12A and 12C.

At step 1632, third component 1606 sends a request for data to second component 1604.

At step 1634, second component 1604 replies to third component 1606 with the requested data.

At step 1636, third component 1606 sends a request for data to first component 1602.

At step 1638, first component 1602 replies to third component 1606 including the requested data.

At block 1640, third component 1606 performs transformations on the received data to prior to using the data.

Specifically, the transport layers (e.g., DTAL, IMAL, TPM) perform the transformations to place the received data in position for consumption by the business logic (e.g., SLAL). In various embodiments, the transformation performed at block 1640 may be similar to the transformation performed by pipeline 1226 described above with respect to FIG. 12A.

Optional block 1650 illustrates a second example reconfiguration of communication between first component 1602, second component 1604, and third component 1606 within the network. Optional block 1650 may be an example illustration of the embodiments discussed above with respect to FIGS. 12B and 12D.

At step 1652, third component 1606 sends a request for data to second component 1604.

At step 1654, second component 1604 sends a request for data to first component 1602. In various embodiments, the request for data may be a request for a subset of data provided by first component 1602.

At step 1656, first component 1602 replies to second component 1604 is the requested data. In various embodiments, the reply may include all data provided by first component 1602. In various embodiments, the reply may include a subset of data that first component 1602 can provide.

At block 1658, second component 1604 performs a transformation on the data received from first component 1602 and provided by second component 1604.

At step 1660, second component 1604 replies to third component 1606 with the request data that is transformed and ready for consumption by third component 1606.

At step 1636, third component 1606 sends a request for data to first component 1602.

At step 1638, first component 1602 replies to third component 1606 including the requested data.

Accordingly, flow diagram 1600 illustrates a simplified description of dynamic discovery of data within a network by a new component to a network and dynamically provisioning, or reconfiguring, one or more components within the network to enable communication between components within the network. Using data model 1610 in this manner allows for improved resource management of components on the network. Furthermore, this enables each component to be dynamically reconfigured to communicate with components that did not exist, and may not have been anticipated, on the network at the time of deployment. Accordingly, this may prolong the useful lifespan of various components (e.g., internet of things) allowing them to communicate with new components by dynamically reconfiguring the underlying communication infrastructure of the application, or executable, and not the business logic of the application.

Furthermore, it should be appreciated that this is a simplified example of the systems and methods disclosed herein. While FIG. 16 illustrates an example using three components, similar processes and procedures may be used to dynamically discover and dynamically reconfigure components in a network including hundreds, thousands, and millions of different components. By so doing, the amount of effort to manually reconfigure the various components within a network is drastically reduced. Additionally, the systems and methods disclosed herein allow for dynamic reconfiguration of components and processes in order to optimize the resources of the network, including processing power, network bandwidth, storage capacity, and memory capacity. That is, the systems and methods disclosed herein allow for low power, low processing speed components to be added to the network and receive data in a format and/or syntax which was previously not accounted for in the network. Furthermore, this data may be transformed by the high power, high processor speed components that produced the data in a different format so that the new low power, low processor speed component does not utilize resources to perform the transformations.

Figure 17:
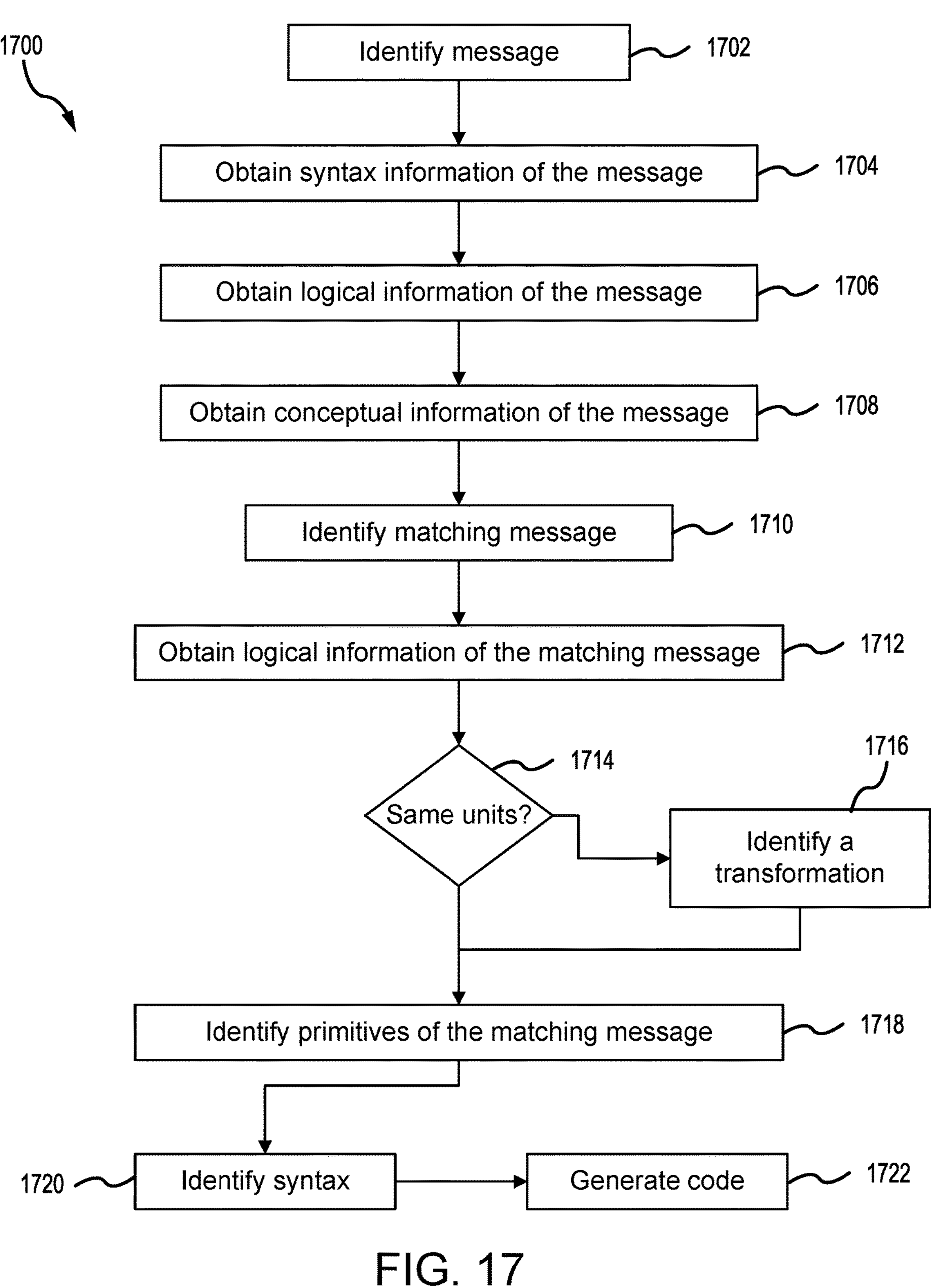
FIG. 17 illustrates a flow diagram of a method of querying a data model and building a pipeline of primitive blocks.

Referring now to FIG. 17, a flow diagram of a method 1700 for querying a data model and building a pipeline of primitive blocks is illustrated, in accordance with various embodiments. In various embodiments, method 1700 may be performed by a controller connected to a network such as controller 102 and bus 112 described above with respect to FIG. 1. In various embodiments, code for performing method 1700 may be part of a communication and integration infrastructure layer (CIIL) such as CIIL 1304 described above with respect to FIG. 13. In various embodiments, code for performing method 1700 may be a part of data type abstraction layer (DTAL), integration and mediation abstraction layer (IMAL), and/or signal and protocol abstraction layer (SPAL) described above with respect to FIGS. 7A-12D.

At block 1702, the controller identifies a message to source or to sink. In various embodiments, the controller may identify more than one message to source or to sink. In various embodiments, the controller may be a source of one or more messages, may be a sink for one or more messages, or a combination of the two. That is, the controller may generate (e.g., source) one or more messages to be transmitted a network, the controller may receive (e.g., sink) one or more messages from the network, or a combination of the two. In various embodiments, the one more messages may be examples of message types 506, 508, 510, 512 described above in FIGS. 5A and 5B. As previously described, the message has a syntax and a structure. That is, the message includes data that is organized and represented in a defined manner. For example, the message may be used to identify a position using x, y, and z values in where the x, y, and z values are defined in software as "double" types.

At block 1704, the controller obtains syntax information for the message. In various embodiments, obtaining the syntax information includes querying a data model (e.g., data model 500). That is, the controller obtains from the data model the syntax information for the identified message (e.g., position) including the type of data represented (e.g., position) and the data value type (e.g., double). Specifically, the controller obtains the syntax information from the platform data model (e.g., platform data model 530) for the identified message. The syntax information for the identified message in the platform data model may be unique to a specific message, such as the order of the information in the message.

At block 1706, the controller obtains logical information for the message. In various embodiments, obtaining the logical information includes querying the data model (e.g., data model 500). That is, the controller obtains from the data model the logical information for the identified message (e.g., position coordinates) including the data unit type (e.g., meters). Specifically, the controller obtains the logical information from the logical data model (e.g., logical data model 532) for the identified message. The logical information for the identified message may be shared by multiple messages that include similar information but that may have a different syntax (e.g., order).

At block 1708, the controller obtains conceptual information for the message. In various embodiments, obtaining the conceptual information includes querying the data model (e.g., data model 500). That is, the controller obtains from the data model the conceptual information for the identified message (e.g., position) in order to identify the semantics of the message. In other words, the conceptual information may be used to identify other messages and/or message types that represent the same or similar conceptual information (e.g., position) as the identified message. Specifically, the controller obtains the conceptual information from the conceptual data model (e.g., conceptual data model 534) for the identified message. The conceptual information (e.g., mass, position, speed, etc.) for the identified message may be use to correlate the identified message with other messages that represent the same concept (e.g., mass, position, speed, etc.)

At block 1710, the controller identifies one or more messages in the data model that have a matching semantic (e.g., concept) as the identified message. In various embodiments, identifying the one or messages including querying the data model (e.g., data model 500). That is, the controller identifies the one or more messages in the data model that provide the same information semantically as the identified information. For example, the identified message may provide position information relative to a first point (e.g., a ground station) and using a first unit (e.g., miles) and another message may provide position information relative to a second point (e.g., an airframe) and use a second unit (e.g., meters). While the information in both messages are not the same syntactically or logically, they are the same semantically as they both define the same concept (e.g., a position). The controller may identify message formats to send and/or receive that have the same semantics as the message that is produced and/or received by the controller.

At block 1712, the controller obtains the logical information of the matching message identified at block 1710. In various embodiments, obtaining the logical information of the matching message includes querying the data model (e.g., data model 500). That is, the data units used in the matching message (e.g., degrees, meters, etc.). For example, the message identified at block 1702 may identify a position using x, y, and z coordinates measured in meters and the matching message identified at block 1710 may identify the position using latitude, longitude, and altitude measured in degrees and meters.

At decision block 1714, the controller determines whether the units of the identified message (i.e., from block 1702) and the units of the matching message (i.e., from block 1710) are different. If it is determined that the units of the messages are different, method 1700 proceeds to block 1716.

At block 1716, the controller identifies a transformation, algorithm, or equation to be used to convert the units of the matching message to the units of the identified message. In various embodiments, the transformation may be a simple equation, such as converting meters to feet or degrees Celsius to degrees Fahrenheit. In various embodiments, the transformation may be more complex such as converting a position from an x, y, z coordinate location from a fixed point to a latitude, longitude, and altitude.

Returning to decision block 1714, if instead, it is determined that the units of the matching message are the same as the units of the identified message, method 1700 proceeds to block 1718.

At block 1718, the controller identifies the primitives used to store the information of the matching message (e.g., double, int, long, string, Boolean, etc.). That is, the controller identifies the syntax of the matching message using the platform data model.

At block 1720, the controller identifies the syntax, values, and other aspects of the matching message. The controller may then identify the matching message when it is received from the network and convert the matching message to the expected identified message for processing. Additionally, or in the alternative, the controller may generate the matching message from the identified message for transmission to the network.

At block 1722, the controller generates the code to transform, or convert, the identified message to the matching message and to transform the matching message to the identified message. In various embodiments, generating the code include building a pipeline of primitive code blocks to perform the transformation between the identified message and the matching message. As previously described in FIGS. 6A and 6B, the primitive code blocks are blocks of code that each perform simple tasks such as filter, split, join, transform, and queue, among others. By linking the multiple primitive code blocks together, the controller is able to dynamically reconfigure itself to send and/or receive messages of different types, as previously discussed. The pipeline of primitive code blocks may be implemented in the integration and mediation abstraction layer (IMAL) as previously described.

The process flows and screenshots depicted above are merely embodiments and are not intended to limit the scope of the disclosure. For example, the steps recited in any of the method or process descriptions may be executed in any order and are not limited to the order presented. It will be appreciated that the above descriptions make appropriate references not only to the steps and user interface elements depicted in FIGS. 1-17, but also to the various system components as described above with reference to FIGS. 1-13. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation.

Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using a removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and methods may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of techniques for data transmission, signaling, data processing, network control, and the like. Still further, the system could be used to detect or prevent security issues with a client-side scripting language, such as JAVASCRIPT®, VBScript, or the like.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices. The AI or ML may store data in a decision tree in a novel way.

In various embodiments, the embodiments are directed toward one or more computer systems capable of carrying out the functionalities described herein. The computer system includes one or more processors. The processor is connected to a communication infrastructure (e.g., a communications bus, cross over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 5% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 5% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above-described concepts can be used alone or in combination with any or all of the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A method, comprising:

identifying, by a first controller, a first message of a plurality of messages to be handled by the first controller, wherein the first message represents first data;

obtaining, by the first controller, a syntax information of the first message;

obtaining, by the first controller, a logical information of the first message, the logical information of the first message including a first data unit type;

obtaining, by the first controller, a semantic information of the first message, the semantic information including a concept represented by the first message;

identifying, by the first controller, a second message of the plurality of messages, wherein the second message is being handled by a second controller, wherein the second message is compatible with the first message, and wherein the second message has at least one of the same syntax information, the same logical information, or the same semantic information as the first message;

determining, by the first controller, a data transformation to convert the second message to the first message;

generating, by the first controller, a pipeline of primitive code blocks to perform the data transformation on the first controller;

querying, by the first controller, a data model for information about the plurality of messages; and obtaining, by the first controller, the syntax information, the logical information, and the semantic information of the first message from a response to the querying of the data model.

2. The method of claim 1, wherein the syntax information of the first message includes a first data value, a first data position and a first data representation.

3. The method of claim 2, wherein a syntax information of the second message includes a second data value, a second data position, and a second data representation, and wherein one of the second data value, the second data position, or the second data representation is different than one of the first data value, the first data position, or the first data representation.

4. The method of claim 1, wherein the second message has the same logical information as the first message, and wherein the data transformation converts the syntax information of the second message to the syntax information of the first message.

5. The method of claim 1, wherein the second message has the same semantic information as the first message, and wherein the data transformation converts the logical information of the second message to the logical information of the first message.

6. The method of claim 1, wherein the pipeline of primitive code blocks includes primitive code for performing at least one of filter, split, join, transform, or queue operations.

7. A non-transitory machine-readable medium having stored thereon instructions for performing a method of generating a pipeline of primitive code blocks for performing a data transformation, comprising machine executable code which when executed by a processor, causes the processor to:

identify a first message of a plurality of messages, wherein the first message represents first data;

obtain a syntax information of the first message;

obtain a logical information of the first message, the logical information of the first message including a first data unit type;

obtain a semantic information of the first message, the semantic information including a concept represented by the first message;

identify a second message of the plurality of messages, wherein the second message is being handled by a second controller, wherein the second message is compatible with the first message, and wherein the second message has at least one of the same syntax information, the same logical information, or the same semantic information as the first message;

determine the data transformation to convert the second message to the first message;

generate the pipeline of primitive code blocks to perform the data transformation;

query a data model for information about the plurality of messages; and obtain the syntax information, the logical information, and the semantic information of the first message from a response to the query of the data model.

8. The non-transitory machine-readable medium of claim 7, wherein the syntax information of the first message includes a first data value, a first data position and a first data representation.

9. The non-transitory machine-readable medium of claim 8, wherein a syntax information of the second message includes a second data value, a second data position, and a second data representation, and wherein one of the second data value, the second data position, or the second data representation is different than one of the first data value, the first data position, or the first data representation.

10. The non-transitory machine-readable medium of claim 7, wherein the second message has the same logical information as the first message, and wherein the data transformation converts the syntax information of the second message to the syntax information of the first message.

11. The non-transitory machine-readable medium of claim 7, wherein the second message has the same semantic information as the first message, and wherein the data transformation converts the logical information of the second message to the logical information of the first message.

12. The non-transitory machine-readable medium of claim 7, wherein the pipeline of primitive code blocks includes primitive code for performing at least one of filter, split, join, transform, or queue operations.

13. A system, comprising:

a first controller;

a second controller in communication with the first controller;

a processor operatively coupled to the first controller; and a memory operatively coupled to the processor, the memory comprising instructions stored thereon that, when executed by the processor, cause the processor to:

identify a first message of a plurality of messages to be handled by the first controller, wherein the first message represents first data;

obtain a syntax information of the first message;

obtain a logical information of the first message, the logical information of the first message including a first data unit type;

obtain a semantic information of the first message, the semantic information including a concept represented by the first message;

identify a second message of the plurality of messages, wherein the second message is being handled by the second controller, wherein the second message is compatible with the first message, and wherein the second message has at least one of the same syntax information, the same logical information, or the same semantic information as the first message;

determine a data transformation to convert the second message to the first message;

generate a pipeline of primitive code blocks to perform the data transformation;

query a data model for information about the plurality of messages; and obtain the syntax information, the logical information, and the semantic information of the first message from a response to the query of the data model.

14. The system of claim 13, wherein the syntax information of the first message includes a first data value, a first data position and a first data representation.

15. The system of claim 14, wherein a syntax information of the second message includes a second data value, a second data position, and a second data representation, and wherein one of the second data value, the second data position, or the second data representation is different than one of the first data value, the first data position, or the first data representation.

16. The system of claim 13, wherein the second message has the same logical information as the first message, and wherein the data transformation converts the syntax information of the second message to the syntax information of the first message.

17. The system of claim 13, wherein the second message has the same semantic information as the first message, and wherein the data transformation converts the logical information of the second message to the logical information of the first message.

* * * * *